United States Patent
Onoue

(10) Patent No.: US 9,641,439 B2
(45) Date of Patent: May 2, 2017

(54) INFORMATION PROCESSING SYSTEM AND CONTROL APPARATUS AND METHOD

(71) Applicant: FUJITSU LIMITED, Kawasaki-shi, Kanagawa (JP)

(72) Inventor: Koichi Onoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 73 days.

(21) Appl. No.: 14/607,410

(22) Filed: Jan. 28, 2015

(65) Prior Publication Data

US 2015/0244627 A1 Aug. 27, 2015

(30) Foreign Application Priority Data

Feb. 26, 2014 (JP) .................................. 2014-035964

(51) Int. Cl.
*H04L 12/803* (2013.01)

(52) U.S. Cl.
CPC .................................. *H04L 47/125* (2013.01)

(58) Field of Classification Search
CPC .................................. H04L 41/0823–41/0836
See application file for complete search history.

(56) References Cited

U.S. PATENT DOCUMENTS

| 2008/0155537 A1* | 6/2008 | Dinda ................... G06F 9/4887 718/1 |
| 2011/0246647 A1 | 10/2011 | Marquezan et al. |
| 2012/0102190 A1 | 4/2012 | Durham et al. |
| 2013/0044641 A1* | 2/2013 | Koponen ................ H04L 12/66 370/255 |

FOREIGN PATENT DOCUMENTS

| JP | 2012-094119 | 5/2012 |
| JP | 2012-511292 | 5/2012 |

* cited by examiner

*Primary Examiner* — Khaled Kassim
*Assistant Examiner* — Zhaohui Yang
(74) *Attorney, Agent, or Firm* — Oblon, McClelland, Maier & Neustadt, L.L.P.

(57) ABSTRACT

This system includes: plural first information processing apparatuses on which a virtual machine that belongs to either of plural subnets; plural second information processing apparatuses on which a virtual router used for communication between subnets; a controller that controls communication paths within a subnet, deployment of the virtual machine and deployment of the virtual router; and plural switches that connects the plural first information processing apparatuses, the plural second information processing apparatuses and the controller. The controller selects any one of the virtual machine, the virtual router and a communication path within any one of the plural subnets based on a predetermined evaluation value concerning a communication amount for each first information processing apparatus and a predetermined evaluation value concerning a communication amount for each switch, and changes deployment destination of the selected virtual machine or the selected virtual router or the selected communication path.

9 Claims, 68 Drawing Sheets

| Time | PM,Port | OUTPUT Traffic |
|---|---|---|
| 2013.8.1: 00:00:00 | 1,1 | 1Gbps |
| 2013.8.1: 00:00:00 | 1,2 | 7 Gbps |
| 2013.8.1: 00:00:00 | 2, 1 | 10 Mbps |
| ... | | |
| 2013.8.1: 01:00:00 | 1,1 | 100 Mbps |
| 2013.8.1: 01:00:00 | 1,2 | 2 Gbps |
| 2013.8.1: 01:00:00 | 2, 1 | 30 Mbps |
| ... | | |

FIG.8

| Time | PM,Port, TID,SIP, DIP | OUTPUT Traffic |
|---|---|---|
| 2013.8.1: 00:00:00 | 1,1, 3, ip1, ip2 | 1Gbps |
| 2013.8.1: 00:00:00 | 1,2, 2, ip1, ip3 | 10 Gbps |
| 2013.8.1: 00:00:00 | 2, 1, 3, ip2, ip1 | 10 Mbps |
| ... | | |
| 2013.8.1: 01:00:00 | 1,1, 3, ip1, ip2 | 1Mbps |
| 2013.8.1: 01:00:00 | 1,2, 2, ip1, ip3 | 1 Gbps |
| 2013.8.1: 01:00:00 | 2, 1, 3, ip2, ip1 | 1 Mbps |
| ... | | |

FIG.9

| | CHANGED Traffic |
|---|---|
| MOVEMENT OF Virtual router | Traffic IN COMMUNICATION OF ALL VMs BETWEEN SUBNETS, WHICH PASSES THROUGH Virtual router |
| MOVEMENT OF VM | Traffic IN COMMUNICATION OF VM THAT COMMUNICATES WITH VM TO BE MOVED WITHIN SUBNET AND BETWEEN SUBNETS |
| MOVEMENT OF L2-tree | Traffic IN COMMUNICATION OF VM WITHIN SUBNET, WHICH PASSES THROUGH ROOT (SSwitch) OF L2-Tree |

INFORMATION PROCESSING SYSTEM AND CONTROL APPARATUS AND METHOD

CROSS-REFERENCE TO RELATED APPLICATIONS

This application is based upon and claims the benefit of priority of the prior Japanese Patent Application No. 2014-035964, filed on Feb. 26, 2014, the entire contents of which are incorporated herein by reference.

FIELD

This invention relates to a resource control technique in an information processing system.

BACKGROUND

In case where, in an information processing system in a data center or the like, plural virtual machines and the like for plural tenants (i.e. customers) are activated and operated on plural physical machines, there is a case where a desired throughput cannot be obtained when there is a lack of balance in the load in a network that connects the physical machines.

For example, an information processing system as illustrated in FIG. 1 is assumed. The information processing system in FIG. 1 includes three upper switches SSwitch1 to 3, three lower switches LSwitch1 to 3, physical machines AServer1 and 3 on which Virtual routers 1 and 2 are executed and physical machines VServer1 to 6 on which virtual machines VM1 to VM6 are executed.

In the example of FIG. 1, VM1 communicates with VM3 through LSwitch1, SSwitch1, Virtual router1, SSwitch1 and LSwitch2, and VM2 communicates with VM4 through LSwitch1, SSwitch1 and LSwitch2. Furthermore, VM5 communicates with VM6 through LSwitch2, SSwitch3, Virtual router2, SSwicth3 and LSwitch3.

In such a case, when focusing on LSwitch1, the output traffic of a link to SSwitch1 is "5", however, the output traffic of a link to SSwitch2 and SSwitch3 is "0". Because the output traffic of the link to SSwitch1 is greater, the latency may become high.

Then, in a conventional technique, a network controller that is connected to SSwitch1 may cooperate with the upper switches and lower switches to individually change communication paths between VMs. For example, a communication path between VM2 and VM4 is changed from a connection path that passes through LSwitch1, SSwitch1 and LSwitch2 to a communication path that passes through LSwitch1, SSwitch2 and LSwitch2, as illustrated in FIG. 2. Because, by this change, the output traffic of a link from LSwitch1 to SSwitch2 increases to "3", the output traffic of a link from LSwitch1 to SSwitch1 is reduced to "2".

Thus, there is a case where the output traffic can be equalized by individually changing the communication paths between VMs as described above.

However, such a method does not function in a next case. As illustrated in FIG. 3, the output traffic to Virtual router2 and the output traffic to Virtual router3 coincide on a link from SSwitch3 to a physical machine AServer3, however, it is impossible to avoid the coincidence of the output traffic even if the communication paths between the upper switch and the lower switch are changed in any patterns.

Similarly, as illustrated in FIG. 4, there is no substitute link with the link between LSwitch and VServer. Therefore, it is impossible to avoid a case where the latency becomes high when the output traffic of LSWitch1 from VM3 to VM2 via LSwitch1 and the output traffic of LSwitch1 from VM4 to VM1 through LSwitch1 coincide.

Patent Document 1: Japanese Laid-open Patent Publication No. 2012-94119

Patent Document 2: Japanese National Publication of International Patent Application No. 2012-511292

SUMMARY

An information processing system relating to this invention include: (A) plural first information processing apparatuses on which a virtual machine that belongs to either of plural subnets; (B) plural second information processing apparatuses on which a virtual router used for communication between subnets; (C) a controller that controls communication paths within a subnet, deployment of the virtual machine and deployment of the virtual router; and (D) plural switches that connects the plural first information processing apparatuses, plural second information processing apparatuses and the controller. In addition, the aforementioned plural switches includes: (d1) plural first switches that connect with the plural first information processing apparatuses; and (d2) plural second switches that connect with the plural second information processing apparatuses. Moreover, each of the plural first switches is connected with two or more second switches among the plural second switches. Furthermore, the aforementioned controller includes: a memory; and a processor configured to use the memory and execute a process. The process includes: (c1) selecting anyone of the virtual machine, the virtual router and a communication path within anyone of the plural subnets based on a predetermined evaluation value concerning a communication amount for each of the plural first information processing apparatuses and a predetermined evaluation value concerning a communication amount for each of the plural switches; and (c2) changing deployment destination of the selected virtual machine or the selected virtual router or the selected communication path with in a subnet.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 8 is a diagram depicting an example of data stored in a collected data storage unit;
FIG. 9 is a diagram depicting an example of data stored in the collected data storage unit.

FIG. 14 is a diagram depicting calculation examples of evaluation values for Virtual object or the like;

FIG. 15 is a diagram depicting calculation examples of evaluation values for Virtual object or the like;

FIG. 16 is a diagram depicting calculation examples of evaluation values for Virtual object or the like;

FIG. 17 is a diagram depicting calculation examples of evaluation values for Virtual object or the like;

FIG. 18 is a diagram depicting calculation examples of evaluation values for Virtual object or the like;

FIG. 19 is a diagram depicting calculation examples of evaluation values for Virtual object or the like;

FIG. 20 is a diagram depicting calculation examples of evaluation values for Virtual object or the like;

DESCRIPTION OF EMBODIMENTS

Figure 1:
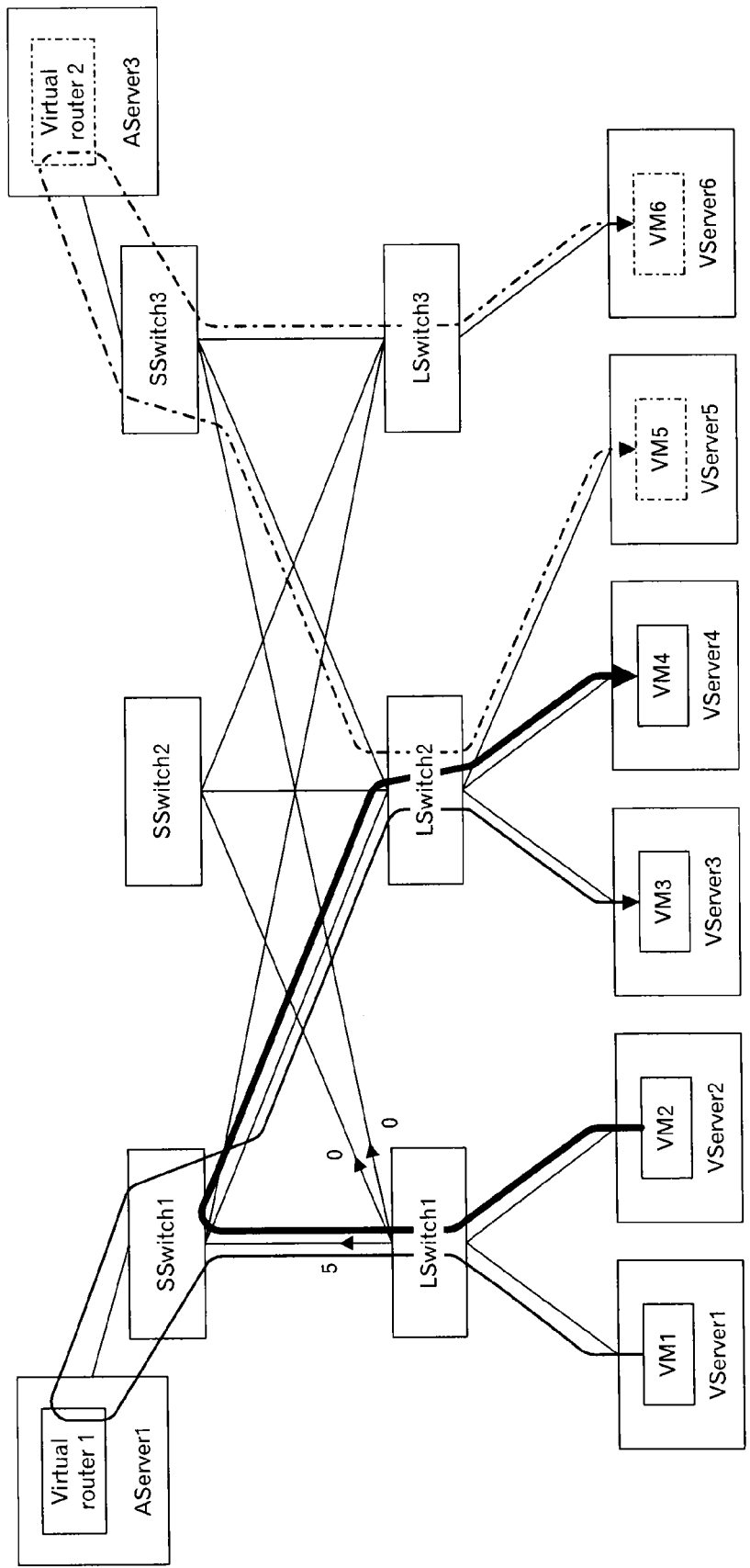
FIG. 1 is a diagram to explain a conventional art.
Figure 2:
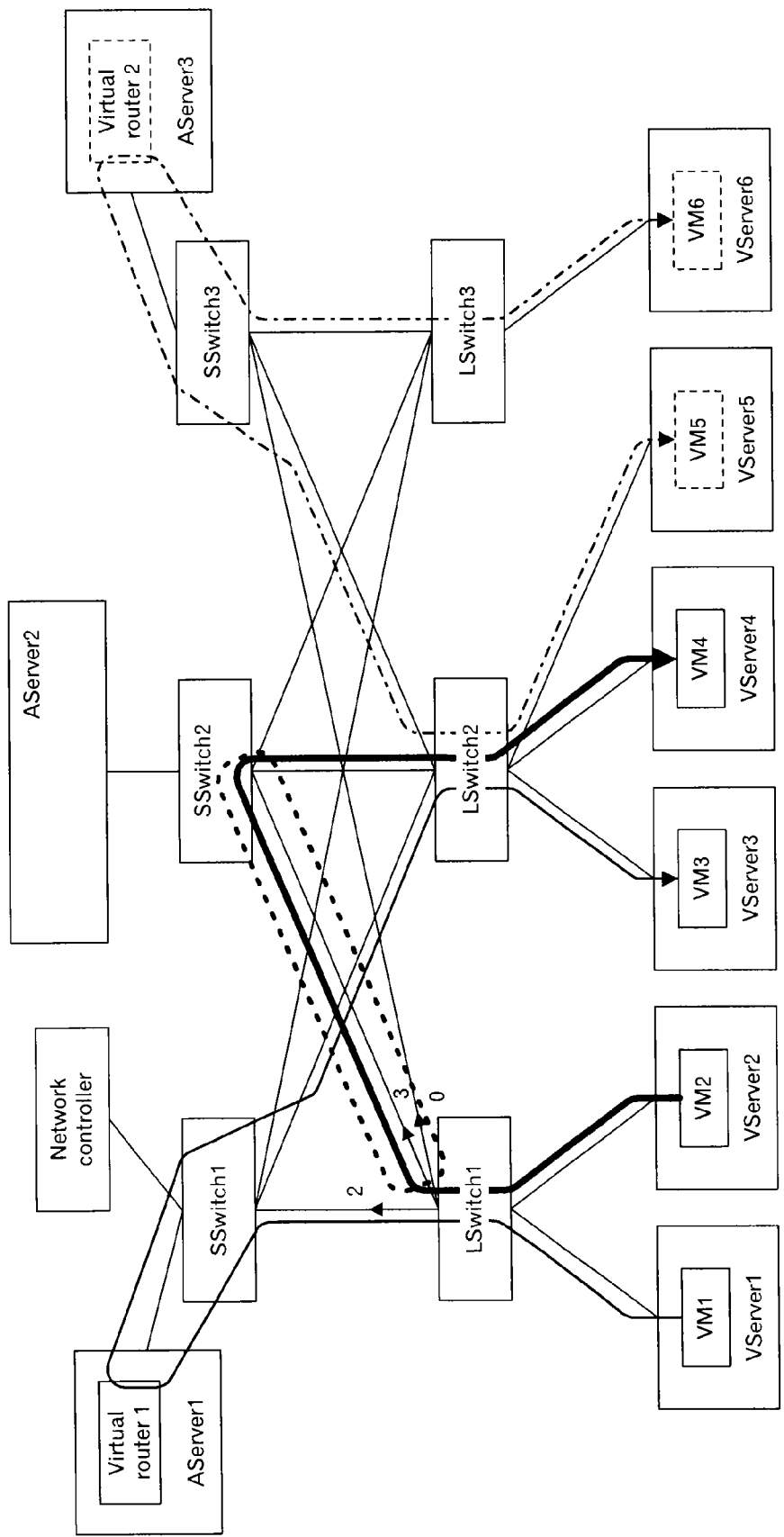
FIG. 2 is a diagram to explain the conventional art.
Figure 3:
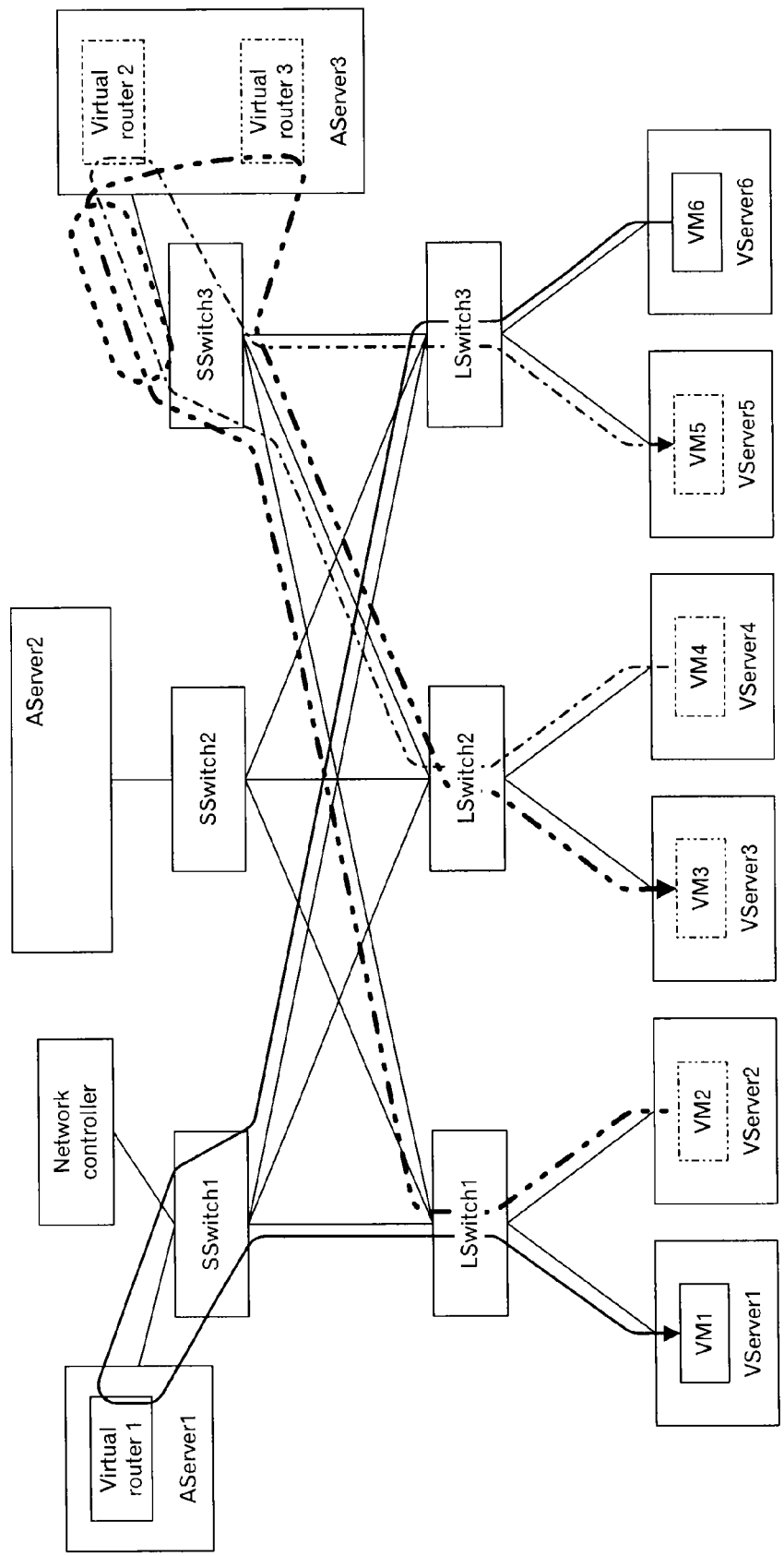
FIG. 3 is a diagram to explain the conventional art.
Figure 4:
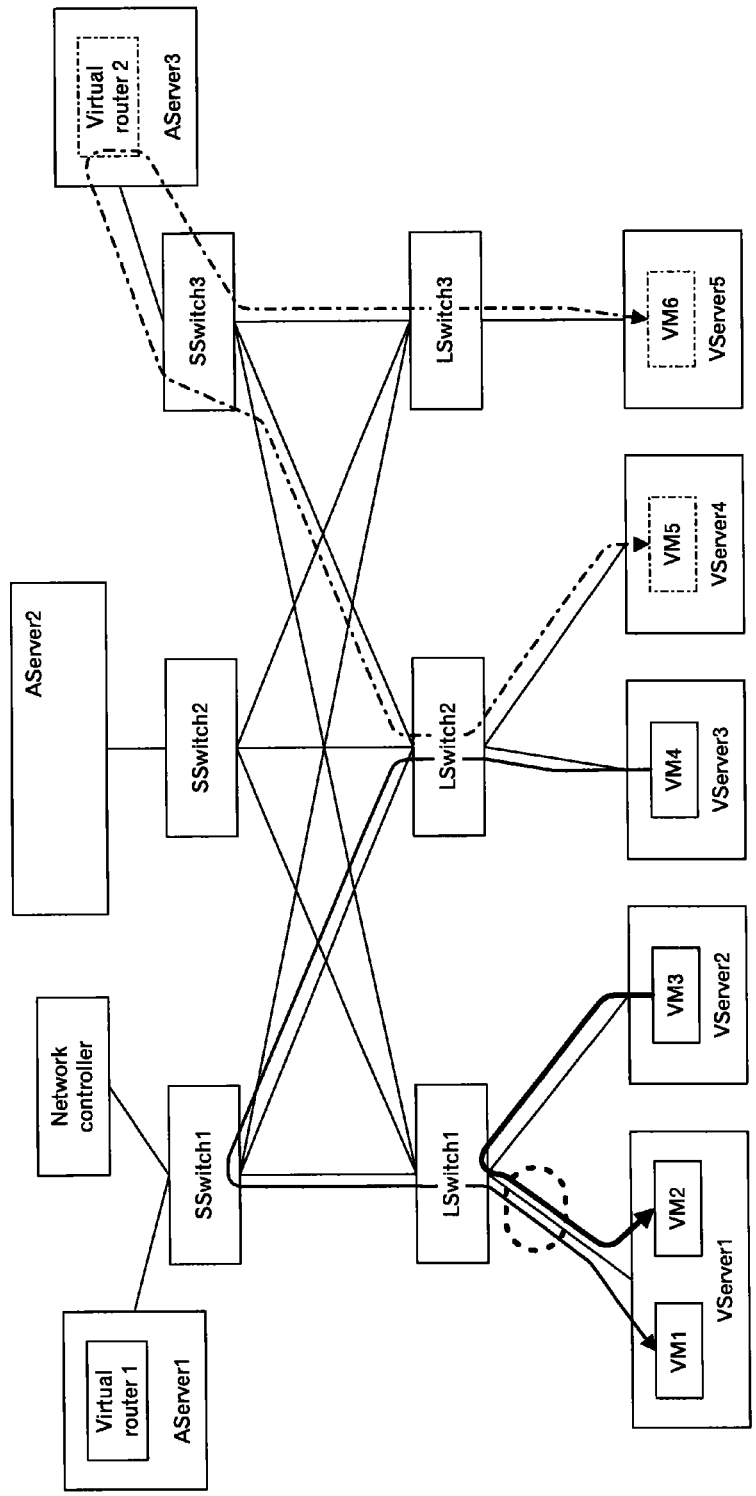
FIG. 4 is a diagram to explain the conventional art.
Figure 5:
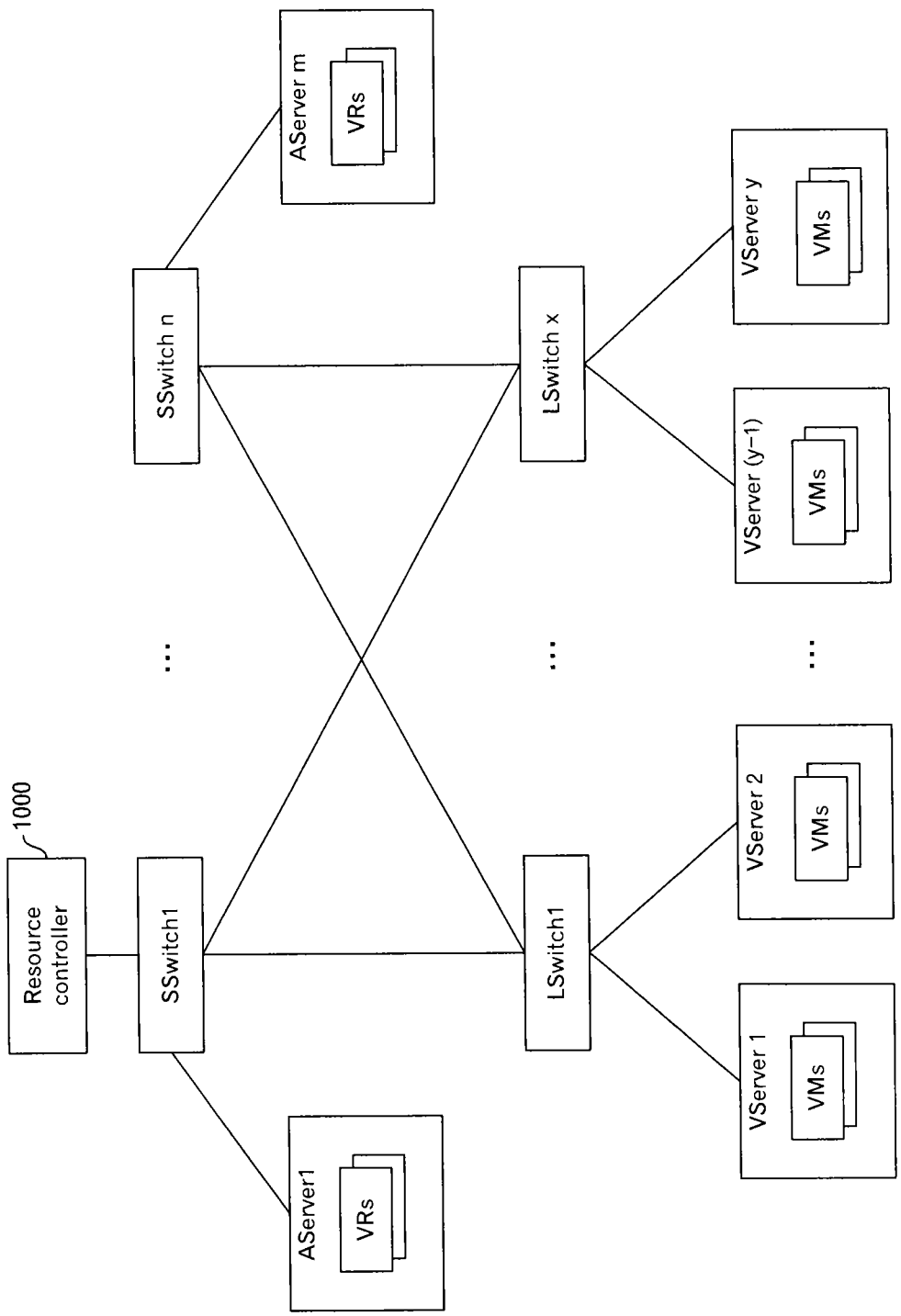
FIG. 5 is a diagram depicting an information processing system relating to an embodiment.

FIG. 5 illustrates an example of a system assumed in this embodiment. As illustrated in FIG. 5, the system includes upper switches SSwitch1 to n (also called "Spine Switch"), lower switches LSwitch1 to x (also called "Leaf Switch"), physical machines VServer1 to y that a virtual machine VM can be deployed and to which a virtual machine VM can be moved, physical machines AServer1 to m (also called "Appliance Server") that a Virtual router (hereinafter, also denoted "VR") can be deployed and to which a Virtual router can be moved and a resource controller 1000 that performs a main processing in this embodiment.

The physical machine VServer is connected to either of the lower switches LSwitches. The lower switch LSwitch is connected to two or more upper switches SSwitches among the upper switches SSwitches. Preferably, the lower switch LSwitch is connected to each of the upper switches SSwitches connected to AServer.

AServer is connected to either of the upper switches SSwitches. The resource controller 1000 is connected to either of the upper switches SSwitches.

Figure 6:
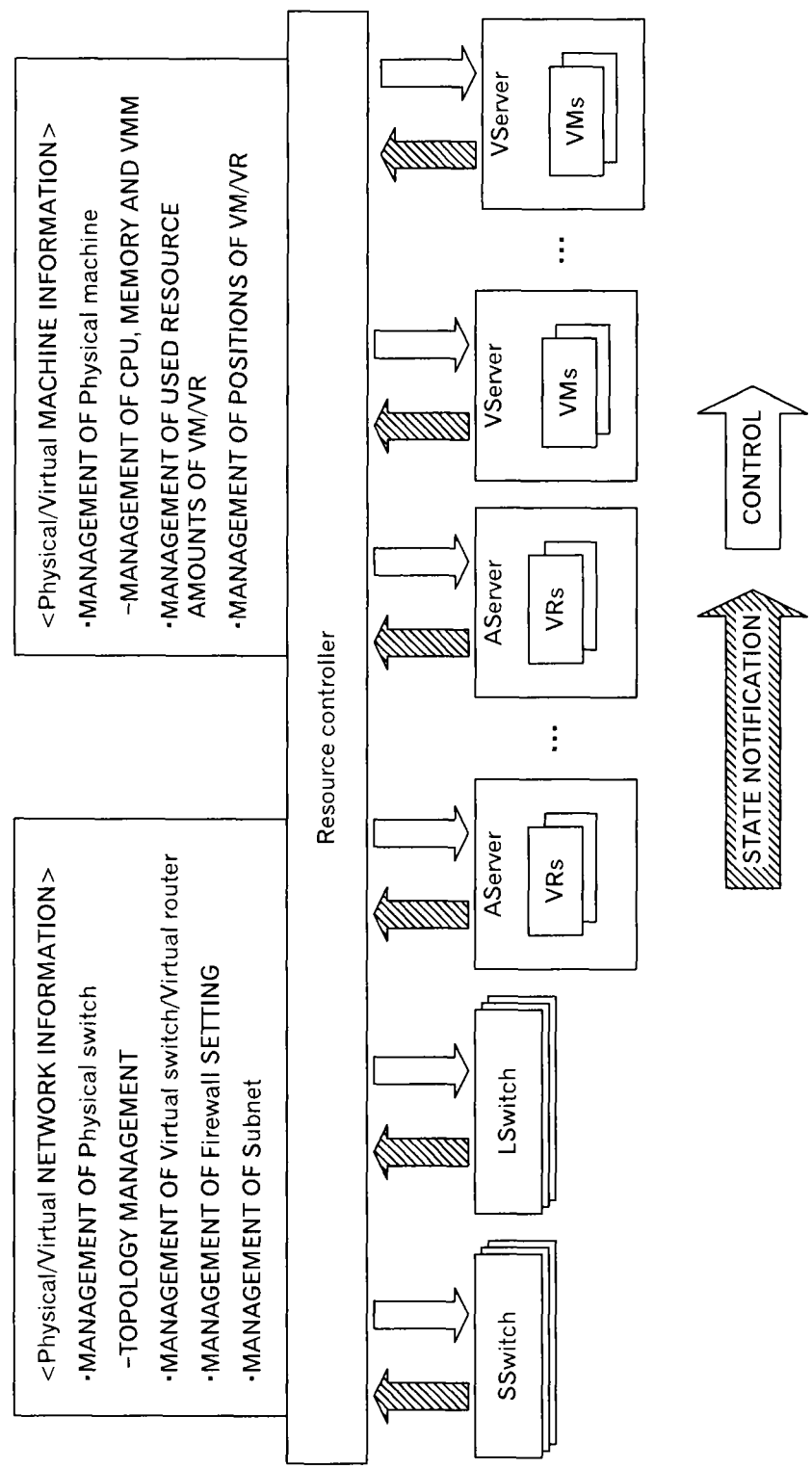
FIG. 6 is a diagram depicting an outline of functions of a resource controller.

FIG. 6 illustrates an outline of functions of the resource controller 1000. The resource controller 1000 collects types of information from SSwitch, LSwitch, AServer and VServer to control those physical apparatuses, VRs on AServer, VMs on VServer and the like.

In order to perform the control, the resource controller 1000 performs management of physical switches, which includes topology management, management of virtual switches and virtual routers, management of firewalls, management of subnets and the like in association with information on the physical and virtual networks. In this embodiment, the communication path within a subnet in each tenant is called "L2-Tree".

Moreover, the resource controller 1000 performs management of physical machines, management of used resource amounts of virtual machines and virtual routers, management of VM positions and VR positions and the like in association with information on the physical machines and virtual machines. The management of the physical machines includes management of Central Processing Unit (CPU), memory, Virtual Machine Manager (VMM) and the like. Hereinafter, VM and VR are generally called "virtual objects". In addition, the physical switch, physical machine and switch are generally called "physical apparatuses" or "Physical Machines (PMs)".

Figure 7:
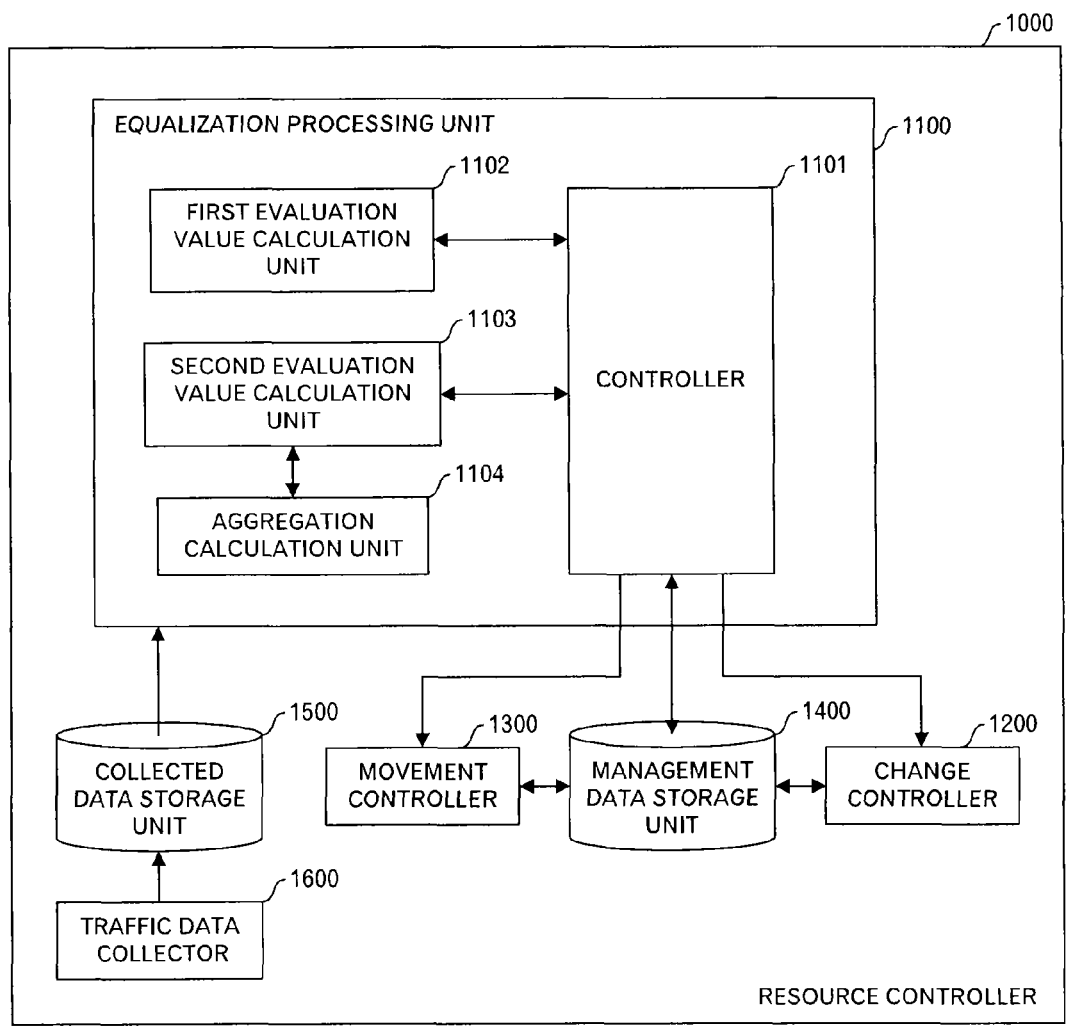
FIG. 7 is a functional block diagram of the resource controller.

Specifically, the resource controller 1000 has a configuration as illustrated in FIG. 7, which is associated with this embodiment. The resource controller 1000 has an equalization processing unit 1100 that performs a main processing in this embodiment, a change controller 1200 that changes L2-Tree, a movement controller 1300 that performs movement control of virtual objects, a management data storage unit 1400, a collected data storage unit 1500 and a traffic data collector 1600.

The equalization processing unit 1100 has a controller 1101, a first evaluation value calculation unit 1102, a second evaluation value calculation unit 1103 and an aggregation calculation unit 1104. The controller 1101 performs a processing to control the first evaluation value calculation unit 1102 and second evaluation value calculation unit 1103, and instructs the movement controller 1300 and change controller 1200 to perform their processing.

The first evaluation value calculation unit 1102 calculates an evaluation value based on output traffic of each physical apparatus. The aggregation calculation unit 1104 focuses on a physical apparatus based on the evaluation value calculated by the first evaluation value calculation unit 1102, and performs a processing to aggregate the output traffic of the selected physical apparatus in predetermined units. The second evaluation value calculation unit 1103 calculates an evaluation value of a physical apparatus when an object to be moved or to be changed (VM, VR or L2-Tree), which is selected by using a processing result of the aggregation calculation unit 1104, is provisionally moved.

The management data storage unit 1400 stores information on the physical and virtual networks and information on the physical machines and virtual machines. More specifically, the management data storage unit 1400 stores, as data associated with this embodiment, deployment position data of VM and VR, correlation data that correlates L2-Tree with Virtual Local Area Network (VLAN), correlation data that correlates a tenant ID with a VLAN ID, correlation data that correlates L2-Tree with SSwitch through which the traffic of L2-Tree passes, IDs of VMs that belong to each subnet, and subnets for which each VR performs routing.

The traffic data collector 1600 collects data of traffic from each physical apparatus, and stores collected data in the collected data storage unit 1500. The collected data storage unit 1500 stores data as illustrated in FIGS. 8 and 9, for example.

FIG. 8 illustrates an example of traffic data for each physical port. Here, an example that data is stored for each hour, however, the interval is arbitrary such as one day. In the example of FIG. 8, a time, a combination of an ID and a port number of PM, and output traffic are registered. As for the port number, in case where PM is a physical switch, a port number of the physical port is set, and in case where PM is VServer or AServer, no data is set or a fixed port number is set. As for the output traffic, a link utilization ratio, an average communication speed, a data amount or the number of packets is set, however, in FIG. 8, the communication speed is set.

Moreover, FIG. 9 illustrates traffic data for each flow. Here, FIG. 9 illustrates an example that data is stored for each hour, and the interval is arbitrary such as one day. In the example of FIG. 9, a time, an ID of PM, a port number, a TID (i.e. tenant ID), a combination of SIP (Source IP address) and DIP (Destination IP address), and output traffic are registered. By the ID of PM, the port number, the TID, and the combination of SIP and DIP, an individual flow from the transmission source VM to the transmission destination VM is identified.

The first evaluation value calculation unit 1102 performs a processing by using traffic data of the physical port, mainly, as illustrated in FIG. 8. The aggregation calculation unit 1104 performs a processing by using traffic data for each flow, mainly, as illustrated in FIG. 9. The second evaluation value calculation unit 1103 performs a processing by using data as illustrated in FIGS. 8 and 9.

Next, an outline of processing contents of the resource controller 1000 will be explained by using FIGS. 10 to 25.

Figure 10:
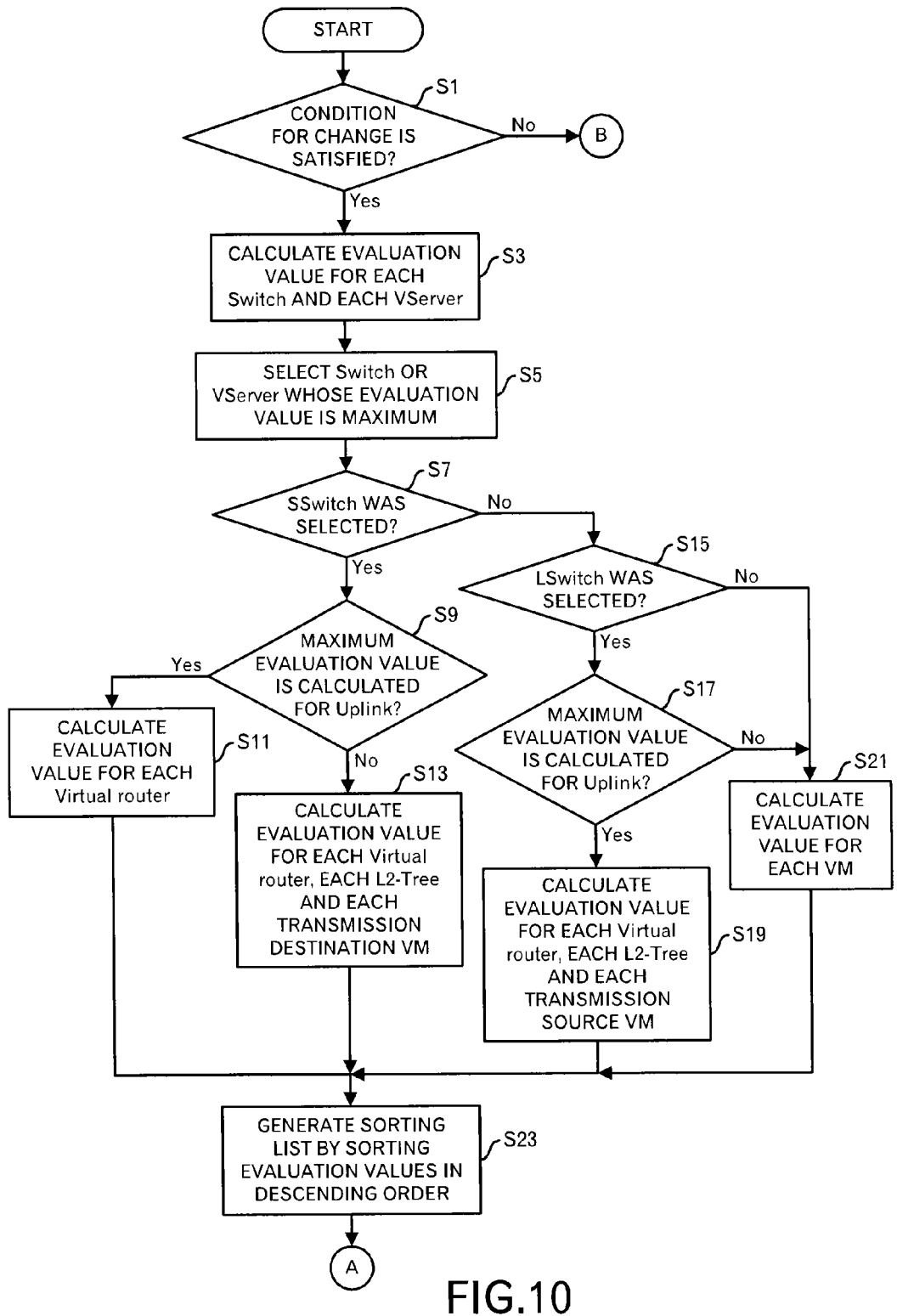
FIG. 10 is a diagram depicting a processing flow relating to this embodiment.

Firstly, the controller 1101 of the equalization processing unit 1100 determines whether or not a condition that a deployment destination of VM or VR or L2-Tree should be changed is satisfied (FIG. 10: step S1). For example, it is determined whether or not a condition that the network is congested (e.g. output traffic that is equal to or greater than a threshold is detected for any of physical links), or a condition that a difference between the maximum value and the minimum value among evaluation values of VServers, SSwitches and LSwitches, which are obtained by executing step S3, which will be explained later, in advance, is equal to or greater than a threshold is satisfied.

When the condition at the step S1 is not satisfied, the processing ends through terminal B. In other words, this processing ends at this timing. This processing may be performed periodically, such as every day or every one hour, and may be performed in response to an instruction from an administrator or the like.

On the other hand, when the condition at the step S1 is satisfied, the controller 1101 instructs the first evaluation value calculation unit 1102 to calculate an evaluation value for each of the physical switches (SSwitch and LSwitch) and VServers by using data stored in the collected data storage unit 1500 (step S3). For example, the evaluation value is an average value or maximum value of the output traffic of the physical apparatuses that are other than AServer.

Figure 11:
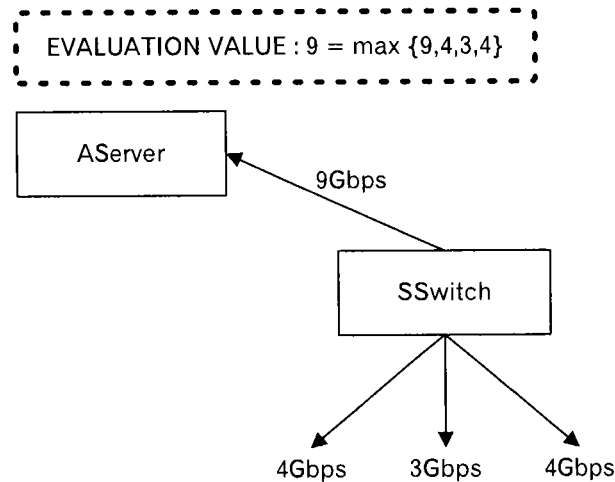
FIG. 11 is a diagram depicting calculation examples of evaluation values.

The evaluation value of SSwitch will be explained by using FIG. 11. For example, it is assumed that the output traffic for Uplink to AServer is 9 Gbps, the output traffic for first Downlink is 4 Gbps, the output traffic for second Downlink is 3 Gbps, and the output traffic for third Downlink is 4 Gbps. Then, when the evaluation value is defined as the maximum value of output traffic, "9" is calculated as the evaluation value.

Figure 12:
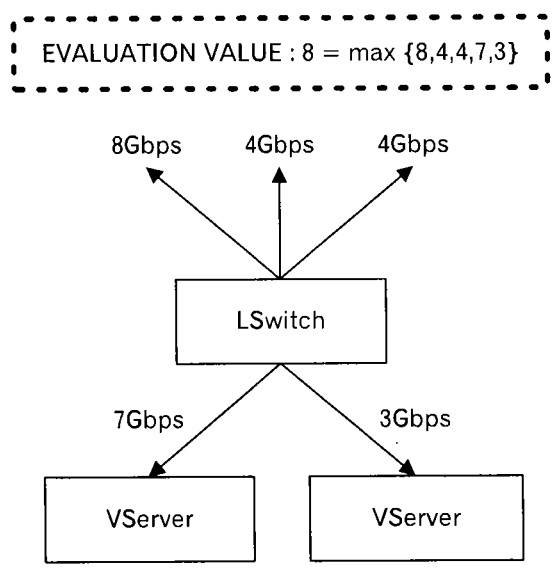
FIG. 12 is a diagram depicting calculation examples of evaluation values.

Moreover, the evaluation value for LSwitch will be explained by using FIG. 12. For example, it is assumed that the output traffic for Downlink to first VServer is 7 Gbps, the output traffic for Downlink to second VServer is 3 Gbps, the output traffic for Uplink to first SSwitch is 8 Gbps, the output traffic for Uplink to second SSwitch is 4 Gbps, and the output traffic for Uplink to third SSwitch is 4 Gbps. Then, when the evaluation value is defined as the maximum value of output traffic, "8" is calculated as the evaluation value.

Figure 13:
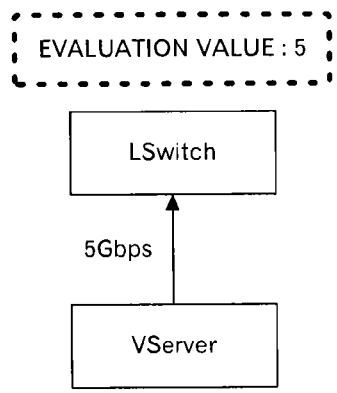
FIG. 13 is a diagram depicting calculation examples of evaluation values.

Furthermore, the evaluation value of VServer will be explained by using FIG. 13. For example, it is assumed that the output traffic for Uplink to LSwitch is 5 Gbps. Then, when the evaluation value is defined as the maximum value of the output traffic, "5" is calculated as the evaluation value.

The first evaluation value calculation unit 1102 selects a physical apparatus whose evaluation value is the maximum (i.e. physical apparatus other than AServer) (step S5). Thus, it is possible to narrow the physical apparatuses for which a flow aggregation processing should be performed, by using the simple processing.

Then, when SSwitch was selected at the step S5 (step S7: Yes route), the first evaluation value calculation unit 1102 determines whether or not the physical port whose evaluation value is the maximum for the selected SSwitch is a port for Uplink (step S9). When the condition at the step S9 is satisfied, the first evaluation value calculation unit 1102 outputs data concerning the ID of SSwitch selected at the step S5 and representing that "Uplink" is applicable to the controller 1101. Then, the controller 1101 designates the ID of SSwitch selected at the step S5, the ID of Virtual router activated on AServer that is connected to that SSwitch, and the like, and instructs the second evaluation value calculation unit 1103 to calculate an evaluation value.

In response to the instruction from the controller 1101, the second evaluation value calculation unit 1103 cooperates with the aggregation calculation unit 1104 to calculate an evaluation value for each Virtual router (step S11). Then, the processing shifts to step S23.

Figure 14:
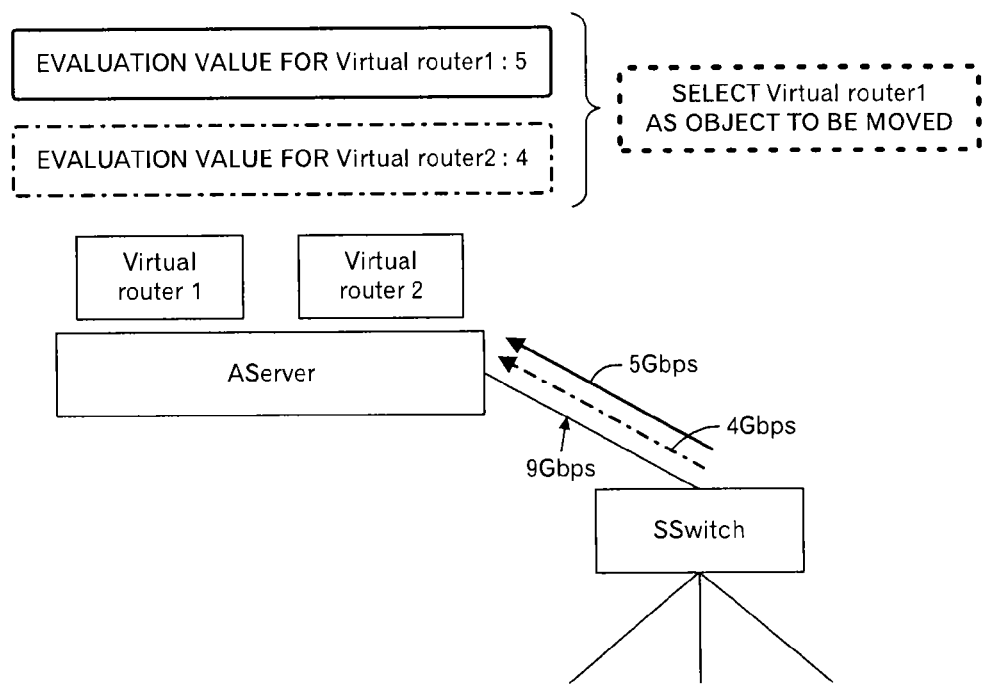

For example, as illustrated in FIG. 14, when SSwitch is selected at step S5 because the evaluation value for Uplink of SSwitch is "9", the aggregation calculation unit 1104 aggregates the output traffic from Virtual router1 and aggregates the output traffic from Virtual router2. More specifically, traffic between VMs that belongs to a first subnet for which Virtual router1 performs the routing and VMs that belong to a second subnet for which Virtual router1 performs the routing are aggregated, and traffic between VMs that belongs to a third subnet for which Virtual router2 performs the routing and VMs that belong to a fourth subnet for which Virtual router2 performs the routing are aggregated.

Then, as illustrated in FIG. 14, the output traffic from Virtual router1 is aggregated as "5 Gbps", and the output traffic from Virtual router2 is aggregated as "4 Gbps". Therefore, the second evaluation value calculation unit 1103 calculates "5" as the evaluation value for Virtual router1 and "4" as the evaluation value for Virtual router2 from the aggregation results.

On the other hand, when the condition at the step S9 is not satisfied, the first evaluation value calculation unit 1102 outputs data concerning the ID of SSwitch selected at the step S5 and representing that "Downlink" is applicable to the controller 1101. Then, the controller 1101 designates the ID of SSwitch selected at the step S5, data of L2-Tree, which is correlated with that SSwitch, the ID (e.g. IP address) of Virtual router activated on AServer, which is connected to that SSwitch, the ID of each VM (e.g. IP address) and the like, and instructs the second evaluation value calculation unit 1103 to calculate the evaluation value.

In response to the instruction from the controller 1101, the second evaluation value calculation unit 1103 cooperates with the aggregation calculation unit 1104 to calculate an evaluation value for each Virtual router, each L2-Tree and each destination VM (step S13). Then, the processing shifts to the step S23.

Figure 15:
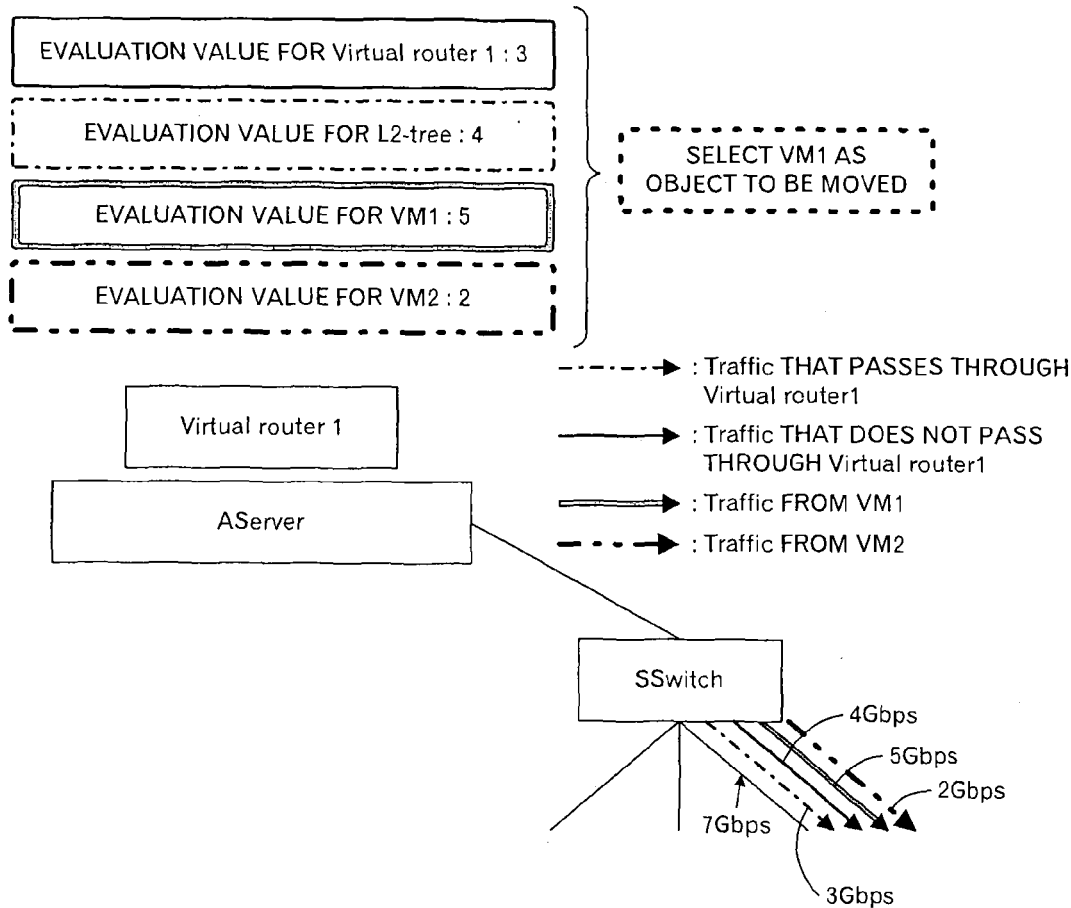

For example, as illustrated in FIG. 15, when SSwitch was selected at the step S5 because the evaluation value for one Downlink of SSwitch is 7 Gbps, the aggregation calculation unit 1104 aggregates the output traffic from VM1 and aggregates the output traffic from VM2. Moreover, as another aspect, the aggregation calculation unit 1104 aggregates the output traffic that passes through Virtual router1 activated on AServer, which is connected with this SSwitch (i.e. the output traffic in the communication between subnets), and aggregates the output traffic that does not pass through Virtual router1 (i.e. the output traffic in the communication within a subnet).

In other words, a relationship of "the output traffic of the physical link=the output traffic that passes through Virtual router+the output traffic of respective L2-Tree=the total sum of the output traffic of the transmission destination VM" holds.

In the example of FIG. 15, the output traffic from VM1 is aggregated as 5 Gbps, and the output traffic from VM2 is aggregated as 2 Gbps. Moreover, the output traffic that passes through Virtual router1 is aggregated as 3 Gbps, and the output traffic that does not pass through Virtual router1 are aggregated as 4 Gbps. The aggregation calculation unit 1104 calculates, from the aggregation results, "5" as the evaluation value of VM1, "2" as the evaluation value of VM2, "3" as the evaluation value of Virtual router1 and "4"

as the evaluation value of L2-Tree (i.e. subnet) that is correlated with this SSwitch. Here, it is assumed that the number of subnets is "1".

Figure 16:
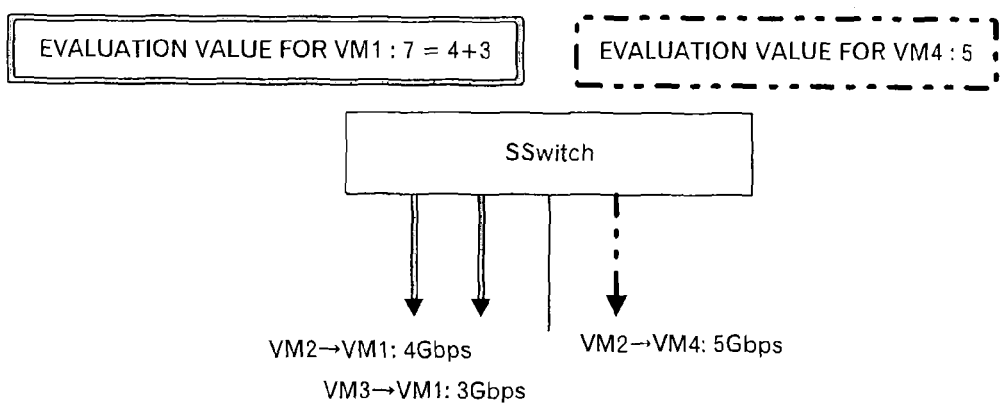

As illustrated in FIG. 16, if Downlink of SSwitch is focused on, because it is not connected with AServer and there is no output traffic that passes through Virtual router, the output traffic is aggregated for each transmission destination VM. In the example of FIG. 16, the output traffic from VM1 is a sum of the output traffic from VM2 and the output traffic from VM3. On the other hand, the output traffic from VM4 is the same as the output traffic from VM2. Because the output traffic of Downlink of SSwitch does not change even when the transmission source VM would be selected in the later processing, the transmission destination VM is focused on.

When the physical apparatus selected at the step S5 is not SSwitch (step S7: No route) and LSwitch is selected (step S15: Yes route), the first evaluation value calculation unit 1102 determines whether or not the physical port whose evaluation value is the maximum for the selected SSwitch is an Uplink port (step S17). When the condition at the step S17 is satisfied, the first evaluation value calculation unit 1102 outputs data concerning the ID of LSwitch selected at the step S5 and representing that "Uplink" is applicable to the controller 1101. Then, the controller 1101 designates the ID of LSwitch selected at the step S5, the ID of each Virtual router, the ID of each VM and the like, and instructs the second evaluation value calculation unit 1103 to calculate an evaluation value.

In response to the instruction from the controller 1101, the second evaluation value calculation unit 1103 cooperates with the aggregation calculation unit 1104 to calculate an evaluation value for each Virtual router, each L2-Tree and each transmission source VM (step S19). Then, the processing shifts to the step S23.

Figure 17:
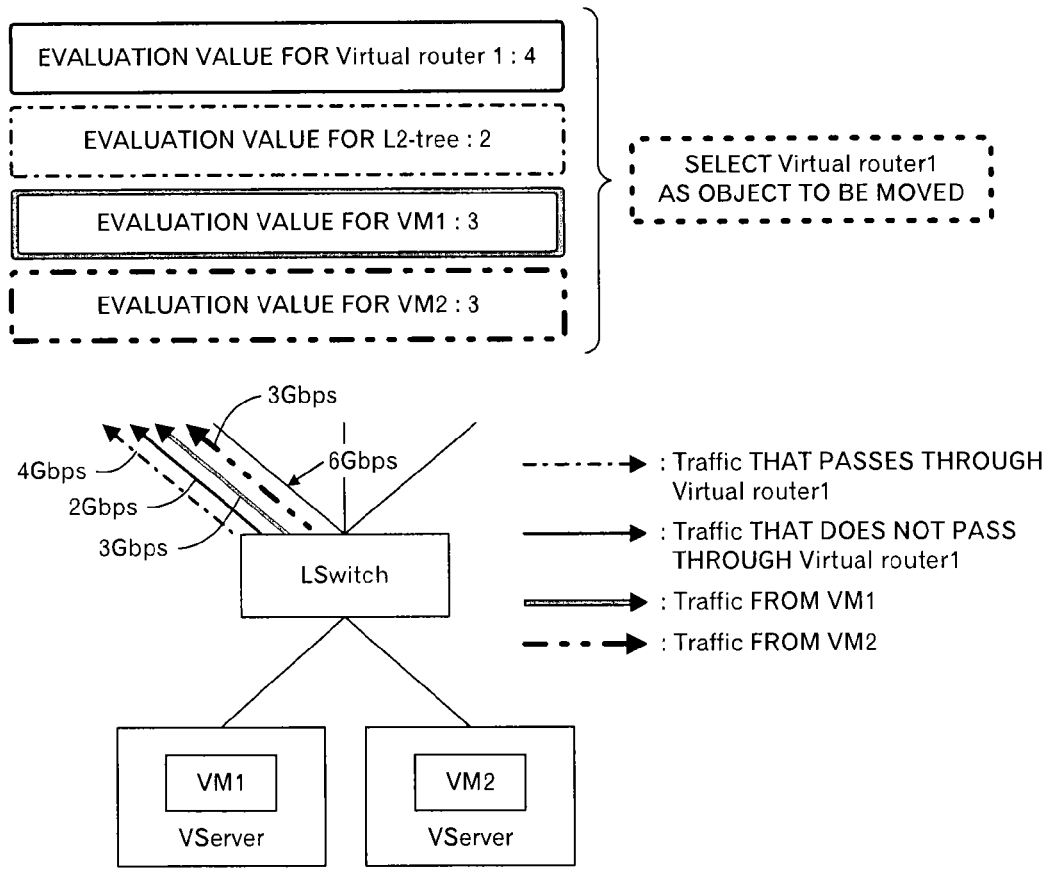
Figure 18:
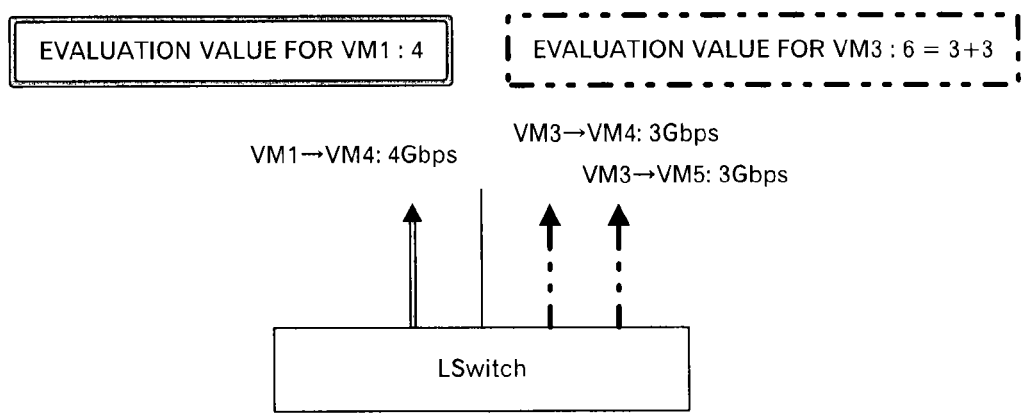

For example, as illustrated in FIG. 17, when the LSwitch is selected at the step S5 because the evaluation value of one Uplink of LSwitch is "6 Gbps", the aggregation calculation unit 1104 aggregates the output traffic from VM1, and aggregates the output traffic from VM2. Moreover, as another aspect, the aggregation calculation unit 1104 aggregates the output traffic that passes through Virtual router1 (i.e. the output traffic in the communication between subnets), and aggregates the output traffic that does not pass through Virtual router1 (i.e. the output traffic in the communication within the subnet).

Also here, a relationship of "the output traffic of the physical link=the output traffic that passes through Virtual router+the output traffic for respective L2-Tree=the total sum of the output traffic of the transmission destination VW" holds.

In the example of FIG. 17, the output traffic from VM1 is aggregated as "3 Gbps", and the output traffic from VM2 is aggregated as "3 Gbps". Moreover, the output traffic that passes through Virtual router1 is aggregated as "4 Gbps", and the output traffic that does not pass through Virtual router1 are aggregated as "2 Gbps". The aggregation calculation unit 1104 calculates, from the aggregation results, "3" as the evaluation value of VM1, "3" as the evaluation value of VM2, "4" as the evaluation value of Virtual router1, and "2" as the evaluation value of L2-Tree (subnet), which is correlated with this SSwitch. Here, it is assumed that the number of subnets is "1".

When there is no output traffic that passes through Virtual router and Uplink of LSwitch is focused on, the output traffic for each transmission source VM is aggregated. In an example of FIG. 18, the output traffic from VM1 is the same as the output traffic from VM4. On the other hand, the output traffic from VM3 is a sum of the output traffic from VM4 and the output traffic from VM5. Because the output traffic of Uplink of LSwitch does not change even when the destination VM would be selected in the later processing, the transmission source VM is focused on.

On the other hand, when the condition at the step S17 is not satisfied or when a specific VServer was selected at the step S5 (step S17: No route, or step S15: No route), the first evaluation value calculation unit 1102 outputs, to the controller 1101, data concerning the ID of LSwitch selected at the step S5 and representing that "Downlink" is applicable, or data concerning the ID of VServer selected at the step S5. Then, the controller 1101 designates the ID of LSwitch selected at the step S5 or the ID of VServer, the ID of each VM and the like, and instructs the second evaluation value calculation unit 1103 to calculate the evaluation value.

In response to the instruction from the controller 1101, the second evaluation value calculation unit 1103 cooperates with the aggregation calculation unit 1104 to calculate an evaluation value of each VM (step S21). Then, the processing shifts to the step S23.

Figure 19:
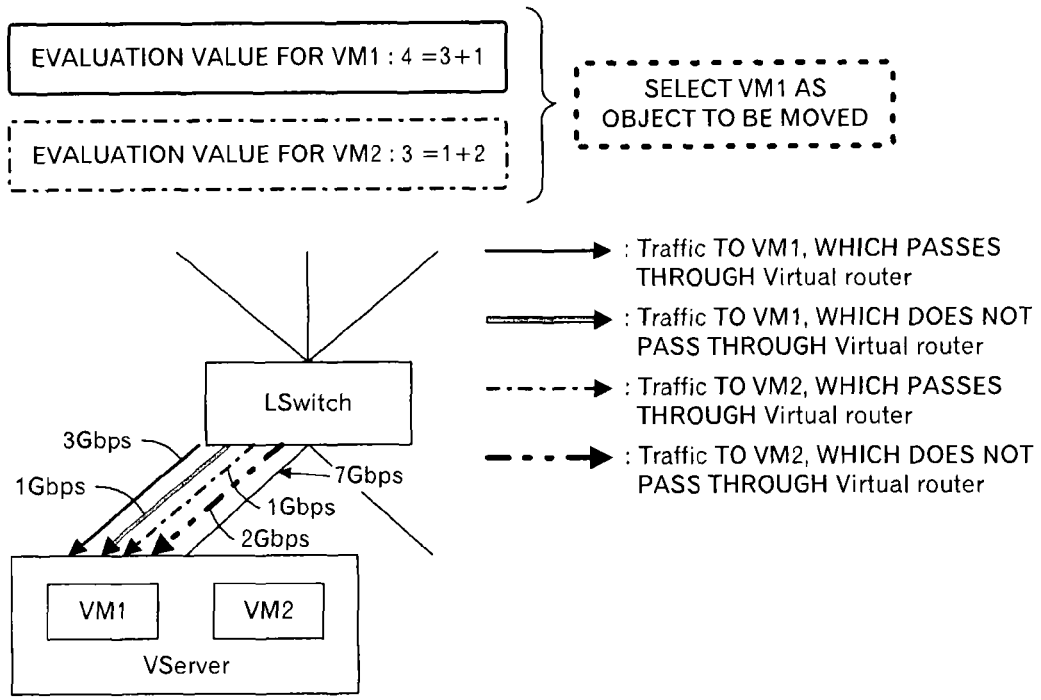

When Downlink of LSwitch is selected, the output traffic is aggregated for each transmission destination VM. As illustrated in FIG. 19, when the LSwitch was selected at the step S5 because the evaluation value of one Downlink of LSwitch is "7", the aggregation calculation unit 1104 aggregates the output traffic from VM1, and aggregates the output traffic from VM2.

In an example of FIG. 19, 4 Gbps is obtained by adding 3 Gbps of the output traffic to VM1, which passes through Virtual router, and 1 Gbps of the output traffic to VM1, which does not pass through Virtual router. Similarly, 3 Gbps is obtained by adding 1 Gbps of the output traffic to VM2, which passes through Virtual router, and 2 Gbps of the output traffic to VM2, which does not pass through Virtual router.

Therefore, the aggregation calculation unit 1104 calculates "4" as the evaluation value of VM1, and "3" as the evaluation value of VM2 from the aggregation results.

Figure 20:
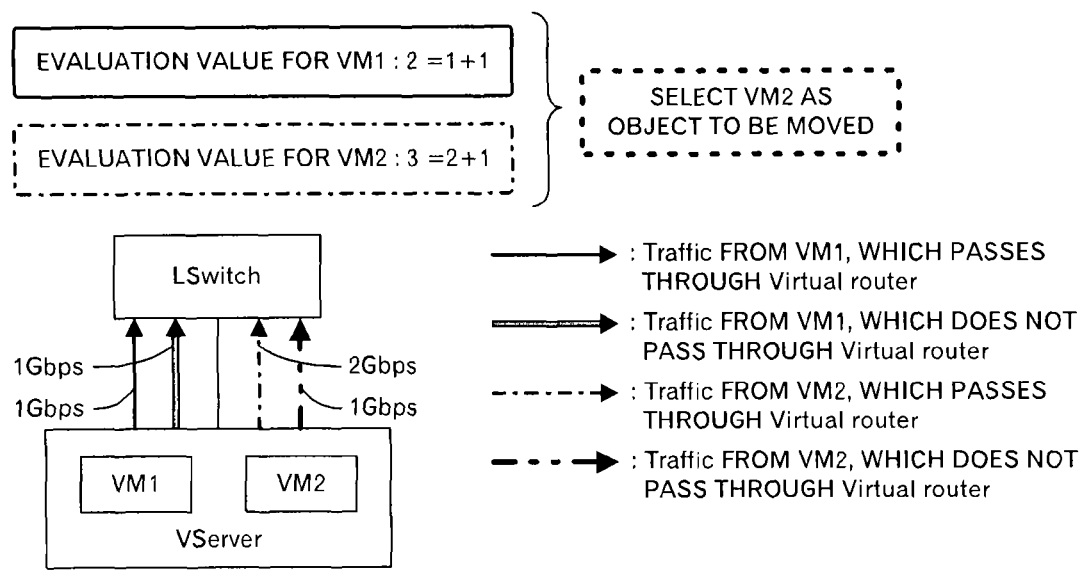

Moreover, in case where VServer was selected, the output traffic for each transmission source VM is aggregated. As illustrated in FIG. 20, when VServer was selected at the step S5 because the physical link from VServer is 5 Gbps, the aggregation calculation unit 1104 aggregates the output traffic from VM1, and aggregates the output traffic from VM2.

In the example of FIG. 20, 2 Gbps is obtained by adding 1 Gbps of the output traffic from VM1, which passes through Virtual router, and 1 Gbps of the output traffic from VM1, which does not pass through Virtual router. Similarly, 3 Gbps is obtained by adding 2 Gbps of the output traffic from VM2, which passes through Virtual router, and 1 Gbps of the output traffic from VM2, which does not pass through Virtual router.

Therefore, the aggregation calculation unit 1104 calculates "2" as the evaluation value of VM1 and "3" as the evaluation value of VM2 from the aggregation results.

After that, the second evaluation value calculation unit 1103 generates a sorting list by sorting movement candidates (VMs, VRs and L2-Tree) for which the evaluation values were calculated in descending order of the evaluation value, and outputs the sorting list to the controller 1101 (step S23). The processing shifts to a processing in FIG. 22 through the terminal A.

In the example of FIG. 14, a sorting list whose top is Virtual router1 is generated. In the example of FIG. 15, a sorting list in which objects are listed in order of VM1, L2-Tree, VR1 and VM2 is generated. In the example of FIG. 17, a sorting list in which objects are listed in order of VR1, VM1, VM2 and L2-Tree is generated. In the example of FIG. 19, a sorting list whose top is VM1 is generated. In the example of FIG. 20, a sorting list whose top is VM2 is generated.

Figure 21:
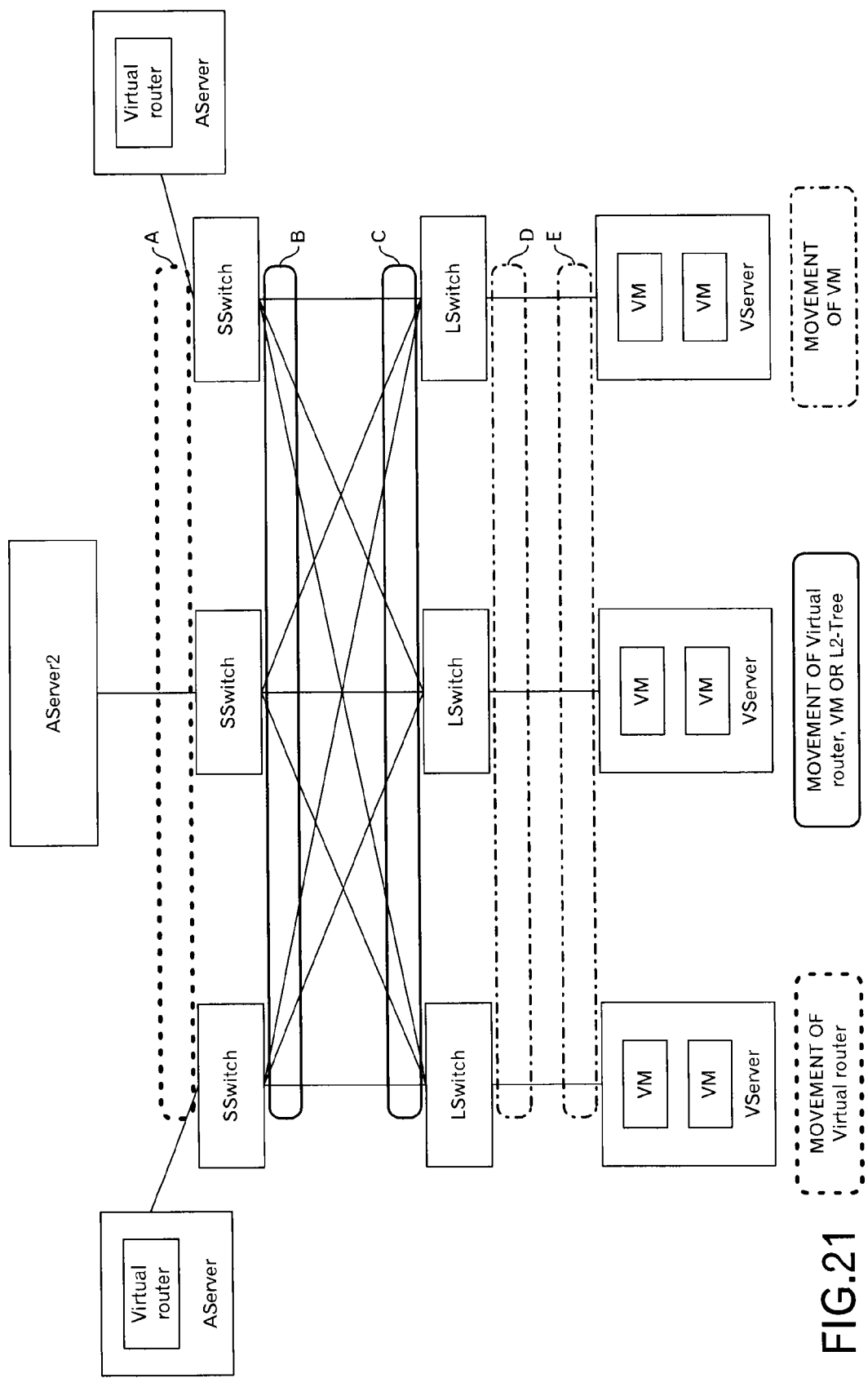
FIG. 21 is a diagram schematically depicting a relationship between a physical link and an object to be moved.

The summary of the aforementioned matters is as illustrated in FIG. 21. In other words, when Uplink (A in FIG. 21) of SSwitch is selected, Virtual router is an object to be moved. Moreover, when Downlink of SSwitch (B in FIG. 21) or Uplink of LSwitch (C in FIG. 21) is selected, Virtual router, VM or L2-Tree is an object to be moved. Furthermore, when Downlink of LSwitch (D in FIG. 21) or link of VServer (E in FIG. 21) is selected, VM is an object to be moved.

Figure 22:
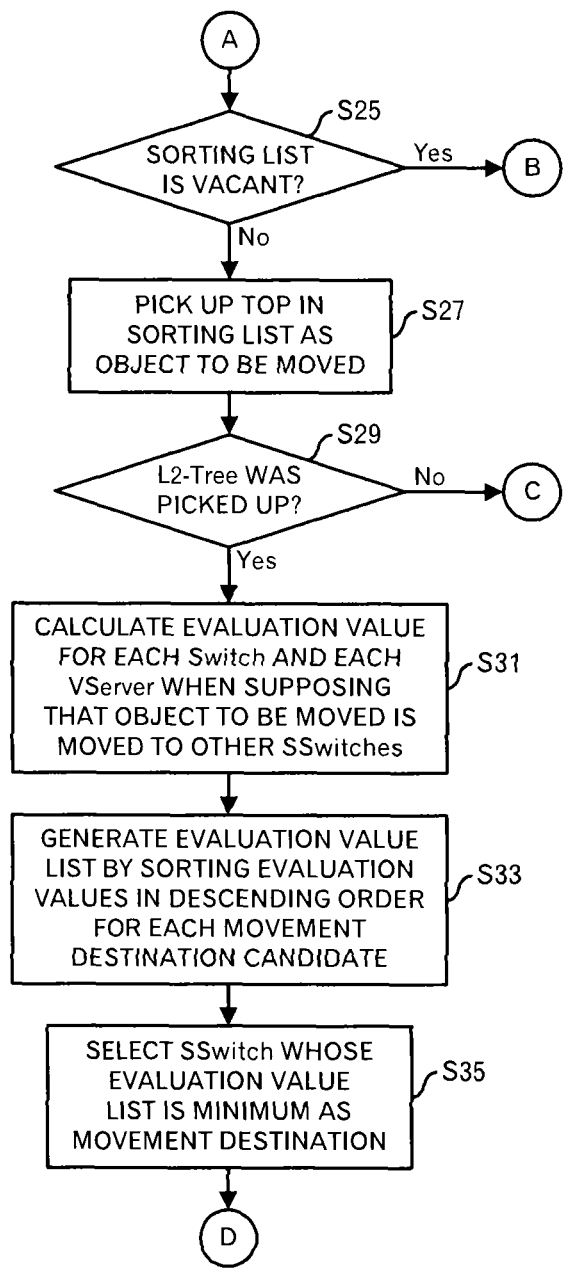
FIG. 22 is a diagram depicting a processing flow relating to this embodiment.

Shifting to the explanation of the processing in FIG. 22, the controller 1101 determines whether or not the sorting list becomes vacant (step S25). Because, in the following processing, an object to be moved is picked up from the top of the sorting list, it is initially determined that the sorting list is not vacant. When the sorting list becomes vacant, the output traffic of the physical link cannot be equalized any more, therefore, the processing ends at this timing.

On the other hand, when the sorting list is not vacant, the controller 1101 picks up the top of the sorting list as an object to be moved (step S27). VM, VR or L2-Tree is picked up.

Then, the controller 1101 determines whether or not the object to be moved is L2-Tree (step S29). When the object to be moved is not L2-Tree, the processing shifts to a processing in FIG. 23 through terminal C.

On the other hand, when the object to be moved is L2-Tree, the controller 1101 causes the first evaluation value calculation unit 1102 to calculate an evaluation value of each switch and each VServer in case where it is supposed that L2-Tree is moved to other SSwitches (step S31). In this processing, when there are plural other SSwitches, the evaluation value of each switch and each VServer is calculated by handling each of other SSwitches as the movement destination candidates, similarly to the step S3. However, the evaluation value is calculated only for some specific switches or the like, because the evaluation value changes only for those switches, depending on the object to be moved. The processing of this step will be explained in detail later.

Then, the controller 1101 generates an evaluation value list for each movement destination candidate by sorting the evaluation values in descending order (step S33). For example, when the evaluation values are calculated as [0, 3, 5, 2], the evaluation value list becomes [5, 3, 2, 0].

Then, the controller 1101 selects SSwitch whose evaluation value list is the minimum as the movement destination (step S35).

At this step, the comparison of the evaluation value lists is performed. Here, the evaluation values in the same turns are compared from the top in sequence. And at the first time the evaluation values are different, it is determined that the evaluation value list having the lesser of the evaluation values is lesser. Specifically, when the evaluation value list [5, 3, 2, 0] is compared with the evaluation value list [5, 4, 2, 0], the second evaluation values are "3" and "4". Therefore, the former is determined to be lesser. Then, the processing shifts to a processing in FIG. 24 through terminal D.

Figure 23:
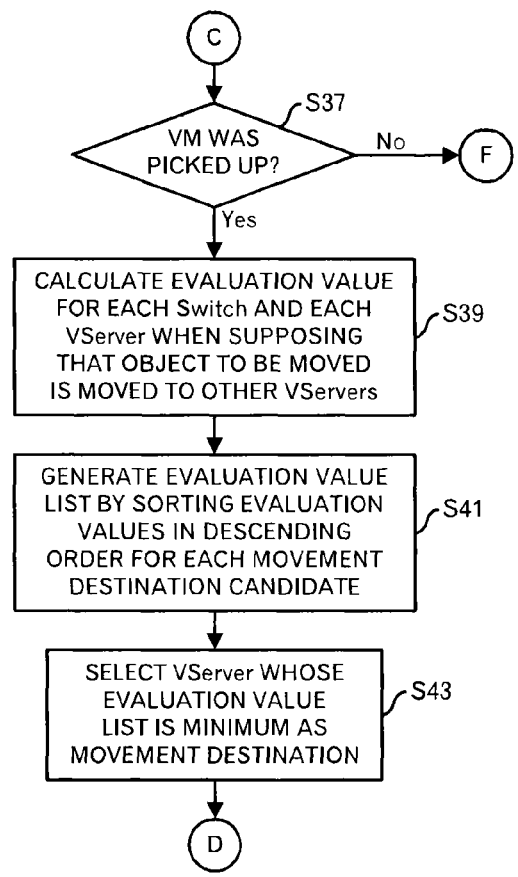
FIG. 23 is a diagram depicting a processing flow relating to this embodiment.

The processing after the terminal C will be explained by using FIG. 23. The controller 1101 determines whether or not the object to be moved is VM (step S37). When the object to be moved is not VM, the processing shifts to the processing in FIG. 24 through terminal F.

On the other hand, when the object to be moved is VM, the controller 1101 causes the first evaluation value calculation unit 1102 to calculate the evaluation value for each switch and each VServer in case where it is supposed that VM is moved to other VServers (step S39). In this processing, when there are plural other VServers, the evaluation value for each switch and each VServer is calculated for each of those other VServers as the movement destination candidates, similarly to the step S3. However, the evaluation value is calculated only for some specific switches or the like, because the evaluation value changes only for those switches, depending on the object to be moved. The processing of this step will be explained in detail later with the step S31.

Then, the controller 1101 generates an evaluation value list for each movement destination candidate by sorting the evaluation value in descending order (step S41).

Then, the controller 1101 selects VServer whose evaluation value list is the minimum as the movement destination (step S43). Then, the processing shifts to the processing in FIG. 24 through terminal D.

Figure 24:
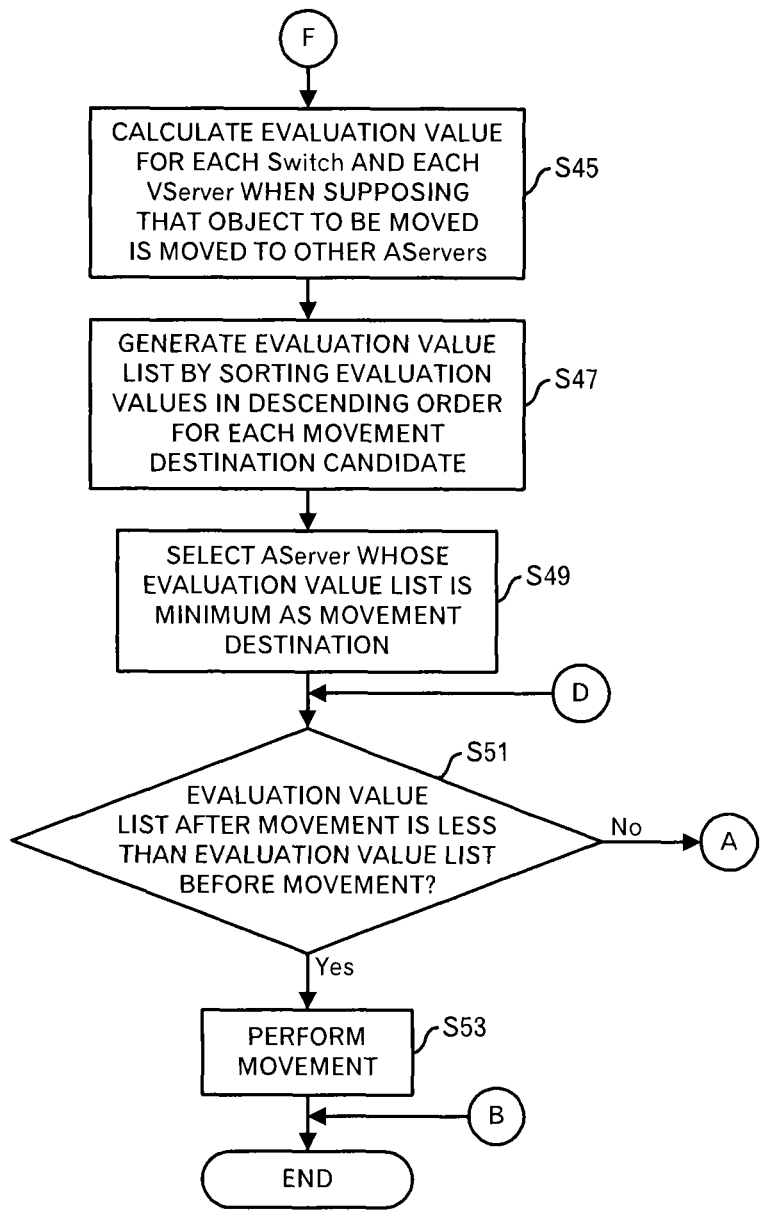
FIG. 24 is a diagram depicting a processing flow relating to this embodiment.

Then, a processing after the terminal F will be explained by using FIG. 24. When it is determined at the step S37 that the object to be moved is not VM, the object to be moved is Virtual router.

Therefore, the controller 1101 causes the first evaluation value calculation unit 1102 to calculate the evaluation value for each switch and each VServer in case where it is supposed that Virtual router is moved to other AServers (step S45). In this processing, when there are plural other AServers, the evaluation value for each switch and each VServer is calculated for each of those other AServers as the movement destination candidate, similarly to the step S3. However, the evaluation value is calculated only for some specific switches or the like, because the evaluation value changes only for those switches, depending on the object to be moved. The processing of this step will be explained in detail later with the steps S31 and S39.

Then, the controller 1101 generates an evaluation value list for each movement destination candidate by sorting the evaluation values in descending order (step S47).

Then, the controller 1101 selects AServer whose evaluation value list is the minimum as the movement destination (step S49).

After that, the controller 1101 determines whether or not the evaluation value list after the movement is less than the evaluation value list before the movement (i.e. the evaluation value list obtained from the evaluation values calculated at the step S3) (step S51). When this condition is not satisfied, the movement does not contribute to the equalization of the output traffic, therefore, a next object to be moved will be picked up from the sorting list. Therefore, the processing returns to the step S25 in FIG. 22 through the terminal A.

On the other hand, when the evaluation value list after the movement is less than the evaluation value list before the movement, the controller 1101 instructs the movement controller 1300 or change controller 1200 so as to move the object to be moved to the selected movement destination (step S53). Then, the processing ends.

When moving VM or VR, the step S53 is realized by executing a predetermined command by designating the physical machine on which VM or VR is currently deployed and the physical machine of the movement destination. Moreover, data in the management data storage unit 1400 is also updated.

Figure 25:
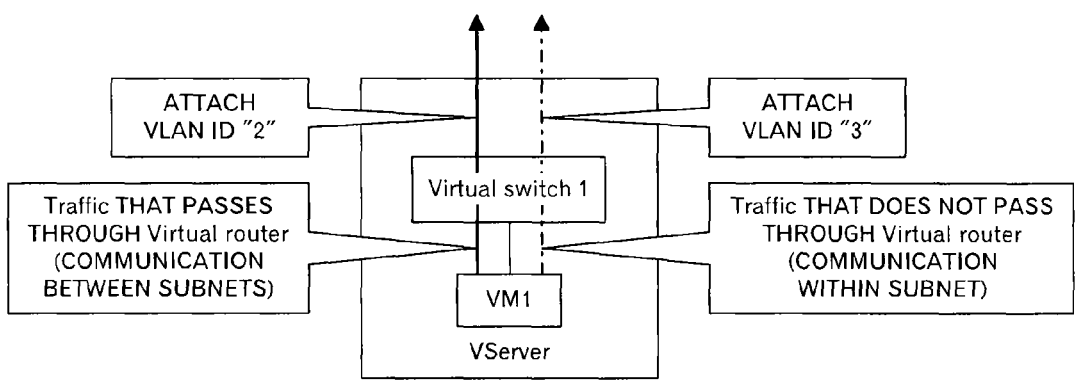
FIG. 25 is a diagram to explain setting of a VLAN ID.

Furthermore, when L2-Tree is changed, SSwitch through which the traffic passes in communication within the subnet is changed. In such a case, VLAN ID is changed so as to pass through SSwitch of the change destination. Therefore, as schematically illustrated in FIG. 25, setting is performed for Virtual switch in each VServer on which VMs that belong to the subnet relating to L2-Tree are deployed so as to attach VLAN ID ("3" in FIG. 25) corresponding to SSwitch of the change destination to packets outputted from VMs that belong to the subnet relating to L2-Tree. More specifically, VLAN ID that corresponds to SSwitch of the change destination is attached to packets that are outputted from a specific port of Virtual switch, which is connected to the VMs that satisfy the aforementioned condition. As illustrated in FIG. 25, when communicating with VMs indifferent subnets, the communication passes through Virtual router. Therefore, in such a case, a different VLAN ID ("2" in FIG. 25) is attached.

Figure 26:
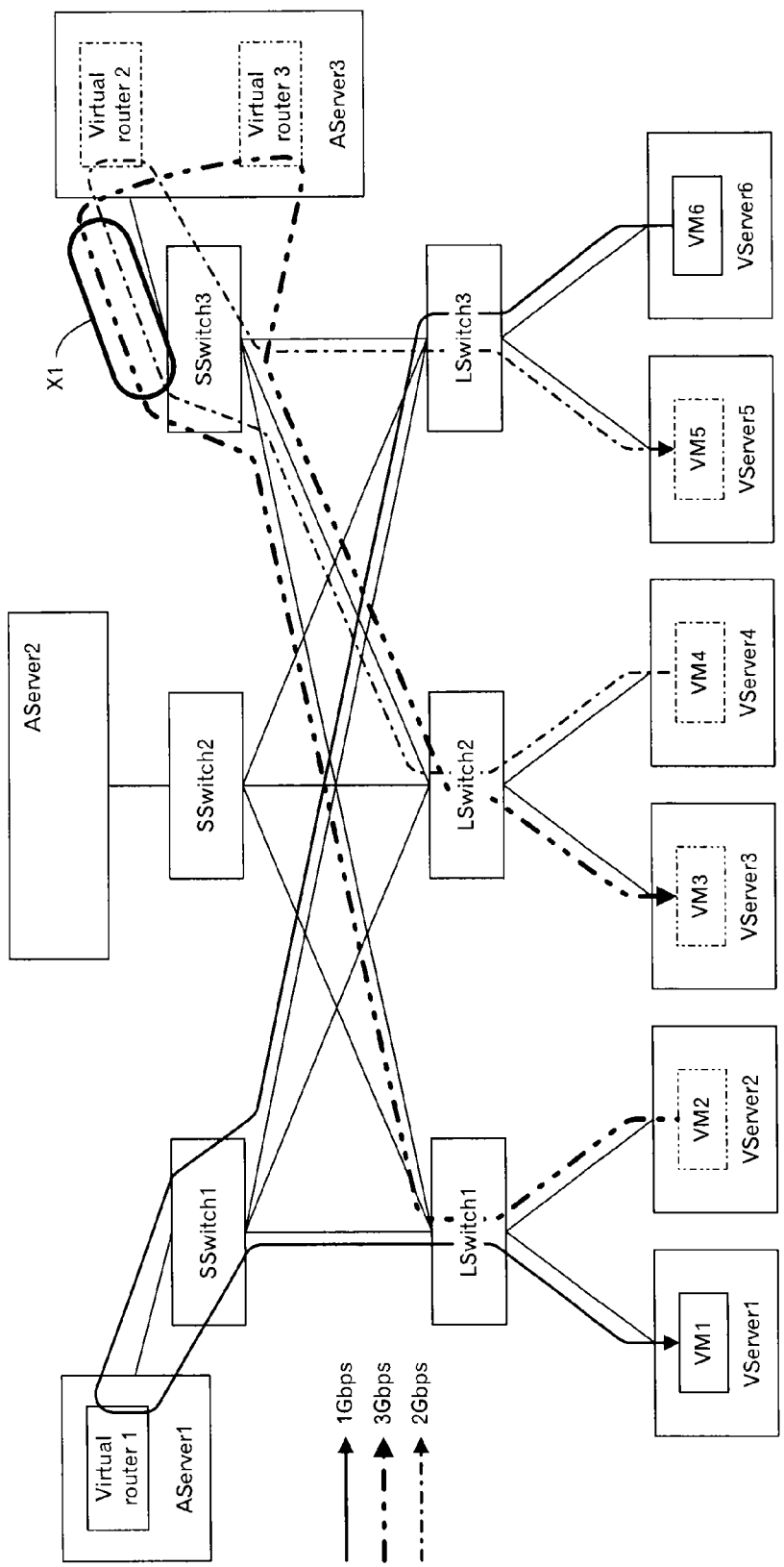
FIG. 26 is a diagram to explain movement of Virtual router.
Figure 27:
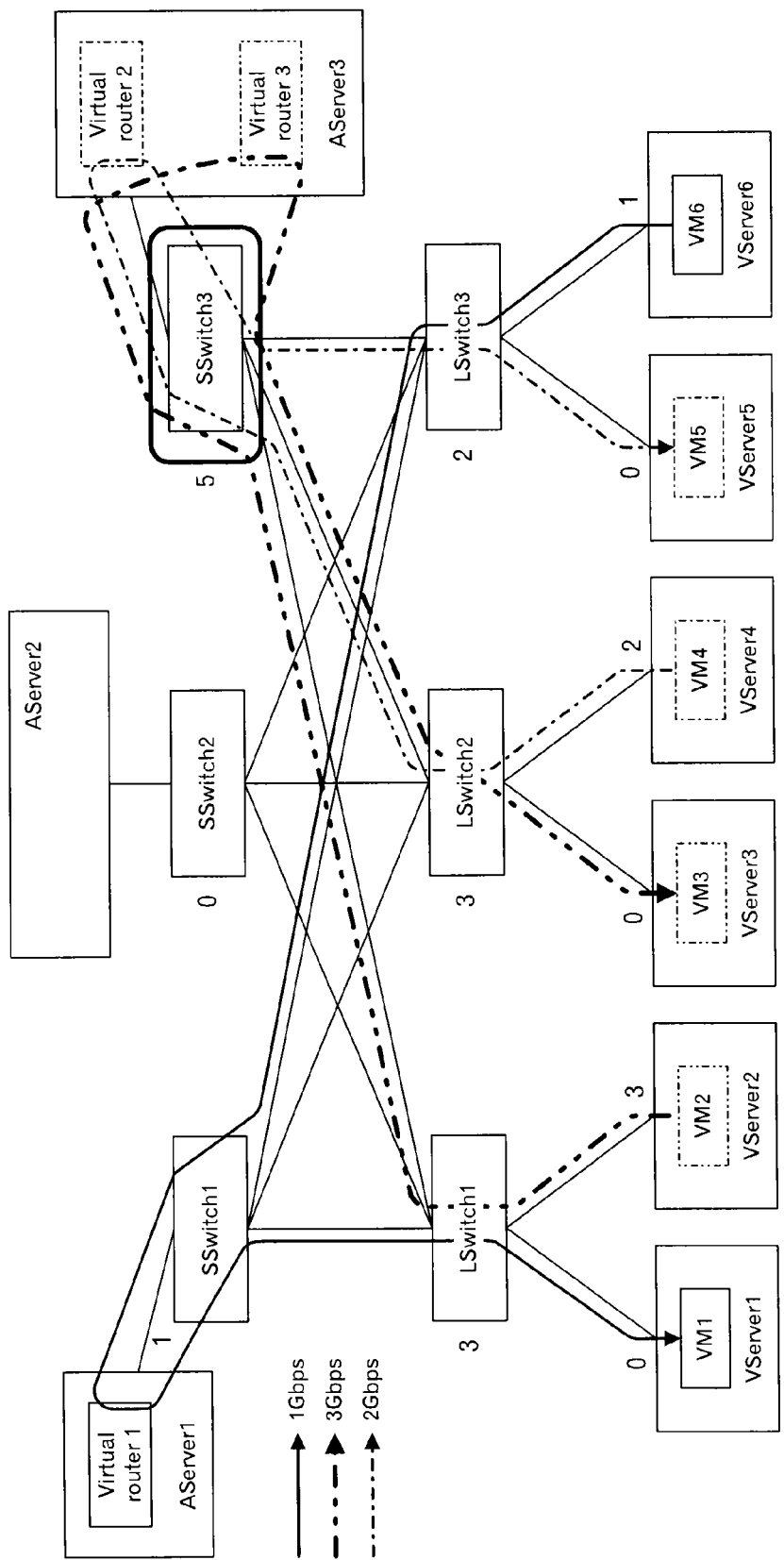
FIG. 27 is a diagram to explain movement of Virtual router.

Next, a case where Virtual router is moved will be explained by using FIGS. 26 to 31. FIG. 26 illustrates an initial state, and because Virtual router2 and Virtual router3 are activated on AServer3, the latency becomes high on Uplink of SSwitch3 (See portion X1). In this embodiment, as illustrated in FIG. 27, the evaluation value for the output traffic for each switch and each VServer is calculated. Then, SSwitch3 is selected because the evaluation value is "5". According to the explanation of FIG. 21, the object to be moved is Virtual router.

Figure 28:
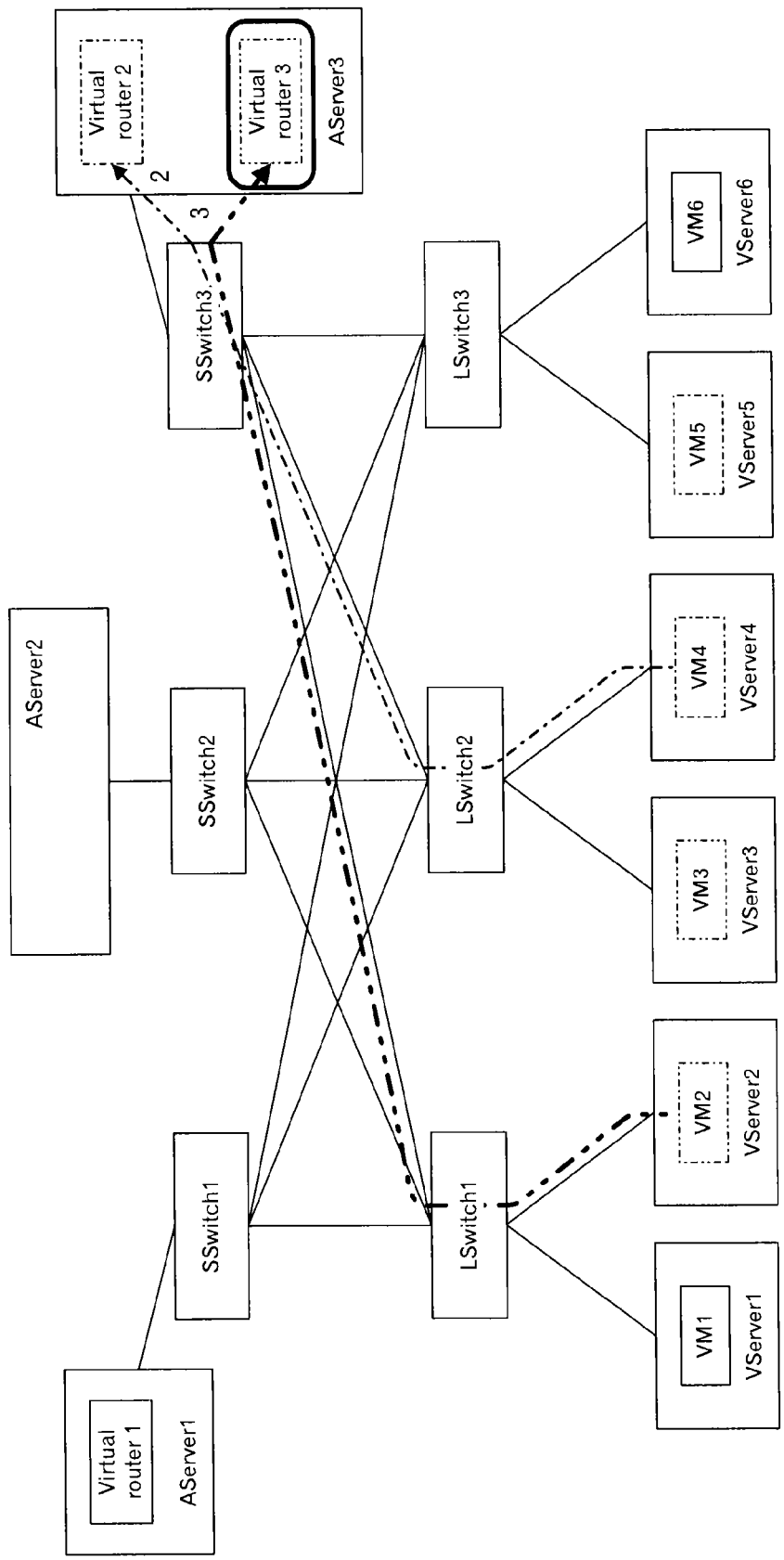
FIG. 28 is a diagram to explain movement of Virtual router.

Then, as illustrated in FIG. 28, when the output traffic to Virtual router2 is aggregated to calculate the evaluation value, "2" is obtained. And, when the output traffic to Virtual router3 is aggregated to calculate the evaluation value, "3" is obtained. Therefore, Virtual router3 is firstly selected as the object to be moved.

Then, the evaluation value list is calculated for each of a first case where Virtual router3 is moved to AServer1 and a second case where Virtual router3 is moved to AServer2.

Figure 29:
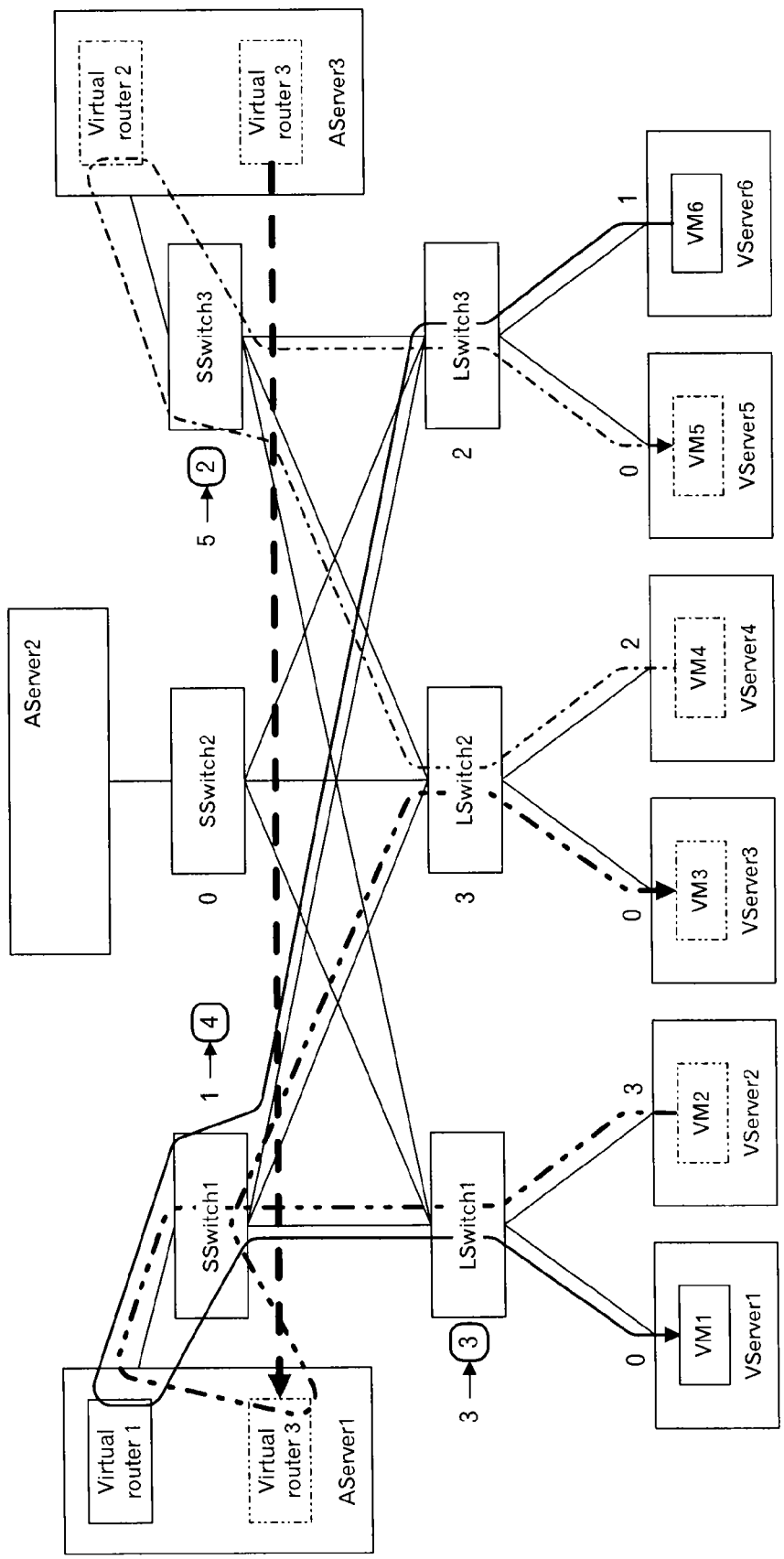
FIG. 29 is a diagram to explain movement of Virtual router.

As for the first case, as illustrated in FIG. 29, the evaluation value is recalculated only for SSwitch3 connected to AServer3 of the movement source, SSwitch1 connected to AServer1 of the movement destination, and LSwitch1 through which the traffic that passes through Virtual router3 passes. In case of FIG. 29, the evaluation value for SSwitch3 is decreased, the evaluation value for SSwitch1 is increased, and the evaluation value for LSwitch1 does not change as a result. In such a case, the evaluation value list becomes [4, 3, 3, 3, 2, 2, 2, 1, 0, 0, 0, 0]. Because the maximum evaluation value is decreased from "5" to "4", it is apparent that the evaluation value list becomes lesser than the list before the movement.

Figure 30:
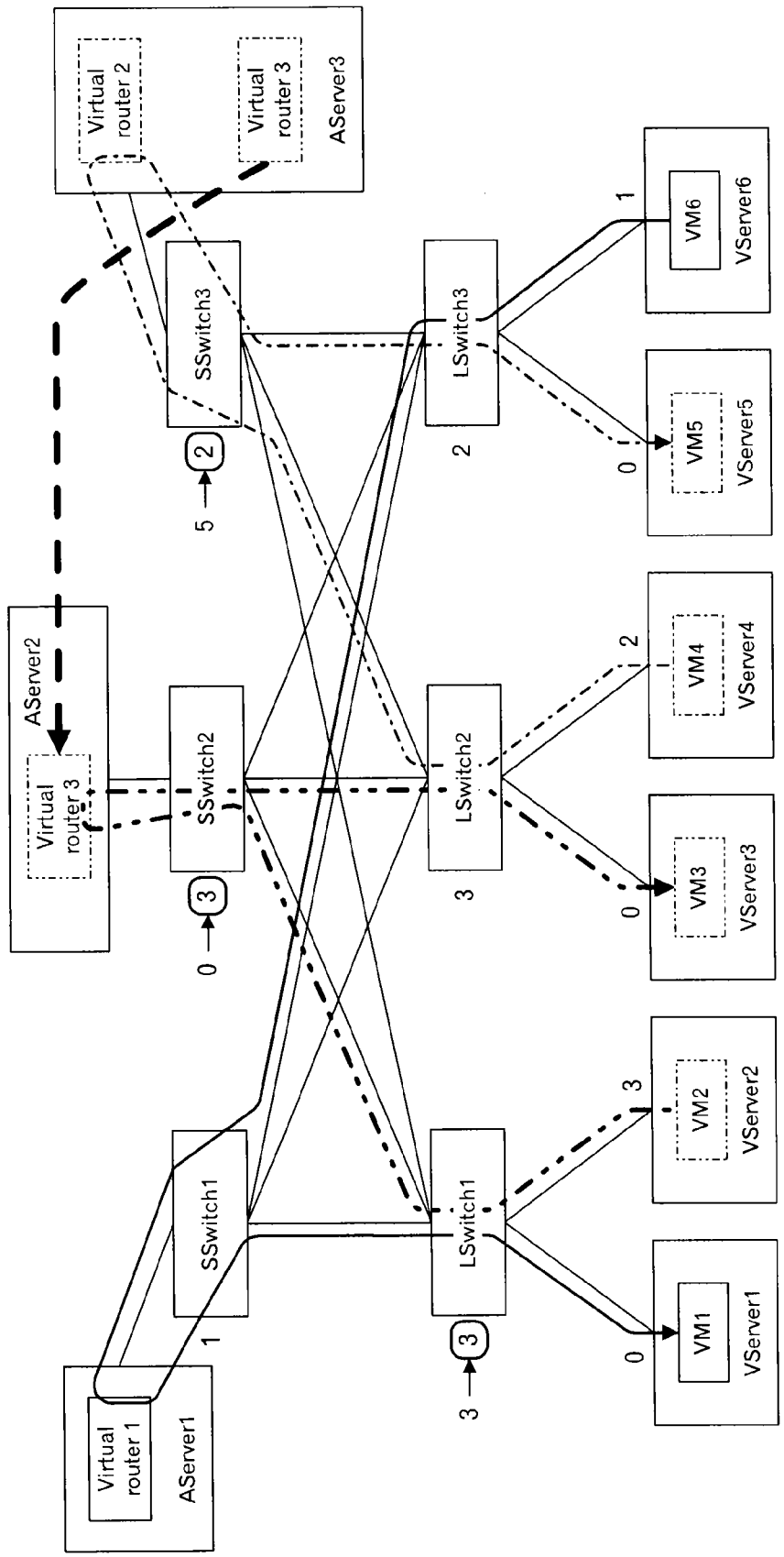
FIG. 30 is a diagram to explain movement of Virtual router.

As for the second case, as illustrated in FIG. 30, the evaluation value is recalculated only for SSwitch3 connected to AServer3 of the movement source, SSwitch2 connected with AServer2 of the movement destination, and LSwitch1 through which the traffic that passes through Virtual router3 passes. In case of FIG. 30, the evaluation value for SSwitch3 is decreased, the evaluation value for SSwitch2 is increased, and the evaluation value for LSwitch1 does not change as a result. In such a case, the evaluation value list becomes [3, 3, 3, 3, 2, 2, 2, 1, 1, 0, 0, 0]. Because the maximum evaluation value is changed from "5" to "3", it is apparent that the evaluation value is lesser that the evaluation value before the movement. Furthermore, because the maximum evaluation value "3" is lesser than "4" in the first case, it is understood that AServer2 is an appropriate movement destination.

Figure 31:
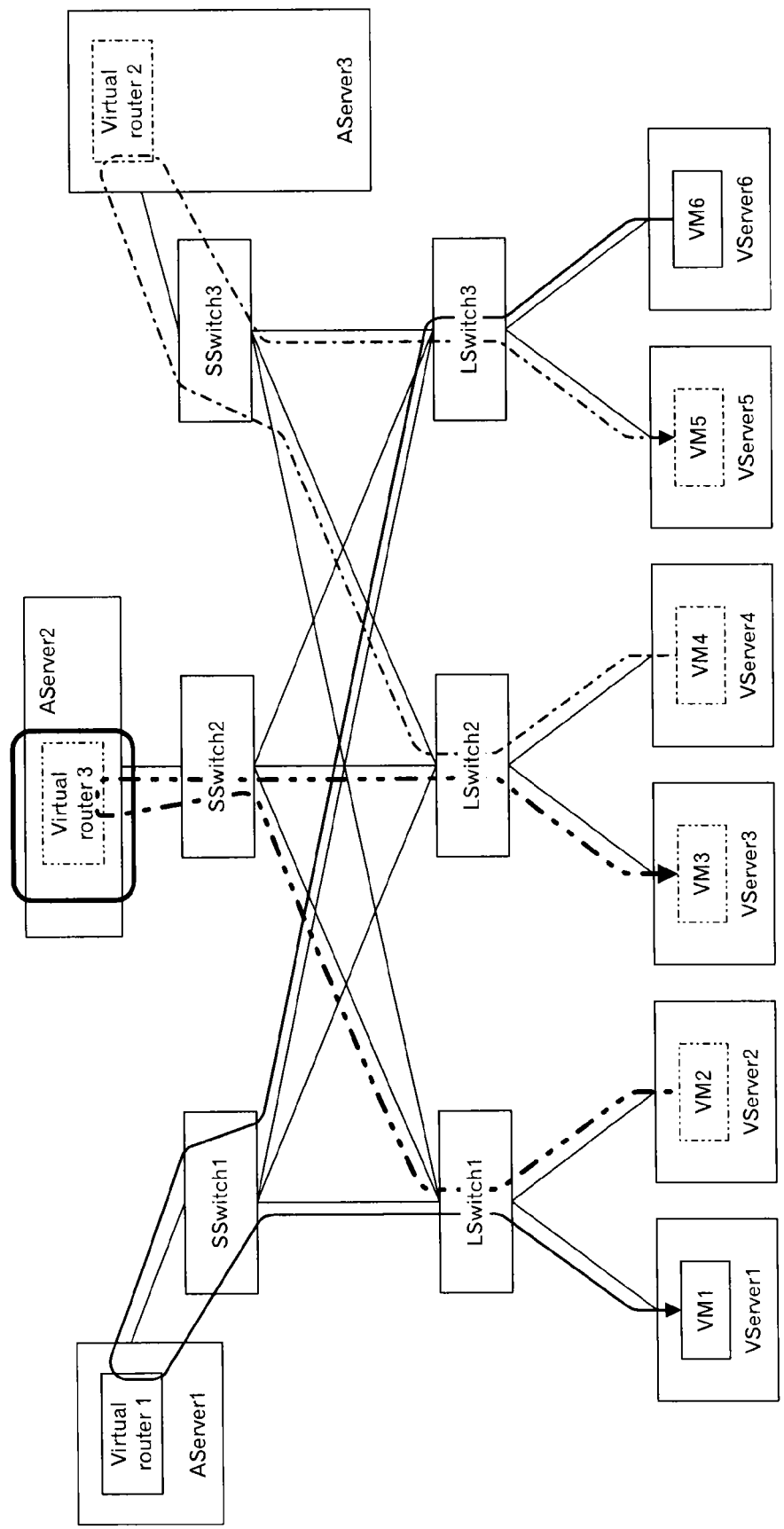
FIG. 31 is a diagram to explain movement of Virtual router.

In other words, by changing the state as illustrated in FIG. 31, the output traffic is equalized compared with a state before the movement.

Figure 32:
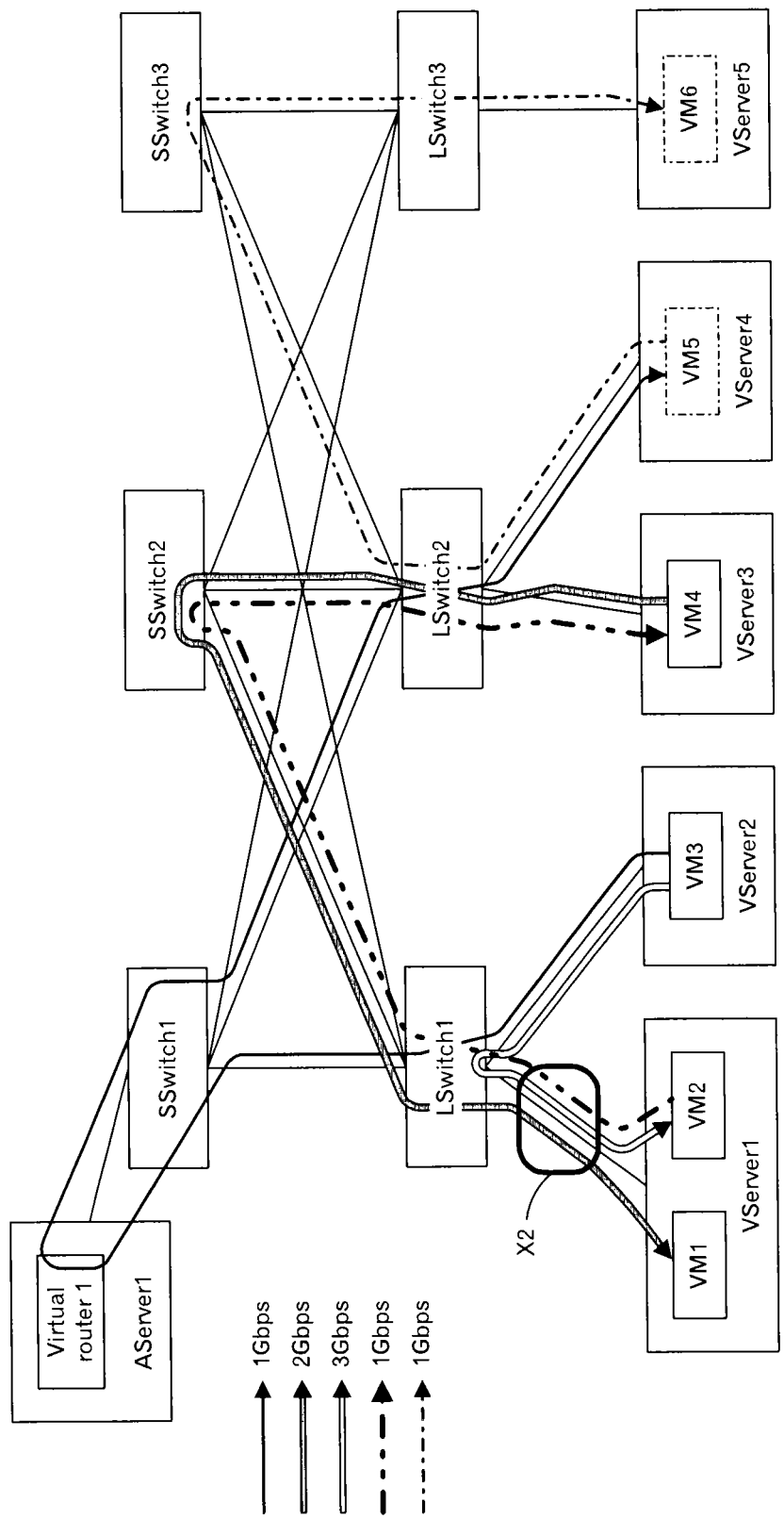
FIG. 32 is a diagram to explain movement of VM.

Next, a case where VM is moved will be explained by using FIGS. 32 to 39. FIG. 32 illustrates an initial state, and the latency of Downlink of LSwitch1 becomes high, because the traffic from VM3 to VM2 and the traffic from VM4 to VM1 coincide (See portion X2).

Figure 33:
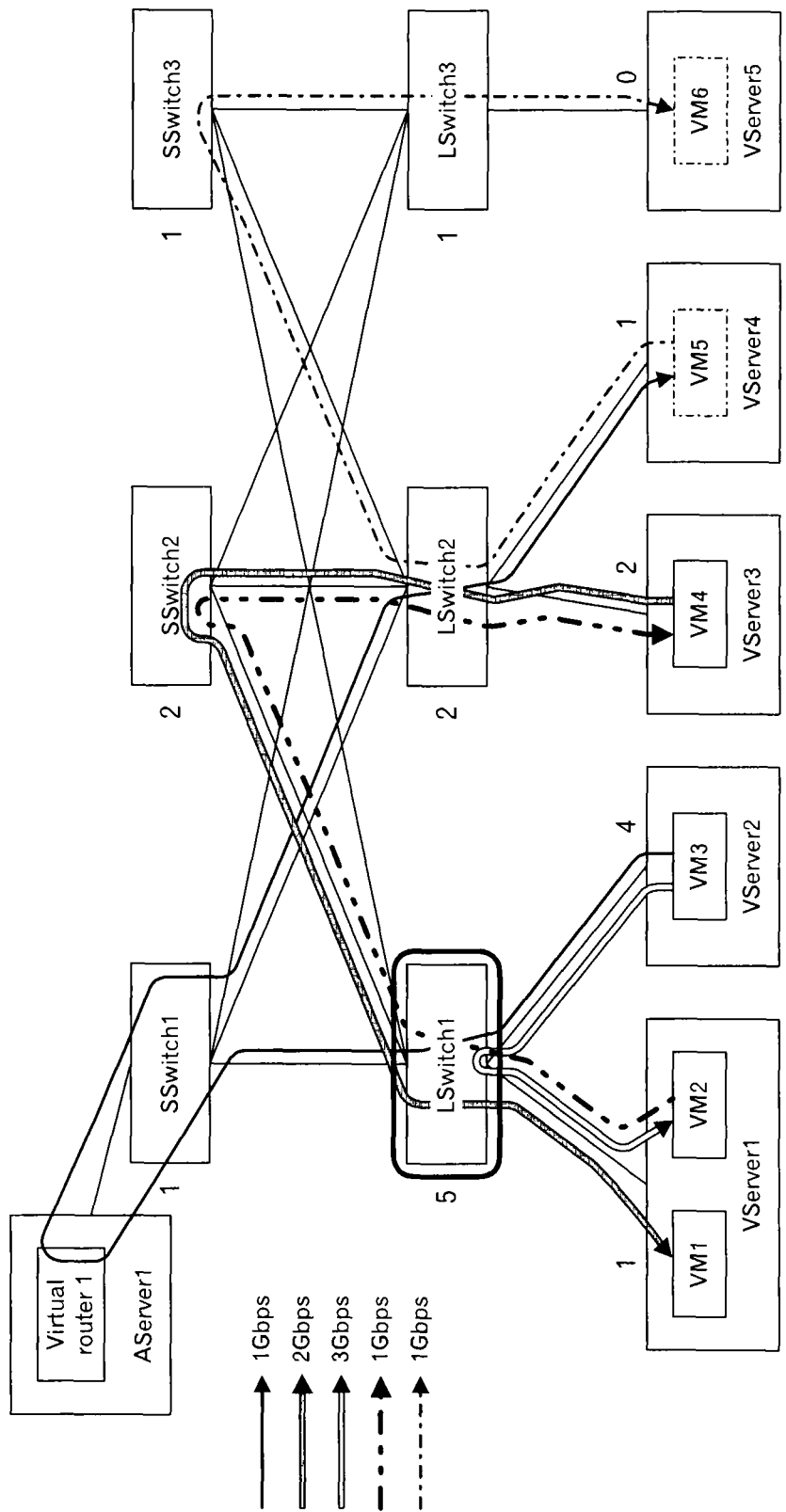
FIG. 33 is a diagram to explain the movement of VM.

In this embodiment, as illustrated in FIG. 33, an evaluation value for the output traffic for each switch and each VServer is calculated. Then, LSwitch1 is selected, because the evaluation value is "5". According to the explanation of FIG. 21, the transmission destination VM is the object to be moved.

Figure 34:
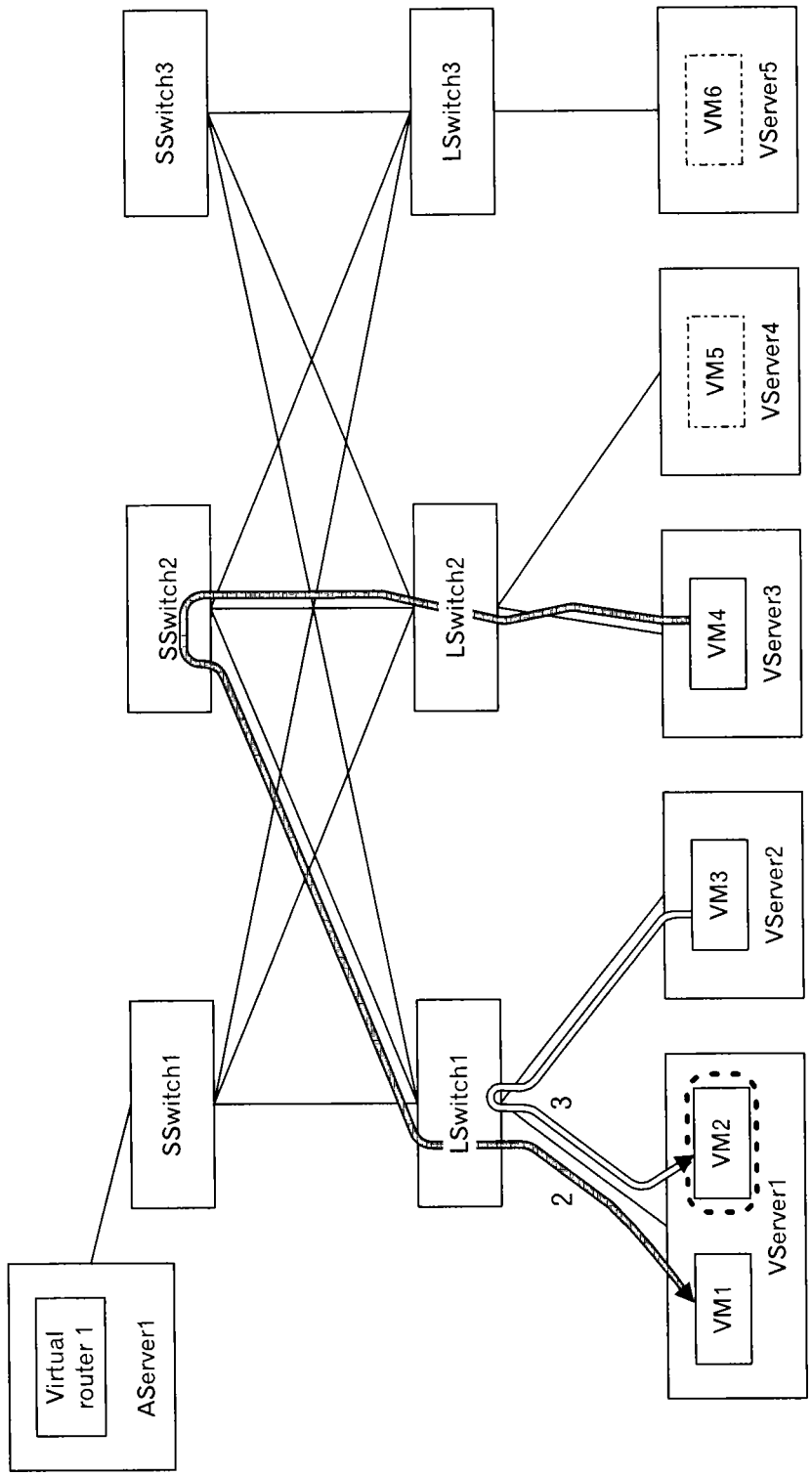
FIG. 34 is a diagram to explain the movement of VM.

Then, as illustrated in FIG. 34, when the output traffic to VM1 is aggregated and the evaluation value is calculated, "2" is obtained, and when the output traffic to VM2 is aggregated and the evaluation value is calculated, "3" is obtained. Therefore, VM2 is selected as the first object to be moved.

Then, the evaluation value list is calculated for a first case where VM2 is moved to VServer2, a second case where VM2 is moved to VServer3, a third case where VM2 is moved to VServer4, and a fourth case where VM2 is moved to VServer5.

Figure 35:
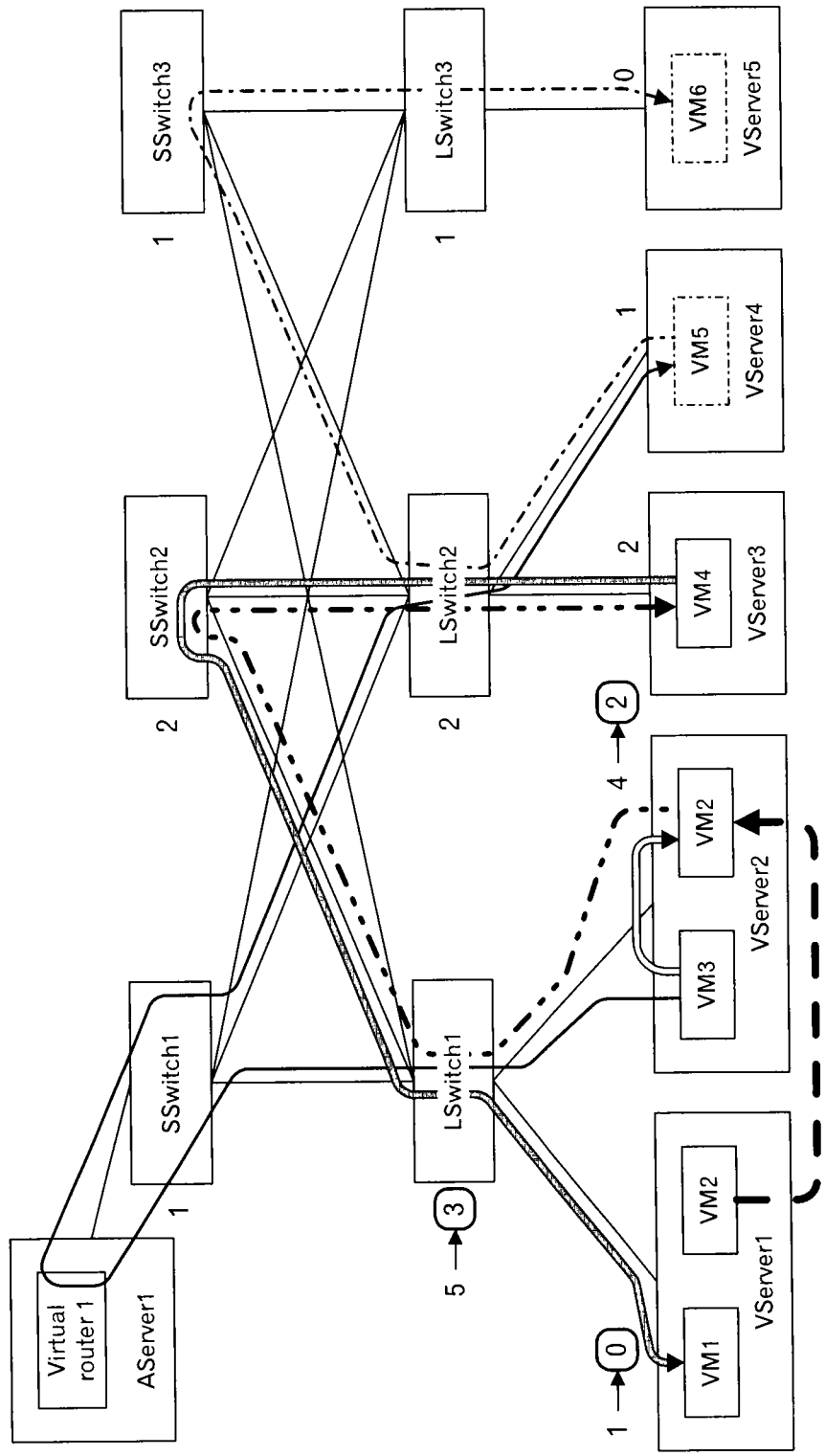
FIG. 35 is a diagram to explain the movement of VM.

As illustrated in FIG. 35, as for the first case, the evaluation value is recalculated only for VServer1 of the movement source, VServer2 of the movement destination and LSwitch1 with which VServer1 of the movement source, and VServer2 of the movement destination is connected. In case of FIG. 35, the evaluation value for VServer1 is decreased, the evaluation value for VServer2 is also decreased, and the evaluation value for LSwitch1 is also decreased. In such a case, the evaluation value list becomes [3, 2, 2, 2, 2, 1, 1, 1, 1, 0, 0]. Because the maximum evaluation value is changed from "5" to "3", it is apparent that the evaluation value list is lesser than the evaluation value list before the movement.

Figure 36:
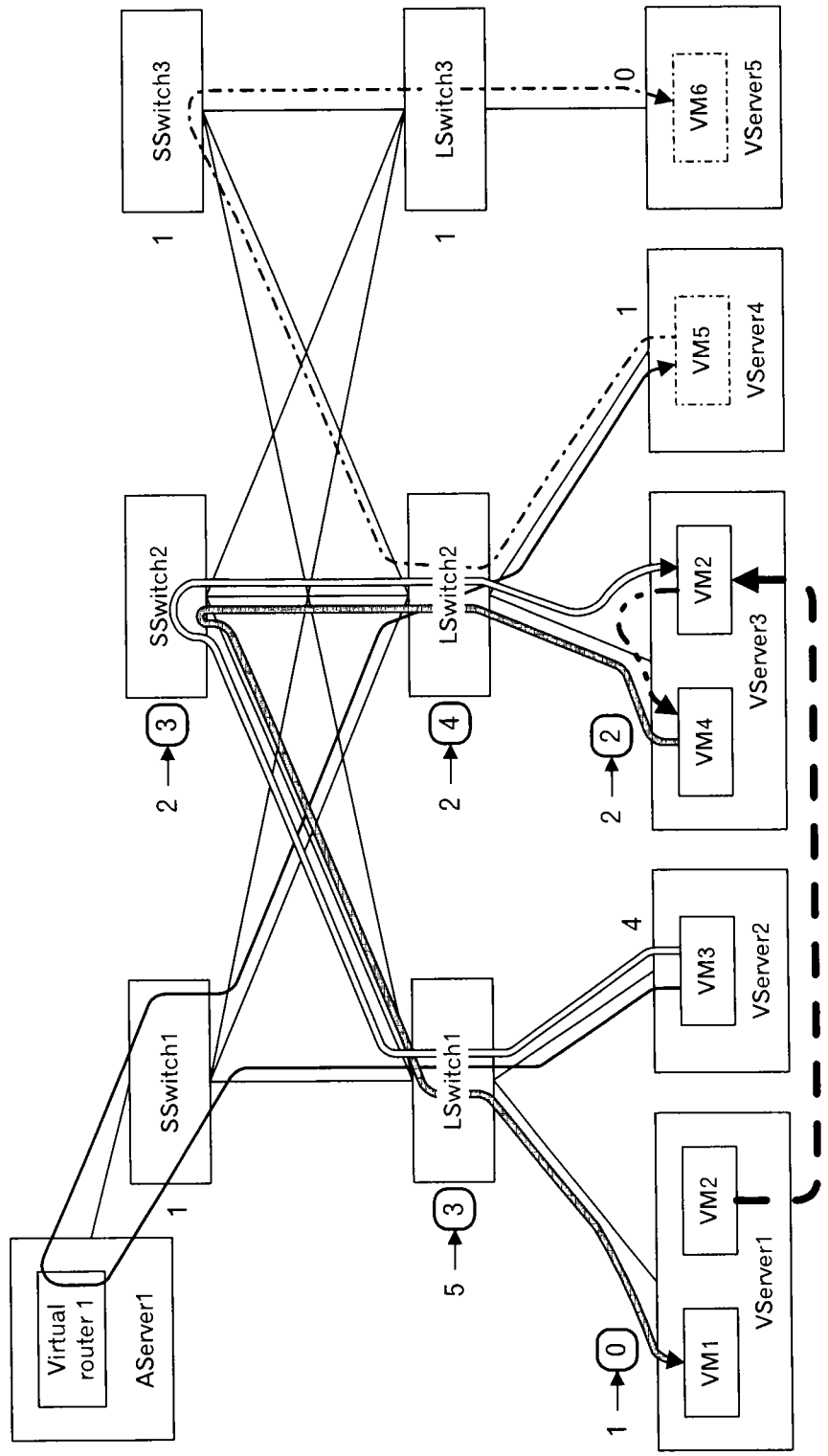
FIG. 36 is a diagram to explain the movement of VM.

As illustrated in FIG. 36, as for the second case, the evaluation value is recalculated for VServer1 of the movement source, VServer3 of the movement destination, LSwitch1 to which VServer1 of the movement source is connected, LSwitch2 to which VServer3 of the movement destination is connected, and SSwitch2 through which the traffic passes in the communication within the subnet of VM2 that is an object to be moved. In case of FIG. 36, the evaluation value for VServer1 is decreased, the evaluation value for VServer3 does not change, the evaluation value for LSwitch1 is decreased, the evaluation value for LSwitch2 is increased, and the evaluation value for SSwitch2 is increased. In such a case, the evaluation value list becomes [4, 4, 3, 3, 2, 1, 1, 1, 1, 0, 0]. Because the maximum evaluation value is changed from "5" to "4", it is apparent that the evaluation value list is lesser than the evaluation value list before the movement.

Figure 37:
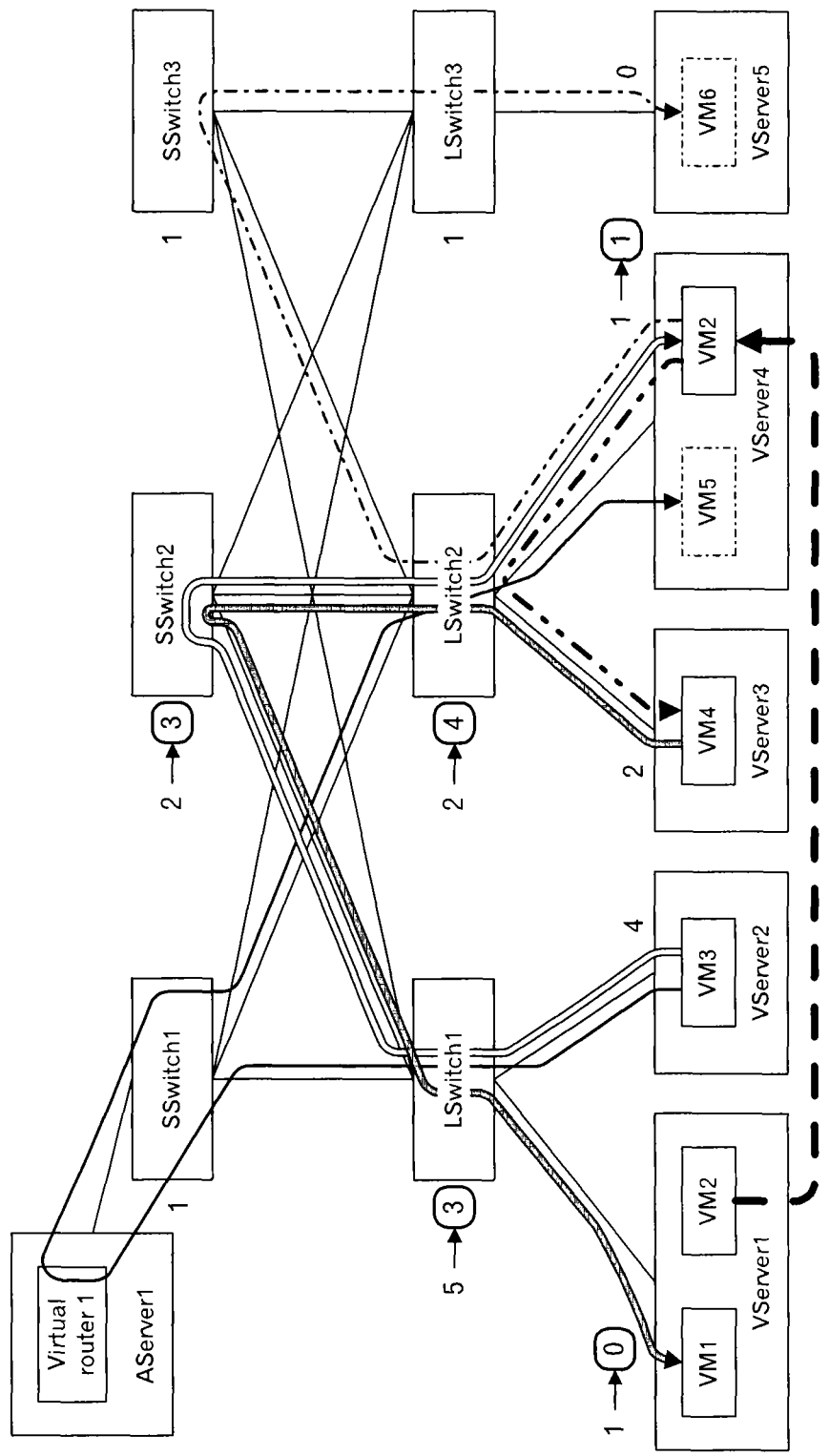
FIG. 37 is a diagram to explain the movement of VM.

As illustrated in FIG. 37, as for the third case, the evaluation value is recalculated for VServer1 of the movement source, VServer4 of the movement destination, LSwitch1 to which VServer1 of the movement source is connected, LSwitch2 to which VServer4 of the movement destination is connected, and SSwitch2 through which the traffic passes in the communication within the subnet of VM2 that is an object to be moved. In case of FIG. 37, the evaluation value for VServer1 is decreased, the evaluation value for VServer4 does not change, the evaluation value for LSwitch1 is decreased, the evaluation value for LSwitch2 is increased, and the evaluation value for SSwitch2 is increased. In such a case, the evaluation value list becomes [4, 4, 3, 3, 2, 1, 1, 1, 1, 0, 0]. Because the maximum evaluation value is changed from "5" to "4", it is apparent that the evaluation value list is lesser than the evaluation value list before the movement.

Figure 38:
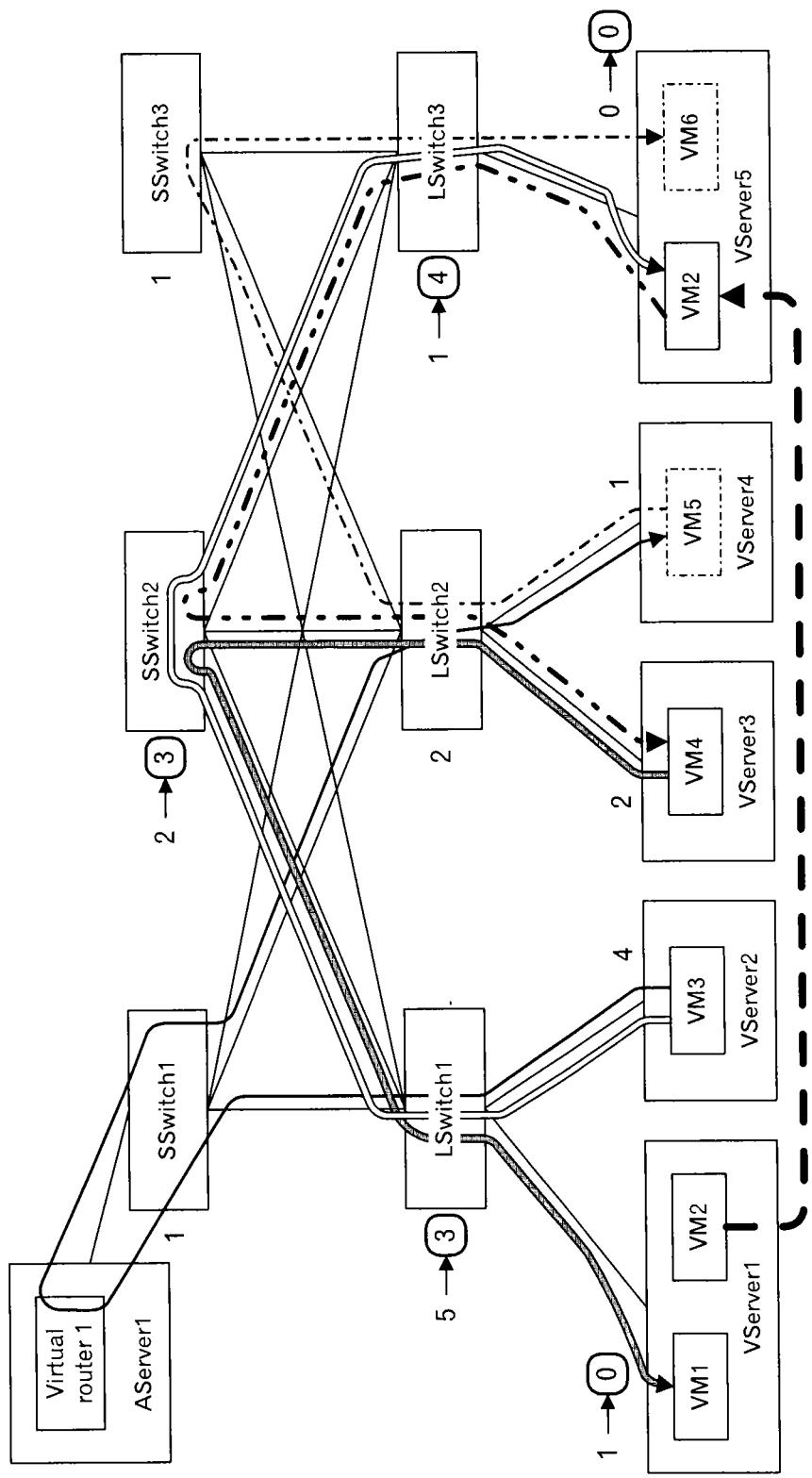
FIG. 38 is a diagram to explain the movement of VM.

As illustrated in FIG. 38, as for the fourth case, the evaluation value is recalculated for VServer1 of the movement source, VServer5 of the movement destination, LSwitch1 to which VServer1 of the movement source is connected, LSwitch3 to which VServer5 of the movement destination is connected, and SSwitch2 through which the traffic passes in the communication within the subnet of VM2 that is an object to be moved. In case of FIG. 38, the evaluation value for VServer1 is decreased, the evaluation value for VServer5 does not change, the evaluation value for LSwitch1 is decreased, the evaluation value for LSwitch3 is increased, and the evaluation value for SSwitch2 is increased. In such a case, the evaluation value list becomes [4, 4, 3, 3, 2, 2, 1, 1, 1, 0, 0]. Because the maximum evaluation value is changed from "5" to "4", it is apparent that the evaluation value list is lesser than the evaluation value list before the movement.

When the evaluation value lists for the first to fourth cases are compared, the maximum evaluation value for the first case is the least. Therefore, it is determined that the evaluation value list for the first case is also the least.

Figure 39:
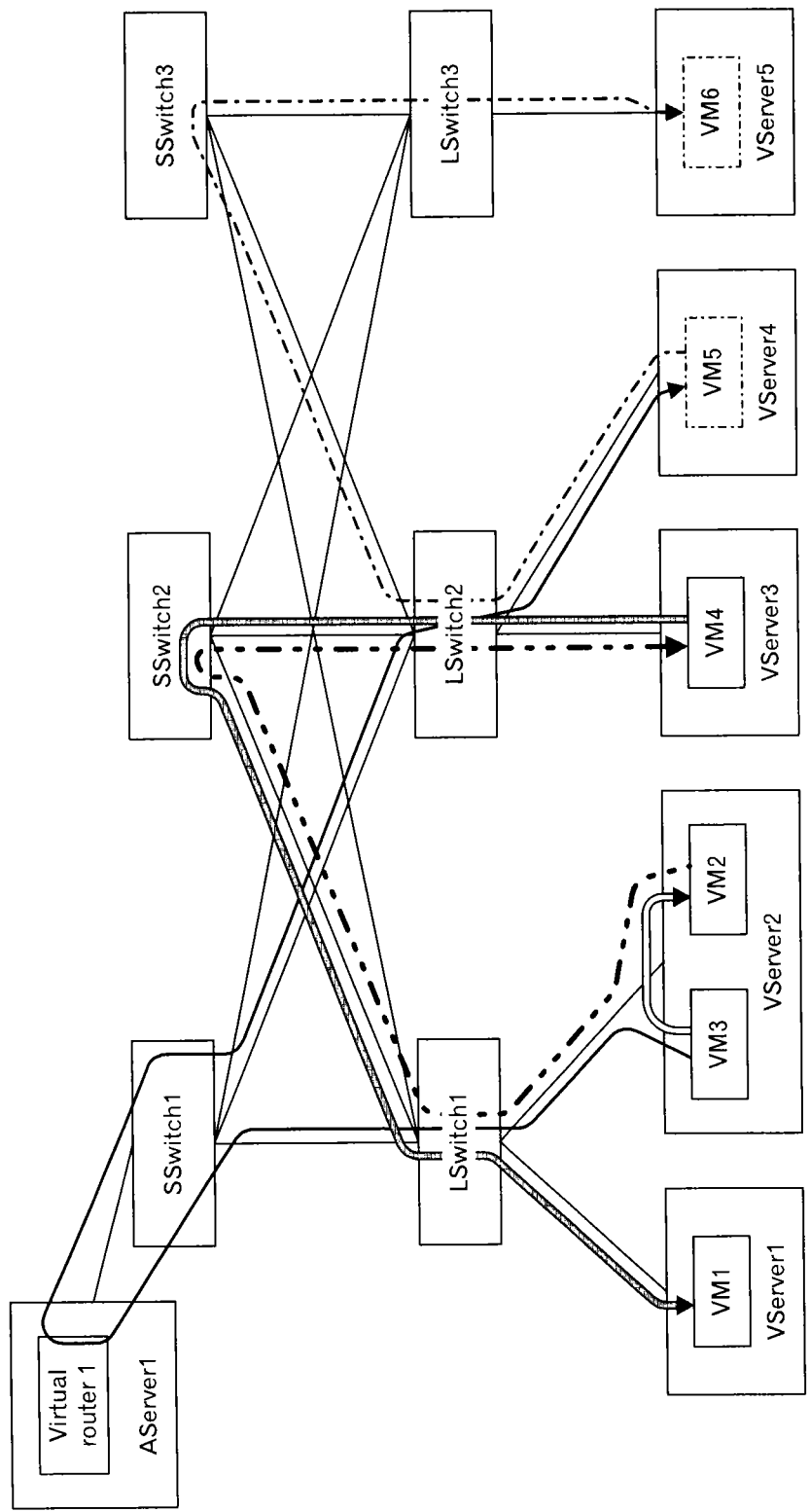
FIG. 39 is a diagram to explain the movement of VM.

In other words, by changing to the state as illustrated in FIG. 39, the output traffic is equalized compared with a state before the movement.

Figure 40:
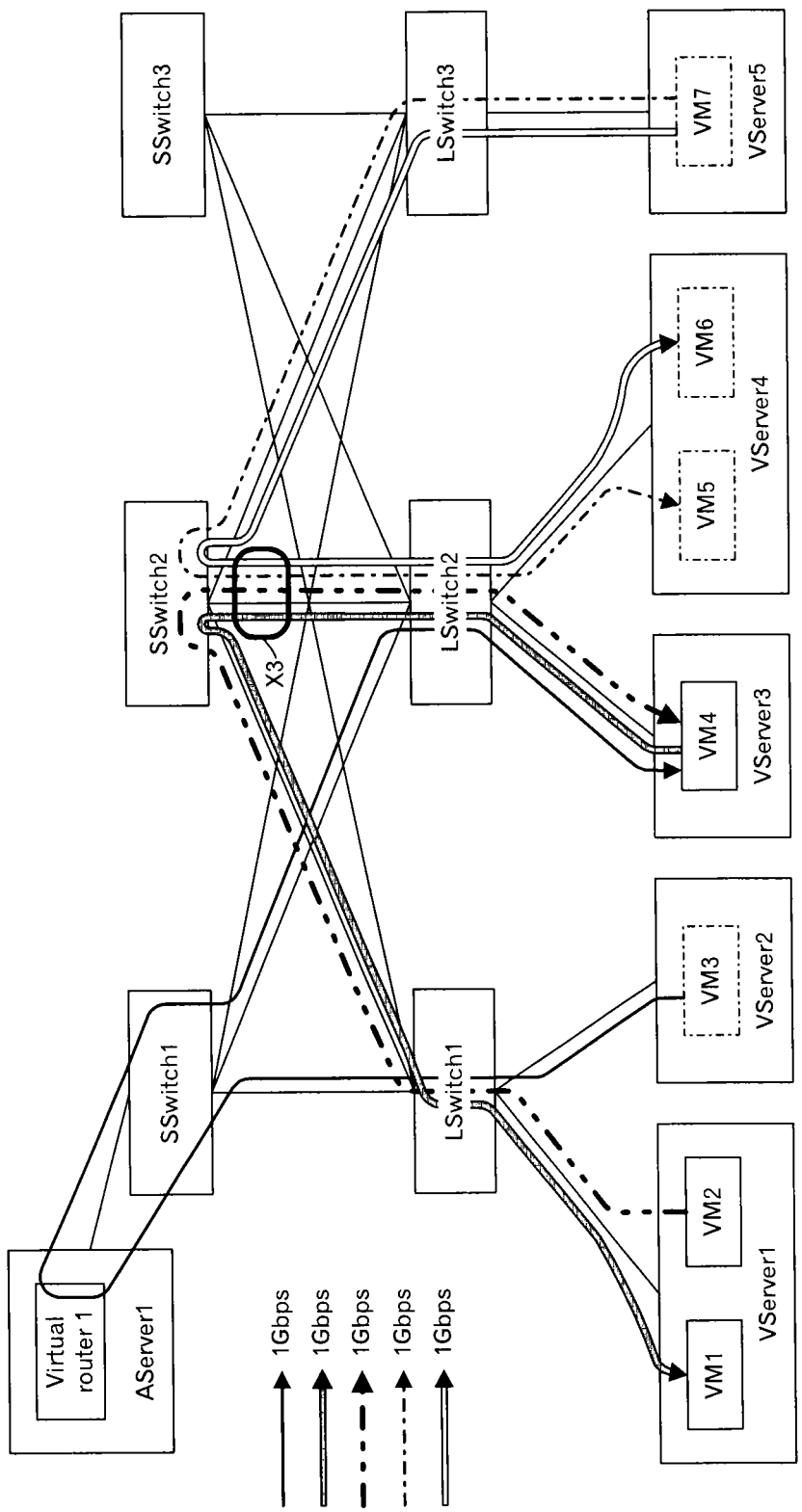
FIG. 40 is a diagram to explain movement of L2-Tree.

Next, a case where L2-Tree (i.e. communication within the subnet) is moved will be explained by using FIGS. 40 to 45. FIG. 40 illustrates an initial state, and the latency of Downlink of SSwitch2 becomes high because the traffic from VM7 to VM6, the traffic from VM7 to VM5 and the traffic from VM2 to VM4 coincide (See portion X3).

Figure 41:
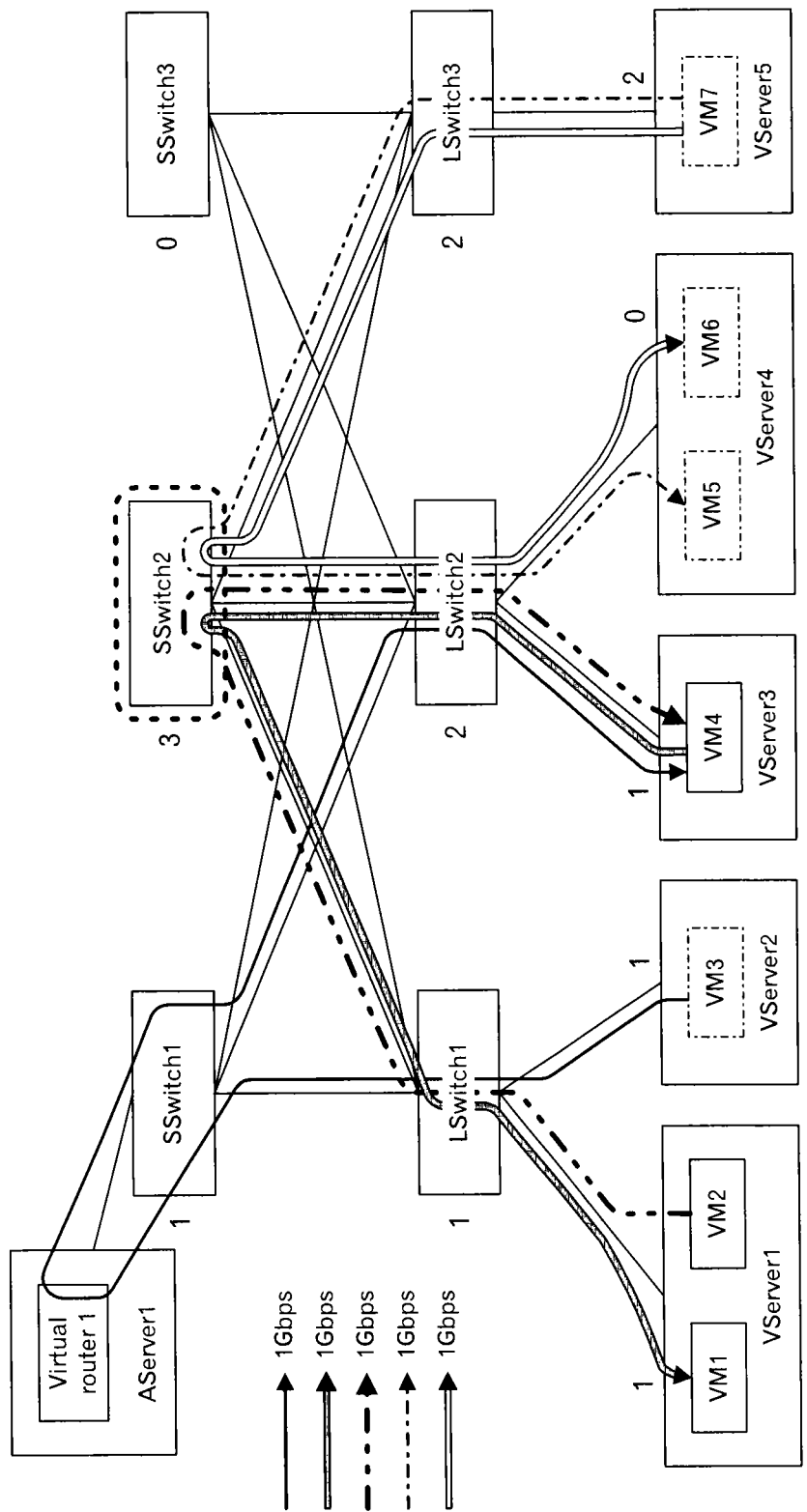
FIG. 41 is a diagram to explain the movement of L2-Tree.

In this embodiment, as illustrated in FIG. 41, the evaluation value for each switch and each VServer of output traffic is calculated. Then, the evaluation value for SSwitch2 is "3", and SSwitch2 is selected. According to the explanation of FIG. 21, VM of the transmission destination, VR and L2-Tree are objects to be moved. However, because SSwitch2 is not connected to AServer, VR is not selected as the object to be moved.

Figure 42:
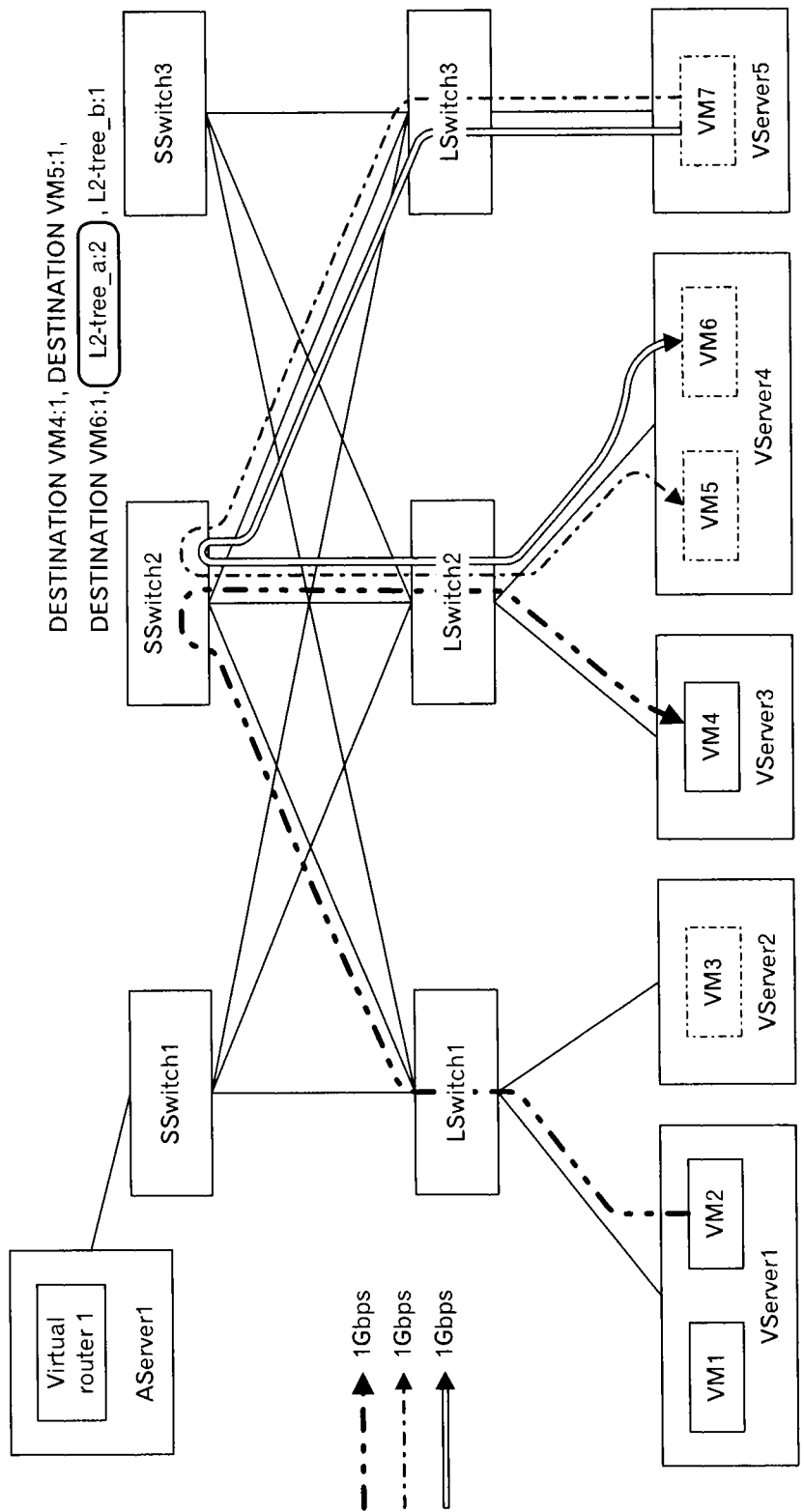
FIG. 42 is a diagram to explain the movement of L2-Tree.

Then, as illustrated in FIG. 42, when the output traffic to VM4 is aggregated and the evaluation value is calculated, "1" is obtained, when the output traffic to VM5 is aggregated and the evaluation value is calculated, "1" is obtained, when the output traffic to VM6 is aggregated and the evaluation value is calculated, "1" is obtained, the evaluation value for the subnet L2-Tree_a for VM3 and VM5 to VM7 is "2", and the evaluation value for the subnet L2-Tree b for VM1, VM2 and VM4 is "1". Therefore, L2-Tree_a is firstly selected.

Then, the evaluation value list is calculated for each of a first case where L2-Tree_a is moved to SSwitch1 and a second case where L2-Tree_a is moved to SSwitch3.

Figure 43:
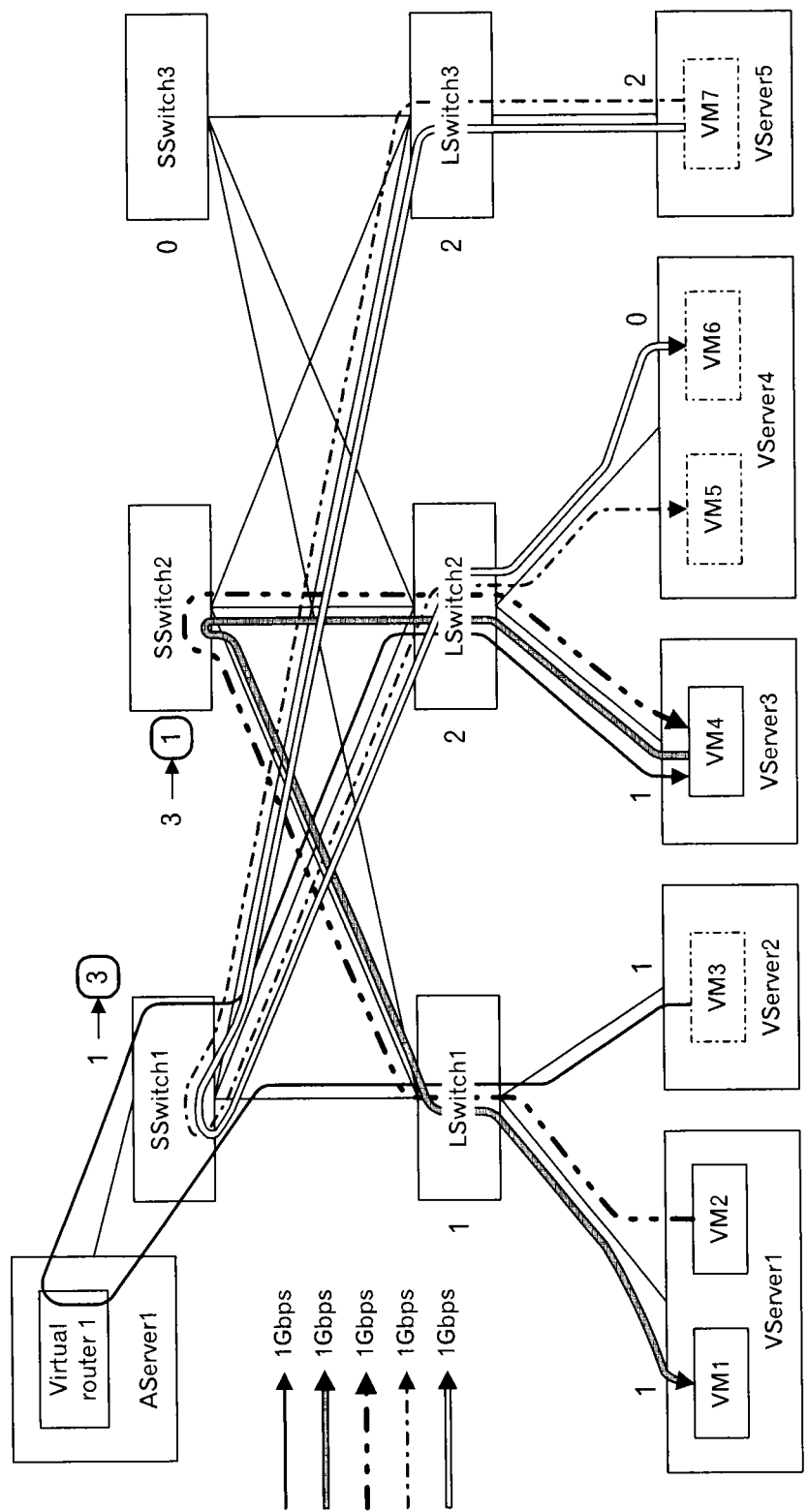
FIG. 43 is a diagram to explain the movement of L2-Tree.

As illustrated in FIG. 43, as for the first case, the evaluation values for SSwitch2 of the movement source and SSwitch1 of the movement destination are recalculated. In case of FIG. 43, the evaluation value for SSwitch2 is decreased, and the evaluation value for SSwitch1 is increased. In such a case, the evaluation value list becomes [3, 2, 2, 2, 1, 1, 1, 1, 1, 0, 0]. The evaluation value list does not change from the list before the movement.

Figure 44:
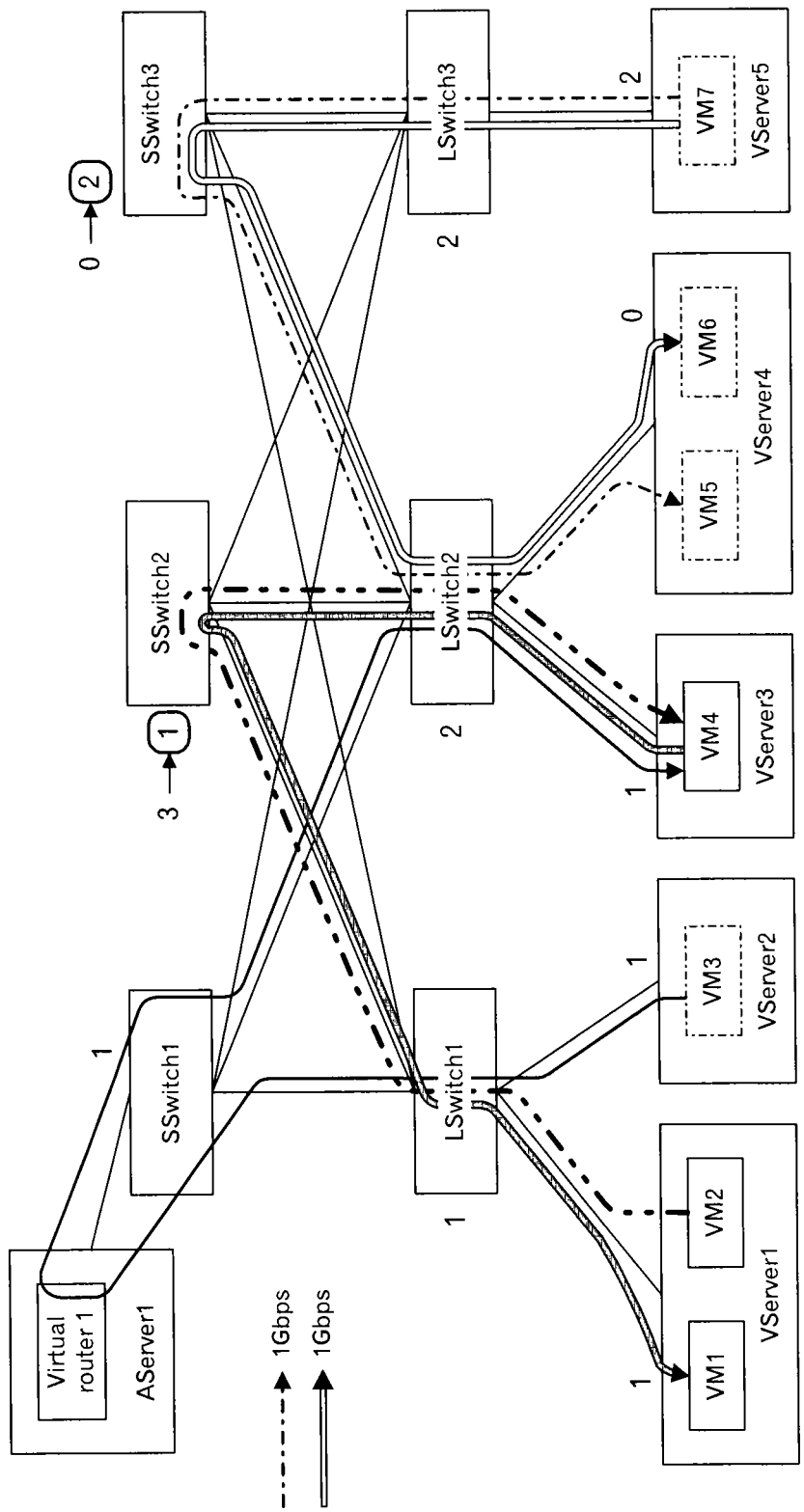
FIG. 44 is a diagram to explain the movement of L2-Tree.

As illustrated in FIG. 44, as for the second case, the evaluation values are recalculated for SSwitch2 of the movement source and SSwitch3 of the movement destination. In case of FIG. 44, the evaluation values for SSwitch2 are decreased and the evaluation values for SSwitch3 are increased. In such a case, the evaluation value list becomes [2, 2, 2, 2, 1, 1, 1, 1, 1, 1, 0]. Because the maximum evaluation value is changed from "3" to "2", it is apparent that the evaluation value list is lesser than the evaluation value list before the movement.

When the evaluation value lists for the first and second cases are compared, it is determined that the evaluation value list for the second case is lesser, because the maximum evaluation value for the second case is lesser.

Figure 45:
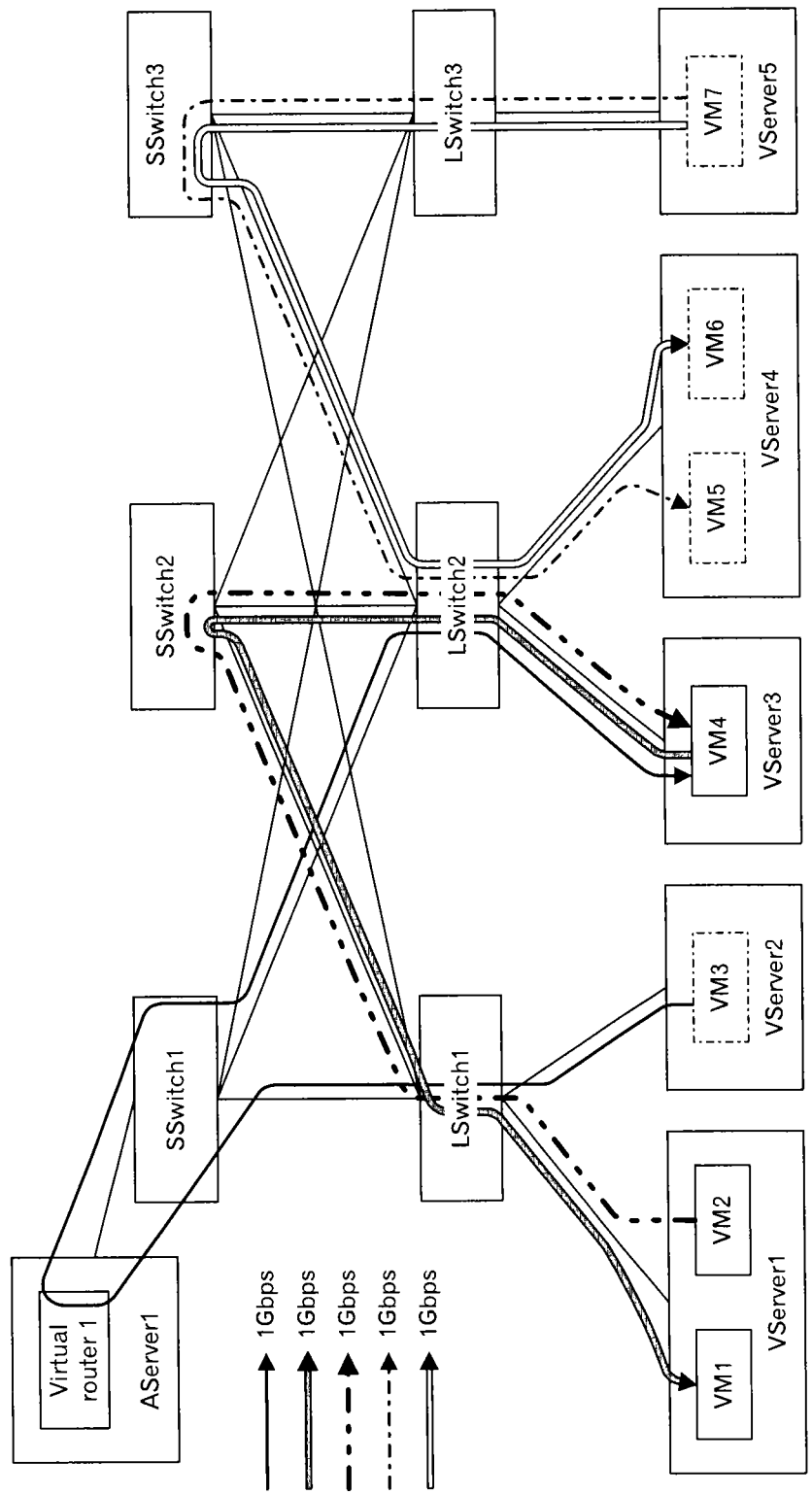
FIG. 45 is a diagram to explain the movement of L2-Tree.

In other words, by changing the state to the state as illustrated in FIG. 45, the output traffic is equalized compared with the output traffic before the movement.

As described above, the imbalance of the traffic that cannot be reduced by switching the paths by the physical switch, which is performed in the conventional art, can be equalized (i.e. balanced). Thus, the communication capability between VMs is improved. Moreover, by equalizing the traffic, the redundant bandwidth increases in each physical link, therefore, the possibility that the congestion by the temporally increased traffic is avoided becomes high.

Moreover, the processing load of the aforementioned processing is low and the computational time is short. Specifically, after calculating the evaluation value at the first stage for each physical link, the flows are aggregated for the selected physical link to calculate the evaluation value for VM, VR or L2-Tree. Therefore, the load of the aggregation processing is reduced. Furthermore, also in view of a point that the evaluation value is updated only for the physical apparatus relating to VM, VR or L2-Tree, which will be moved or changed, the processing load is reduced.

[Supplementation]

[Aggregation of Flows]

The flows to be aggregated are different depending on the physical link to be focused on.

(a) Uplink of SSwitch flows for each Virtual router (b) Downlink of SSwitch flows for each Virtual router, flows for each L2-Tree, flows for each transmission source VM and flows for each transmission destination VM As for VM, in order to perform a processing to determine the movement destination, flows that pass through Virtual router and flows that does not pass through Virtual router are separately aggregated.

(c) Uplink of LSwitch flows for each Virtual router, flows for each L2-Tree, flows for each transmission source VM and flows for each transmission destination VM As for VM, in order to perform the processing to determine the movement destination, flows that pass through Virtual router and flows that do not pass through Virtual router are separately aggregated.

(d) Downlink of LSwitch flows for each transmission source VM and flows for each transmission destination VM As for VM, in order to perform the processing to determine the movement destination, flows that pass through Virtual router and flows that do not pass through Virtual router are separately aggregated.

(e) VServer flows for each transmission source VM and flows for each transmission destination VM As for VM, in order to perform the processing to determine the movement destination, flows that pass through Virtual router and flows that do not pass through Virtual router are separately aggregated.

[Traffic that is Changed by the Movement]

When VM, Virtual router or L2-Tree to be moved is identified, the evaluation value is updated by provisionally moving the object to be moved. However, the traffic that is influenced at that time is as described in FIG. 46. The evaluation values for switch and VServer through which such traffic passes change.

[As for a Processing to Determine the Movement Destination]

The evaluation value is recalculated only for each of switches and VServers that have a physical link, which is influenced by moving or changing VM, VR or L2-Tree. At this time, by using the evaluation value before the movement of the object to be moved (VM, VR or L2-Tree), the evaluation value for each of switches and VServers is updated.

(1) in case where Virtual router or L2-Tree is moved Uplink and Downlink of SSwitch and Uplink of LSwitch These have influence on either of SSwitch connected to AServer of the movement destination or SSwitch by the evaluation value of an object to be moved.

(2) In Case where VM is Moved

When VM to be moved is moved to VServer to which the same LSwitch is connected, output traffic is changed for 8 cases as described later. On the other hand, when VM to be moved is moved to VServer to which different LSwitch is connected, output traffic is changed for 16 cases as described later.

Here, symbols used in the later explanation are explained.

$t_{A \to B}$

Traffic from A to B before movement

A and B are either of SSwitch, LSwitch or VServer.

$t_{before} \to t_{after}$

Traffic before movement→Traffic after movement t(L2)

Traffic that passes through L2-Tree t(VR)

Traffic that passes through Virtual router fromVM

Traffic transmitted from VM toVM

Traffic transmitted to VM $\Sigma t_k (k: 1, \ldots, N)$ $t_1 + \ldots + t_N$

SS

SSwitch

SSwitch(L2), SS(L2)

SSwitch through which traffic passes when traffic passes through L2-Tree

SSwitch(VR), SS(VR)

SSwitch through which traffic passes when traffic passes through Virtual router

LS

LSwitch

VS

Figures 46, 47:
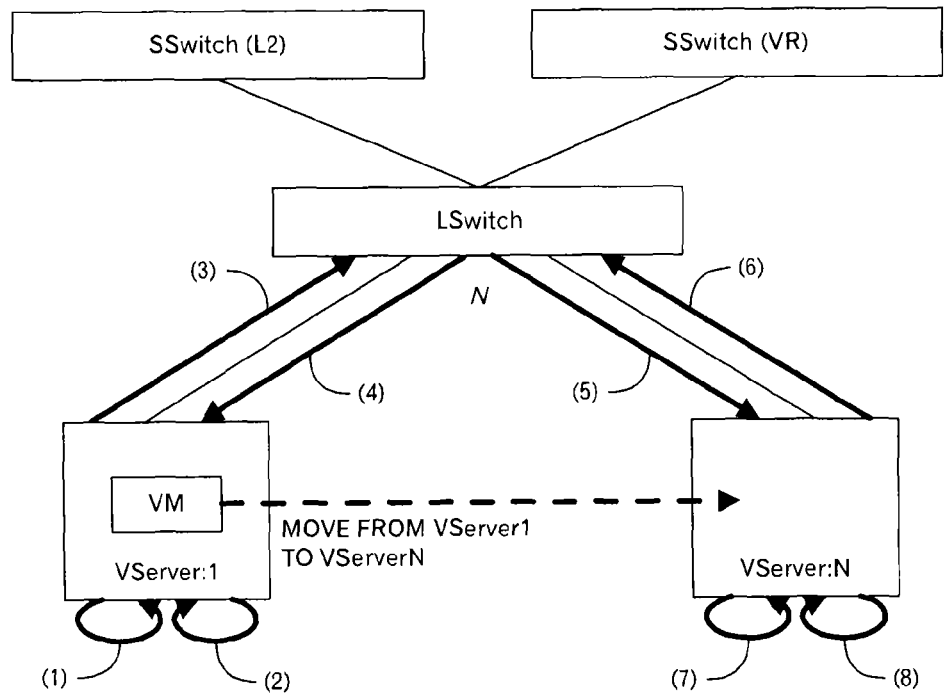
FIG. 46 is a diagram to explain the traffic that is influenced by the movement.
FIG. 47 is a diagram to explain change of flows when moving VM to VServer connected with the same LSwitch.

VServer (A) In Case where VM is Moved to VServer to which the Same LSwitch is Connected As illustrated in FIG. 47, when N VServers are connected to one LSwitch, it is assumed that VM that is activated on the first VServer is moved to N-th VServer. In such a case, the traffic (1) to (8) are changed. Specifically, there are changes as described below.

Figure 48:
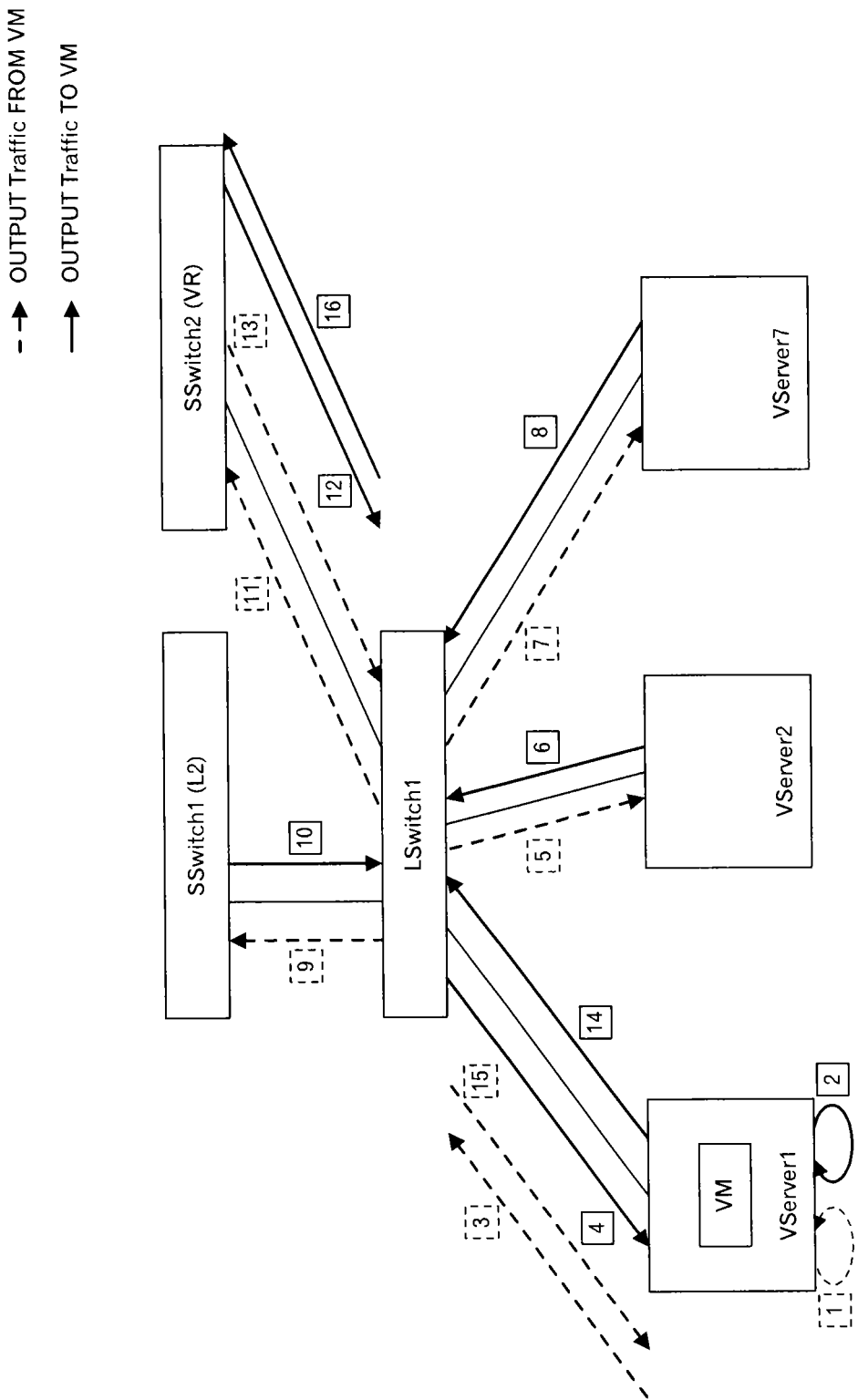
FIG. 48 is a diagram to explain the change of the flows when moving VM to VServer connected with the same LSwitch.

(1) $t_{VS:1 \to VS:1(fromVM)} \to 0$ (2) $t_{VS:1 \to VS:1(toVM)} \to 0$ (3) $t_{VS:1 \to LS} \to t_{VS:1 \to VS:1(toVM)} + t(VR)_{VS:1 \to LS(toVM)}$ (4) $t_{LS \to VS:1} \to t_{VS:1 \to VS:1(fromVM)} + t(VR)_{LS \to VS:1(fromVM)}$ (5) $t_{LS \to VS:N} \to t_{VS:1 \to VS:1(toVM)} + t_{LS \to VS:1(toVM)} + t(VR)_{LS \to VS:N(fromVM)} - t(L2)_{VS:N \to LS(toVM)}$ (6) $t_{VS:N \to LS} \to t_{VS:1 \to VS:1(fromVM)} + t_{VS:1 \to LS(fromVM)} + t(VR)_{VS:N \to S(toVM)} - t(L2)_{LS \to VS:N(fromVM)}$ (7) $0 \to t(L2)_{LS \to VS:N(fromVM)}$ (8) $0 \to t(L2)_{VS:N \to LS(toVM)}$ In the following, specific examples will be explained for such a case. Here, the explanation will be made based on the traffic before the movement, which is illustrated in FIG. 48. It is assumed that Virtual router is provided on SSwitch2 side, and L2-Tree is set for SSwitch1. Then, VM is moved from VServer1 to VServer2. Furthermore, the dotted line in FIG. 48 represents the output traffic from VM, and the solid line represents the output traffic to VM.

Figure 49:
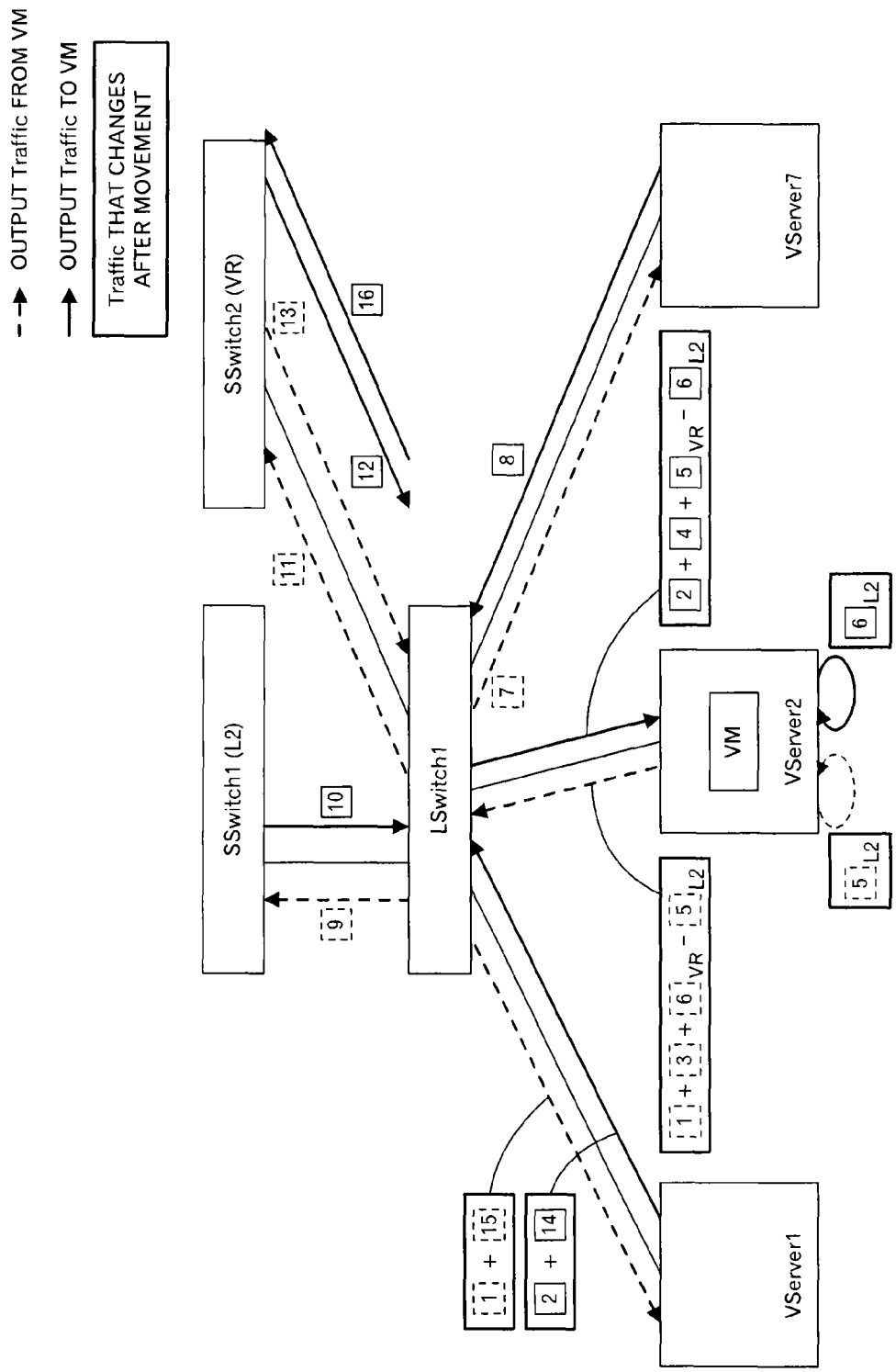
FIG. 49 is a diagram to explain the change of the flows when moving VM to VServer connected with the same LSwitch.

FIG. 49 illustrates traffic after the movement. The traffic for VM in VServer 1 that is the movement source is changed to "0", although it is not depicted. Then, the output traffic from VServer1 to LSwitch1, the output traffic from LSwitch1 to VServer1, the output traffic to VM within VServer2, the output traffic from VM within VServer2, the output traffic from VServer2 to LSwitch1 and the output traffic from LSwitch1 to VServer2 are changed.

Figure 50:
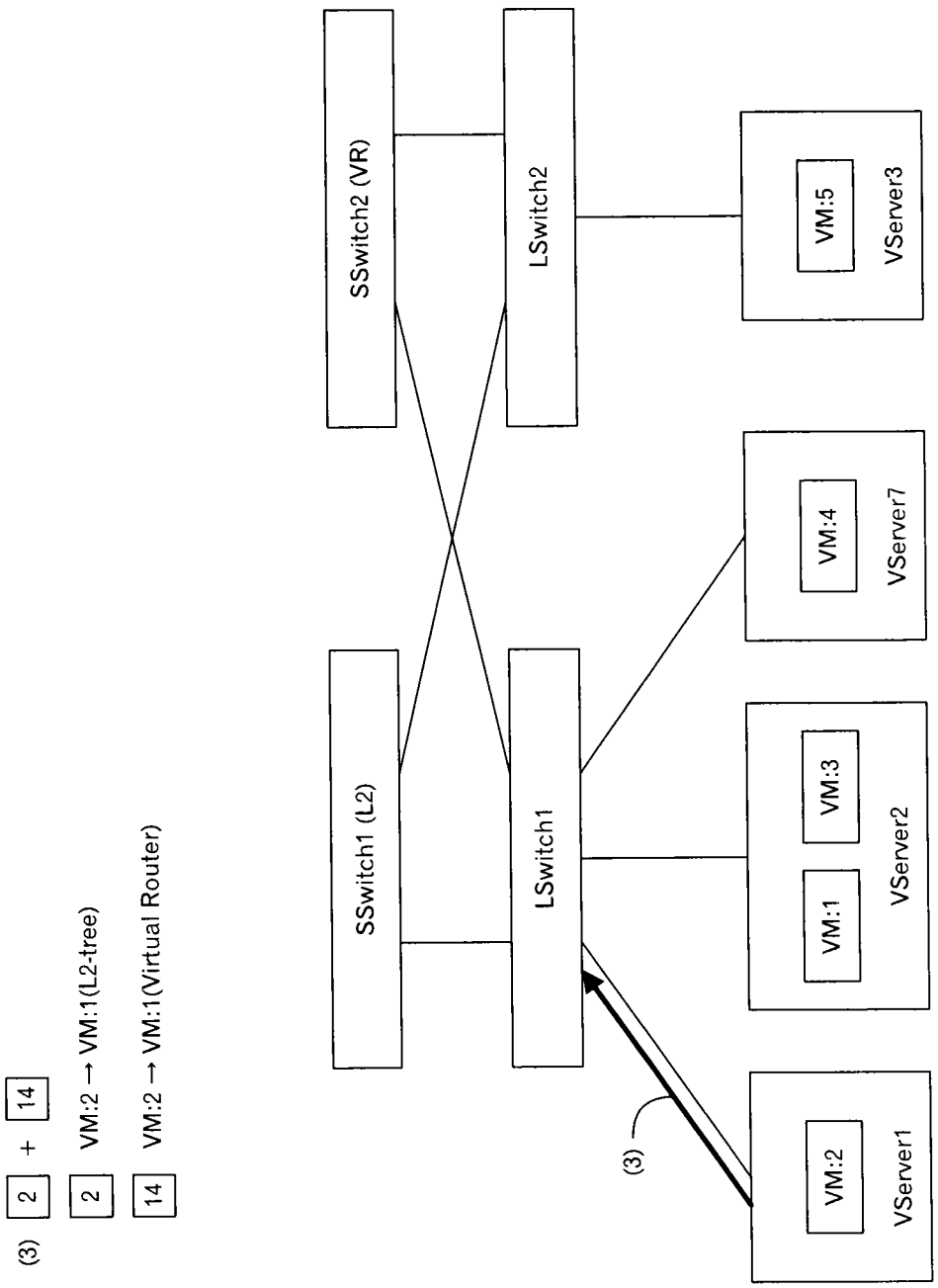
FIG. 50 is a diagram to explain the change of the flows when moving VM to VServer connected with the same LSwitch.

As illustrated in FIG. 50, the output traffic (3) in FIG. 47 is a sum of the traffic of the communication within the subnet from VM2 to VM1 (L2-Tree) and the traffic of the communication between the subnets from VM2 to VM1 (Virtual router). "2" and "14" represent the output traffic before the movement, which are represented in FIG. 48.

Figure 51:
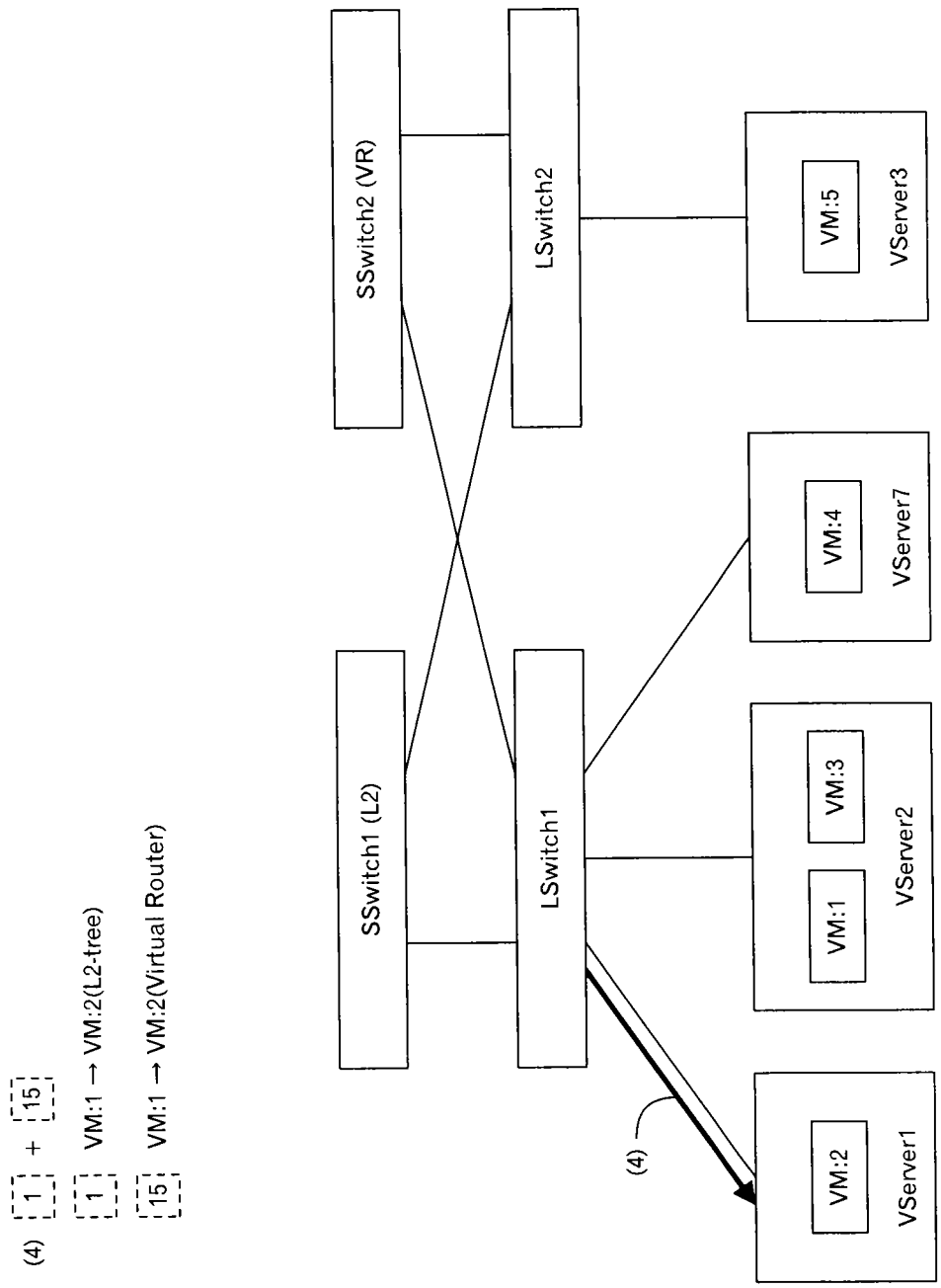
FIG. 51 is a diagram to explain the change of the flows when moving VM to VServer connected with the same LSwitch.

As illustrated in FIG. 51, the output traffic (4) in FIG. 47 is a sum of the traffic of the communication within the subnet from VM1 to VM2 (L2-Tree) and the traffic of the communication between the subnets from VM2 to VM1 (Virtual router). "1" and "15" represent output traffic before the movement, which are represented in FIG. 48.

Figure 52:
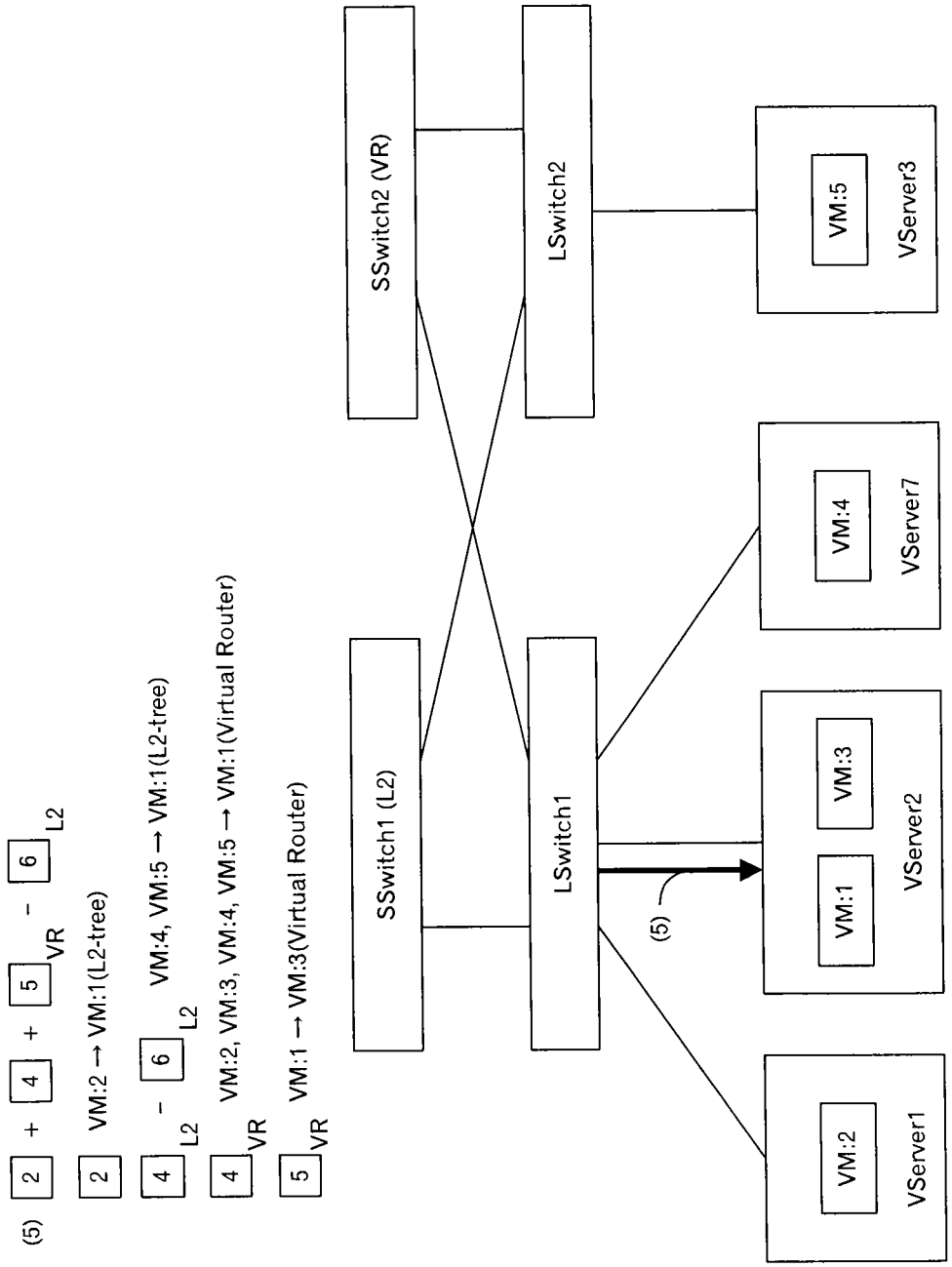
FIG. 52 is a diagram to explain the change of the flows when moving VM to VServer connected with the same LSwitch.

As illustrated in FIG. 52, the output traffic (5) in FIG. 47 is a sum of the traffic of the communication within the subnet from VM2 to VM1 (L2-Tree), the traffic of the communication within the subnet from VM4 and VM5 to VM1 (L2-Tree), the traffic of the communication between the subnets from VM2, VM3, VM4 and VM5 to VM1 (Virtual router) and the traffic of the communication between the subnets from VM1 to VM3 (Virtual route). "2", "4", "5" and "6" represent the output traffic before the movement, which are represented in FIG. 48.

Figure 53:
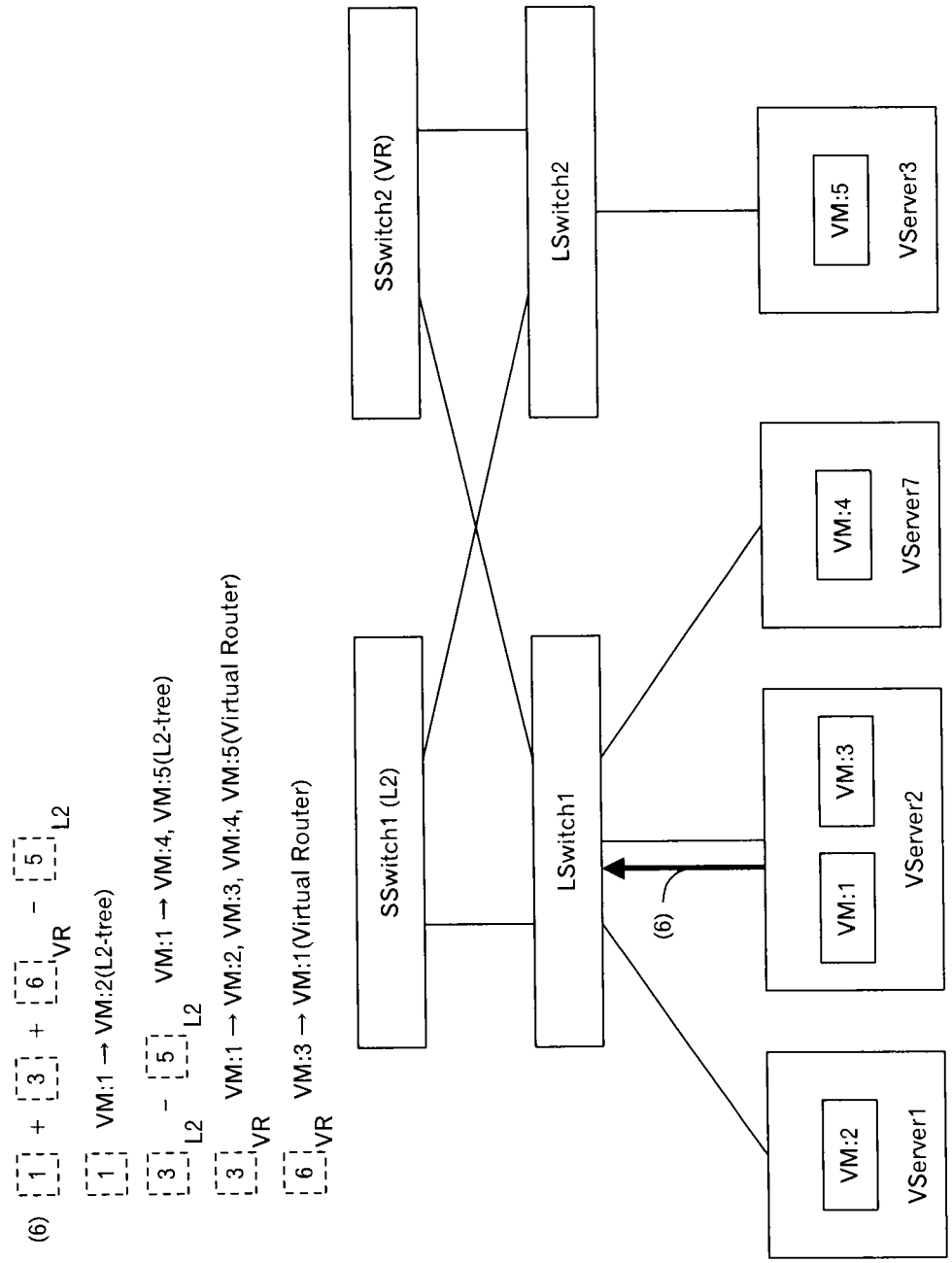
FIG. 53 is a diagram to explain the change of the flows when moving VM to VServer connected with the same LSwitch.

As illustrated in FIG. 53, the output traffic (6) in FIG. 47 is a sum of the traffic of the communication within the subnet from VM1 to VM2 (L2-Tree), the traffic of the communication within the subnet from VM1 to VM4 and VMS (L2-Tree), the traffic of the communication between the subnets from VM1 to VM2, VM3, VM4 and VM5 (Virtual router) and the traffic of the communication between the subnets from VM3 to VM1 (Virtual router). "1", "3", "6" and "5" represent the output traffic before the movement, which are represented in FIG. 48.

Figure 54:
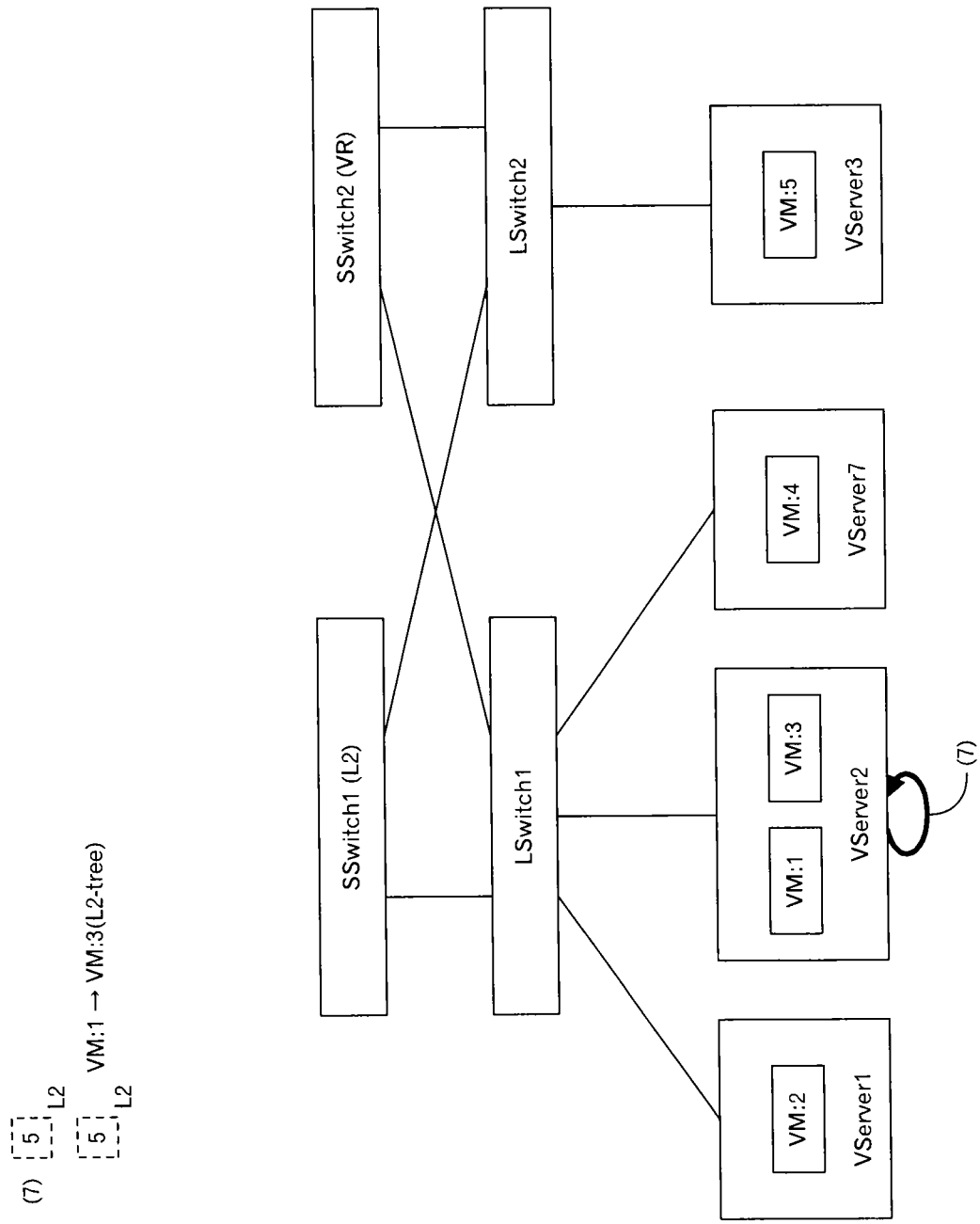
FIG. 54 is a diagram to explain the change of the flows when moving VM to VServer connected with the same LSwitch.

As illustrated in FIG. 54, the output traffic (7) in FIG. 47 is the traffic of the communication within the subnet from VM1 to VM3 (L2-Tree). "5" represents the output traffic before the movement, which is illustrated in FIG. 48.

Figure 55:
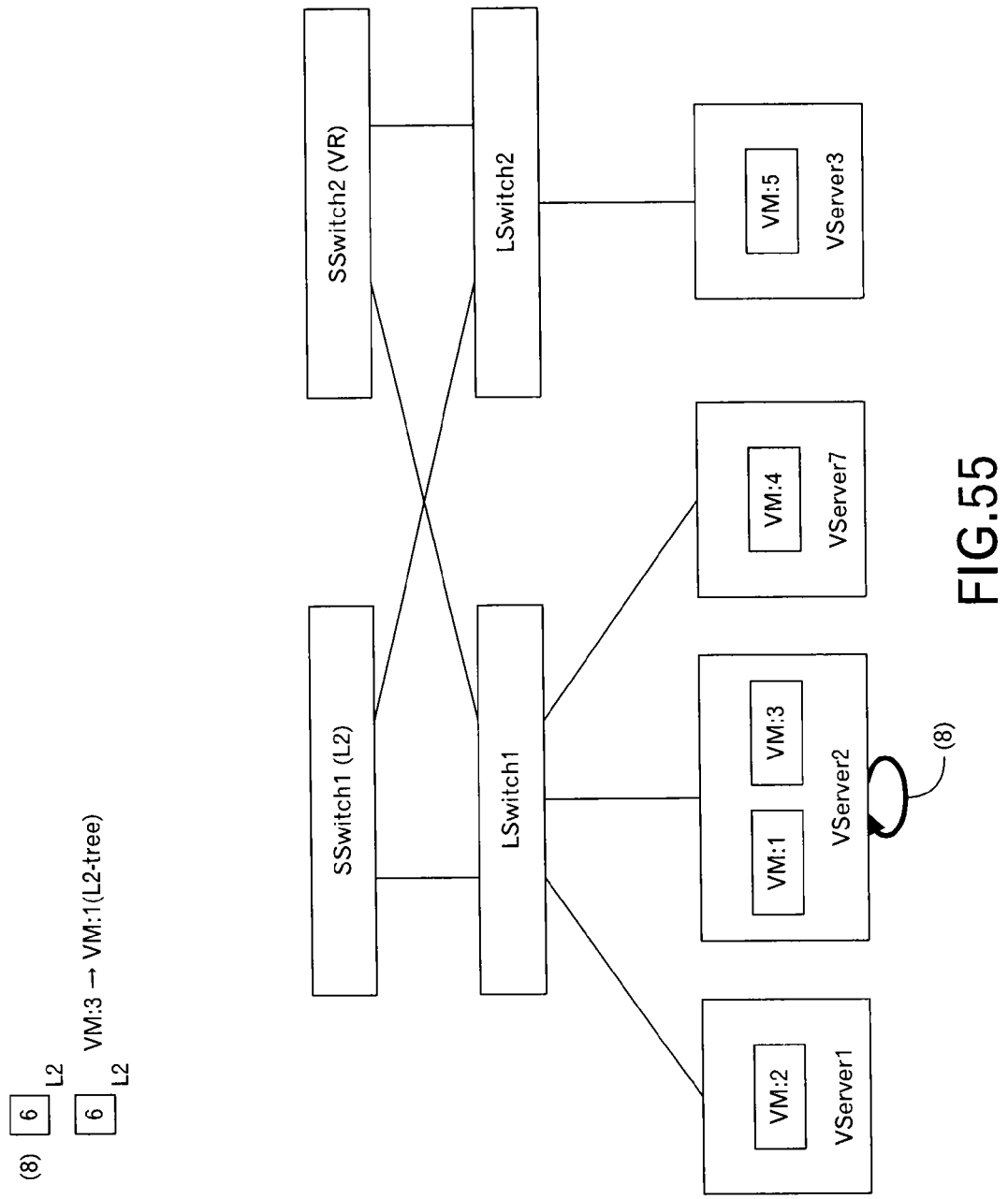
FIG. 55 is a diagram to explain the change of the flows when moving VM to VServer connected with the same LSwitch.

As illustrated in FIG. 55, the output traffic (8) in FIG. 47 is the traffic of the communication within the subnet from VM3 to VM1 (L2-Tree). "6" represents the output traffic before the movement, which is illustrated in FIG. 48.

Figure 56:
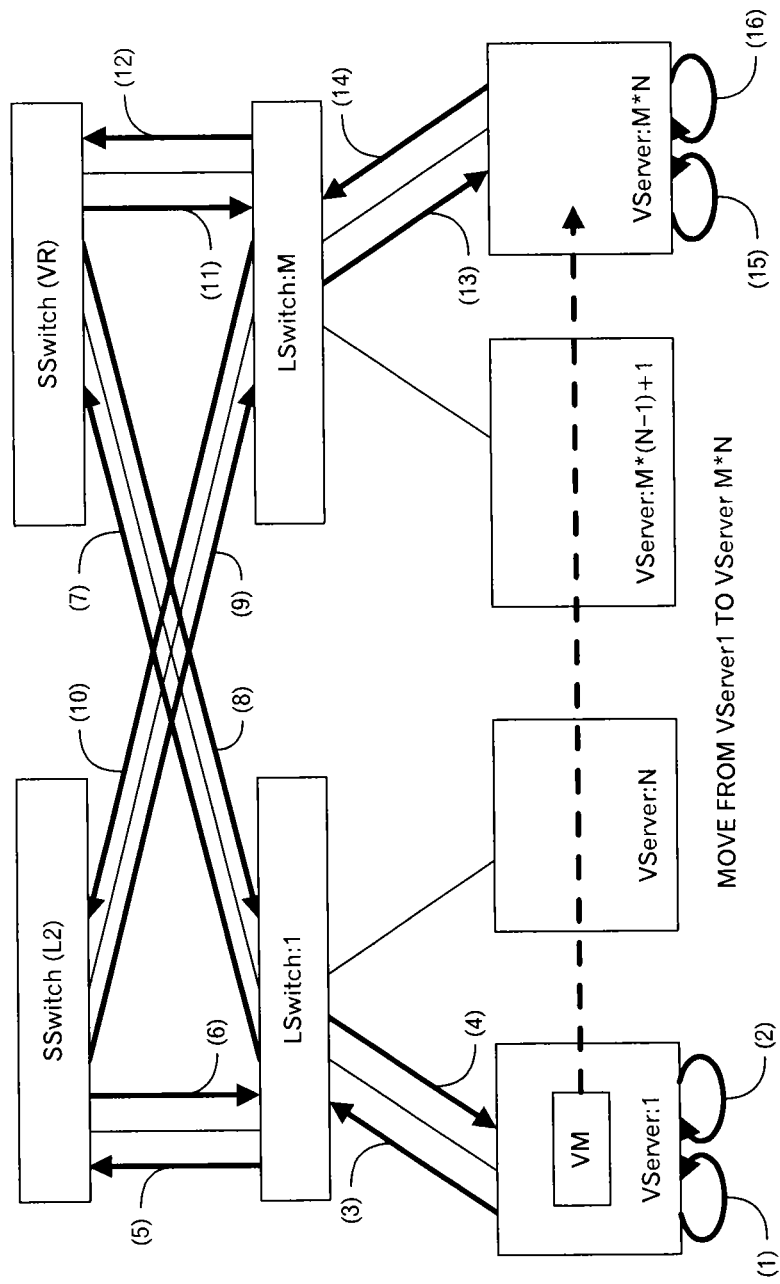
FIG. 56 is a diagram to explain change of flows when moving VM to VServer connected with different LSwitch.

(B) In Case where VM is Moved to VServer to which Different LSwitch is Connected As illustrated in FIG. 56, when N VServers are connected to one LSwitch and M LSwitch are totally provided, it is assumed that VM activated on the first VServer is moved to M*N-th VServer. In such a case, the traffic (1) to (16) are changed. Specifically, the traffic is changed as described below.

(1) $t_{VS:1 \to VS:1(fromVM)} \to 0$ (2) $t_{VS:1 \to VS:1(toVM)} \to 0$ (3) $t_{VS:1 \to LS} \to t_{VS:1 \to VS:1(toVM)} + t(VR)_{VS:1 \to LS:1(toVM)}$ (4) $t_{LS \to VS:1} \to t_{VS:1 \to VS:1(fromVM)} + t(VR)_{LS:1 \to VS:1(fromVM)}$ (5) $t_{LS:1 \to SS(L2)} \to t_{VS:1 \to VS:1(toVM)} + \Sigma t(L2)_{VS:k \to LS:1(toVM)}$ (k: 2, ..., N)

(6) $t_{SS(L2) \to LS:1} \to t_{VS:1 \to VS:1(fromVM)} + \Sigma t(L2)_{VS:1 \to VS:k(fromVM)}$ (k: 2, ..., N)

(7) $t_{LS:1 \to SS(VR)} \to t_{(VR)VS:1 \to LS:1(toVM)} + \Sigma t(VR)_{VS:k \to LS:1(toVM)}$ (k: 2, ..., N)=$t(VR)_{LS:1 \to SS(VR)(toVM)}$ (8) $t_{SS(VR) \to LS:1} \to t(VR)_{LS:1 \to VS:1(fromVM)} + \Sigma t(VR)_{LS:1 \to VS:k(fromVM)}$ (k: 2, ..., N)=$t(VR)_{SS(VR) \to VS:1(fromVM)}$ (9) $t_{SS(L2) \to LS:M} \to (3) + \Sigma t(L2)_{LS:k \to SS(L2)(toVM)}$ (k: 2, ..., M−1)

(10) $t_{LS:M \to SS(L2)} \to (4) + \Sigma t(L2)_{SS(L2) \to LS:k(fromVM)}$ (k: 2, ..., M−1)

(11) $t_{SS(VR) \to SS:M} \to t(VR)_{SS(VR) \to LS:1(toVM)} (= t(VR)_{LS:1 \to VS:1(toVM)}) + \Sigma t(VR)_{LS:M \to VS:k(fromVM)}$ (k: M*(N−1)+1, ..., M*N)

(12) $t_{LS:M \to SS(VR)} \to t(VR)_{LS:1 \to SS(VR)(fromVM)} (= t(VR)_{VS:1 \to LS:1(fromVM)}) + \Sigma t(VR)_{VS:k \to LS:M(toVM)}$ (k: M*(N−1)+1, ..., M*N)

(13) $t_{LS:M \to VS:M*N} \to t_{VS:1 \to VS:1(toVM)} + t_{LS:1 \to VS:1(toVM)} + t(VR)_{LS:M \to VS:M*N(fromVM)} - t(L2)_{VS:M*N \to LS:M(toVM)}$

(14) $t_{VS:M*N \to LS:M} \to t_{VS:1 \to VS:1(fromVM)} + t_{VS:1 \to LS:1(fromVM)} + t(VR)_{VS:M*N \to LS:M(toVM)} - t(L2)_{LS:M \to VS:M*N(fromVM)}$

(15) $0 \propto t(L2)_{VS:1 \to VS:M*N(fromVM)}$

(16) $0 \to t(L2)_{VS:M*N \to VS:1(toVM)}$

Figure 57:
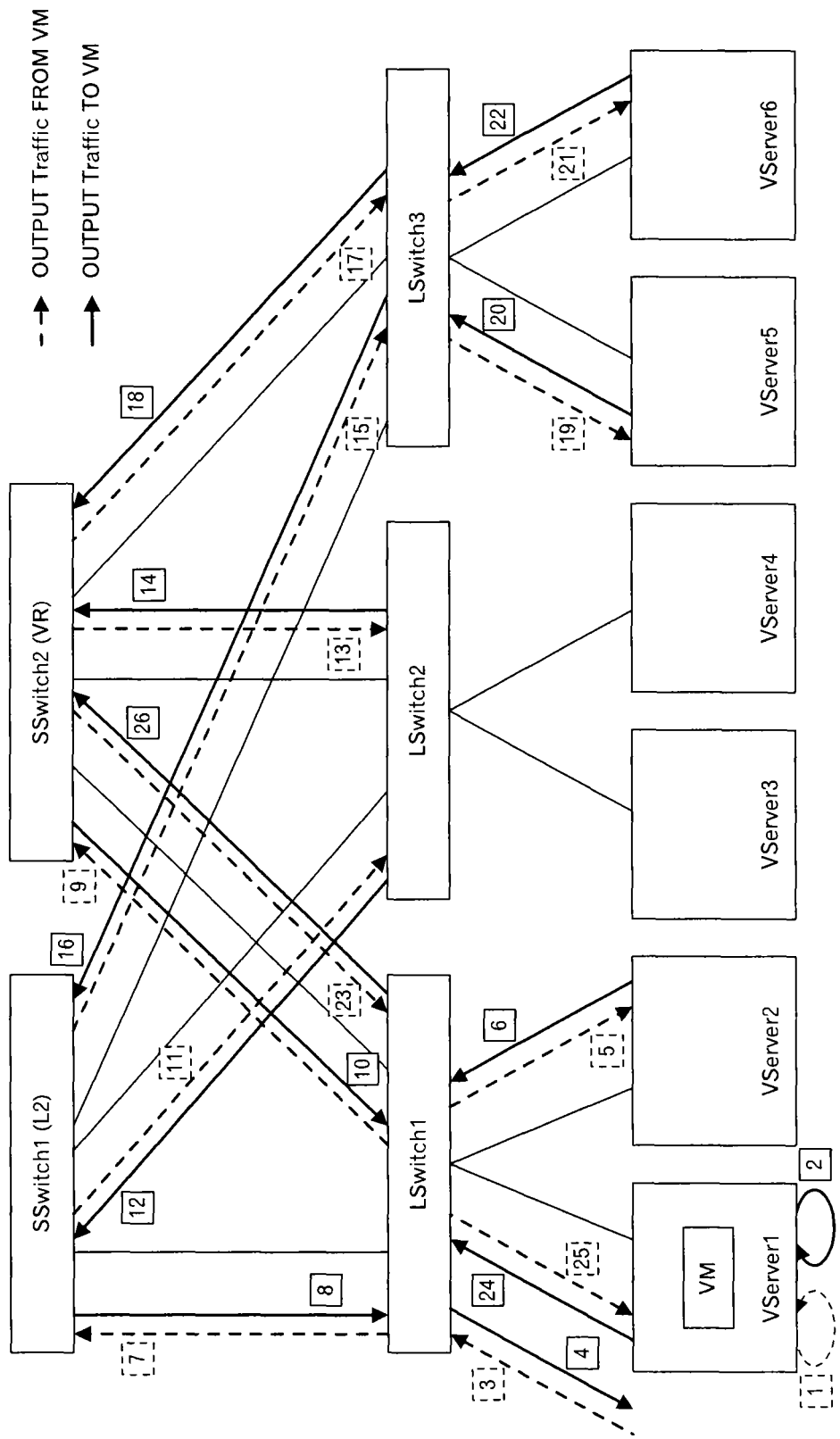
FIG. 57 is a diagram to explain the change of the flows when moving VM to VServer connected with the different LSwitch.

In the following, the specific examples for such cases will be explained. Here, explanation will be made based on the traffic before the movement, which is depicted in FIG. 57. It is assumed that Virtual router is provided on SSwitch2 side, and L2-Tree is provided in SSwitch1. Then, it is assumed that VM is moved from VServer1 to VServer6. Furthermore, the dotted lines in FIG. 57 represent the output traffic from VM, and the solid lines represent the output traffic to VM.

Figure 58:
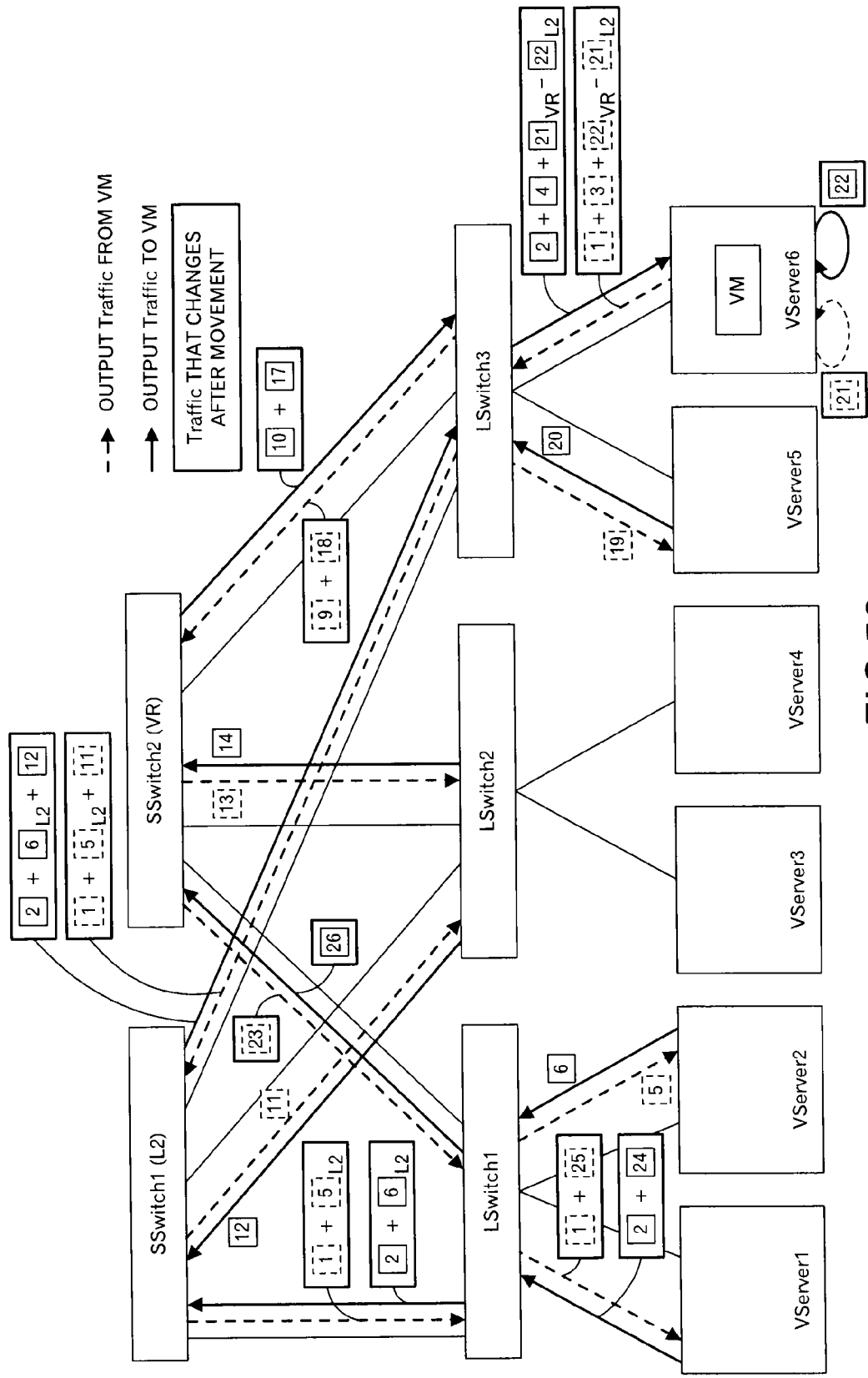
FIG. 58 is a diagram to explain the change of the flows when moving VM to VServer connected with the different LSwitch.

FIG. 58 illustrates the traffic after the movement. The traffic for VM within VServer1 that is the movement source is changed to "0", although it is not depicted. Then, the output traffic from VServer1 to LSwitch1, the output traffic from LSwitch1 to VServer1, the output traffic from LSwitch1 to SSwitch1, the output traffic from SSwitch1 to LSwitch1, the output traffic from LSwitch1 to SSwitch2, the output traffic from SSwitch2 to LSwitch1, the output traffic from SSwitch1 to LSwitch3, the output traffic from LSwitch3 to SSwitch1, the output traffic from SSwitch2 to LSwitch3, the output traffic from LSwitch3 to SSwitch2, the output traffic to VMs within VServer6, the output traffic from VMs within VServer6, the output traffic from VServer6 to LSwitch3 and the output traffic from LSwitch3 to VServer6 are changed.

Figure 59:
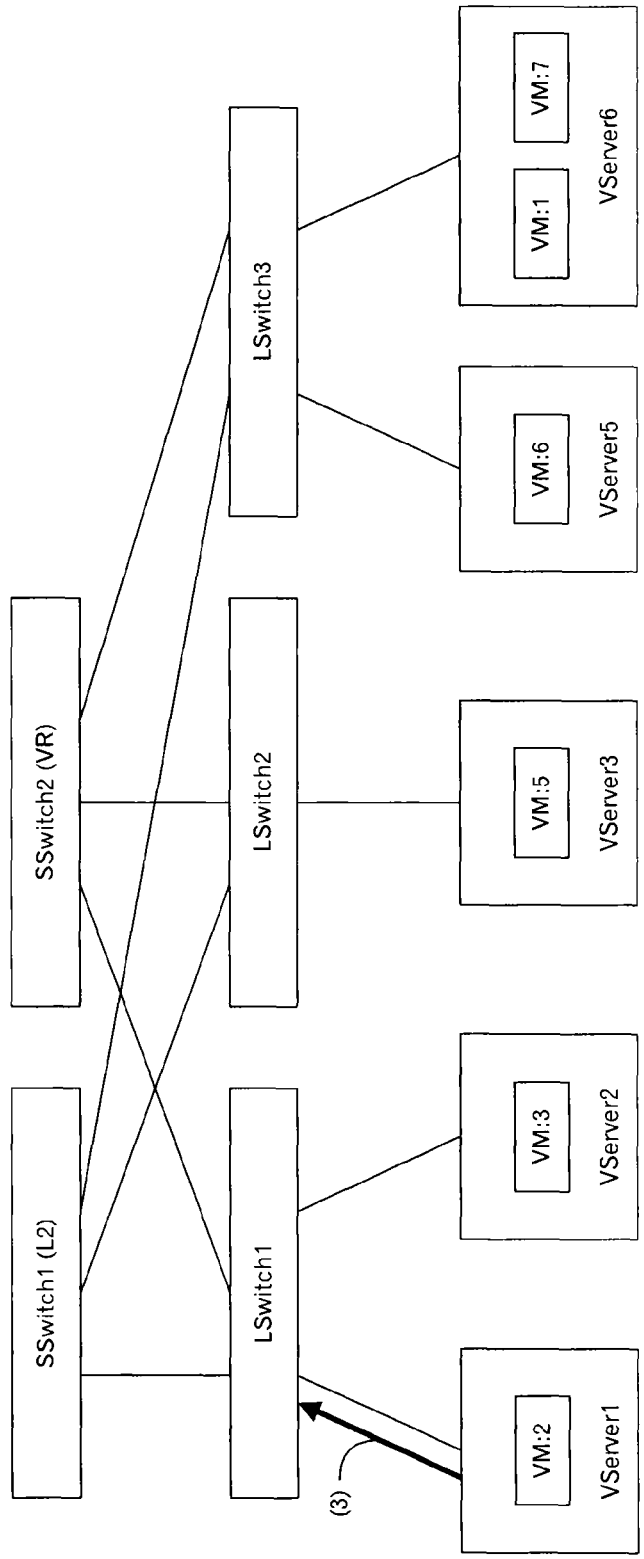
FIG. 59 is a diagram to explain the change of the flows when moving VM to VServer connected with the different LSwitch.

As illustrated in FIG. 59, the output traffic (3) in FIG. 56 is a sum of the traffic in the communication within the subnet from VM2 to VM1 (L2-Tree) and the traffic in the communication between the subnets from VM2 to VM1 (Virtual router). "2" and "24" represent the output traffic before the movement, which are represented in FIG. 57.

Figure 60:
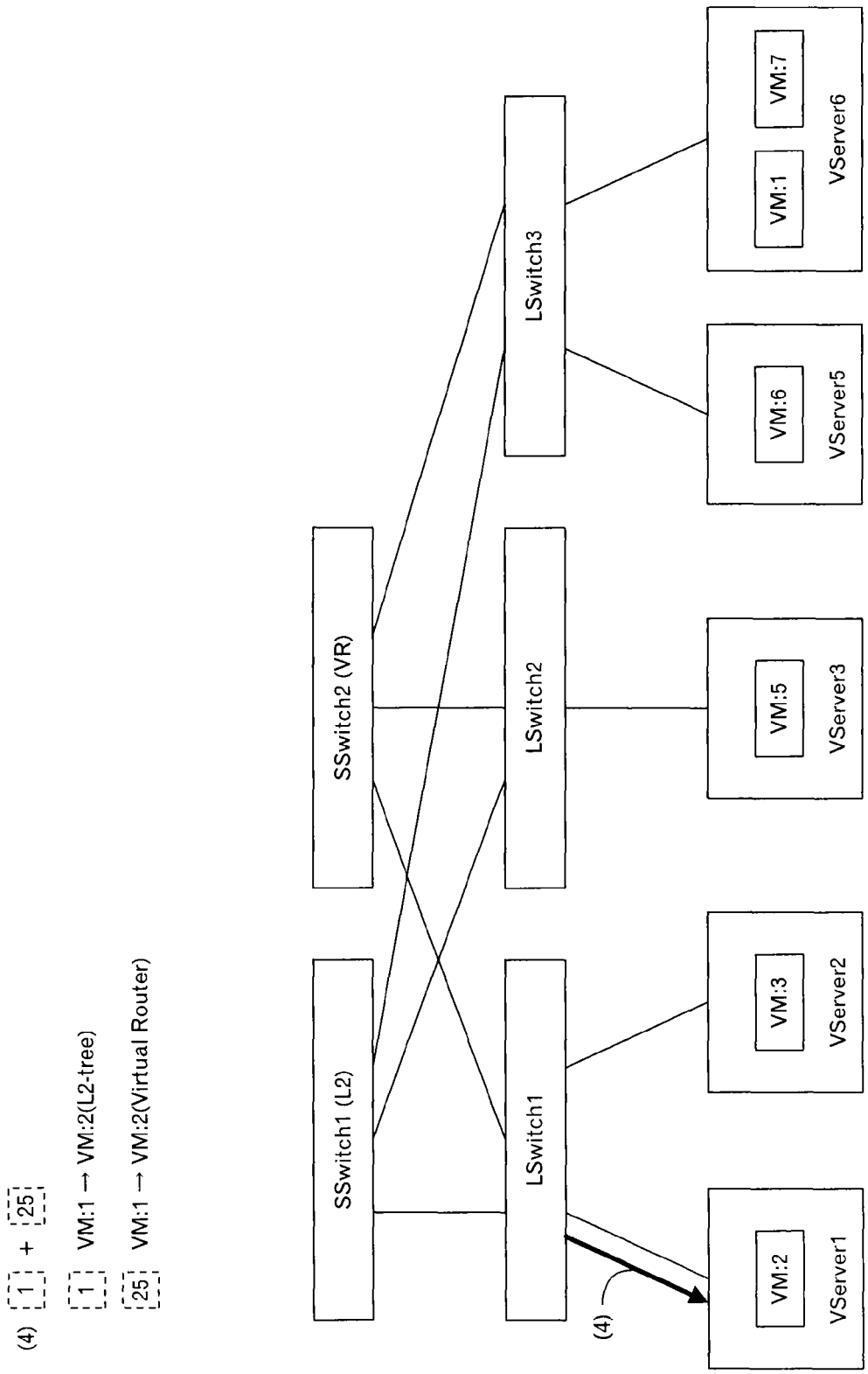
FIG. 60 is a diagram to explain the change of the flows when moving VM to VServer connected with the different LSwitch.

As illustrated in FIG. 60, the output traffic (4) in FIG. 56 is a sum of the traffic in the communication within the subnet from VM1 to VM2 (L2-Tree) and the traffic in the communication between the subnets from VM1 to VM2 (Virtual router). "1" and "25" represent the output traffic before the movement, which are represented by FIG. 57.

Figure 61:
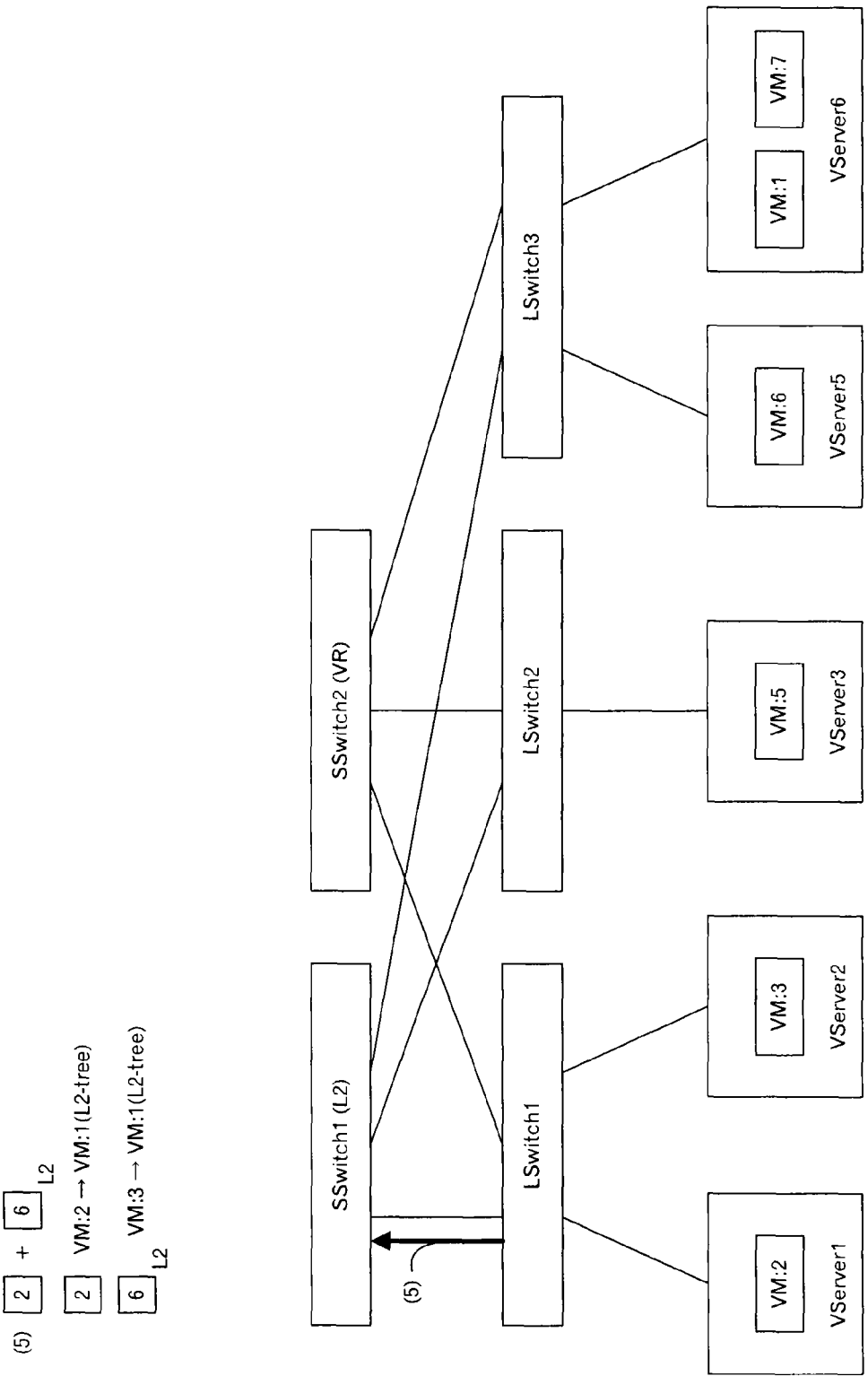
FIG. 61 is a diagram to explain the change of the flows when moving VM to VServer connected with the different LSwitch.

As illustrated in FIG. 61, the output traffic (5) in FIG. 56 is a sum of the traffic in the communication within the subnet from VM2 to VM1 (L2-Tree) and the traffic in the communication within the subnet from VM3 to VM1 (L2-Tree). "2" and "6" represent the output traffic before the movement, which are represented by FIG. 57.

Figure 62:
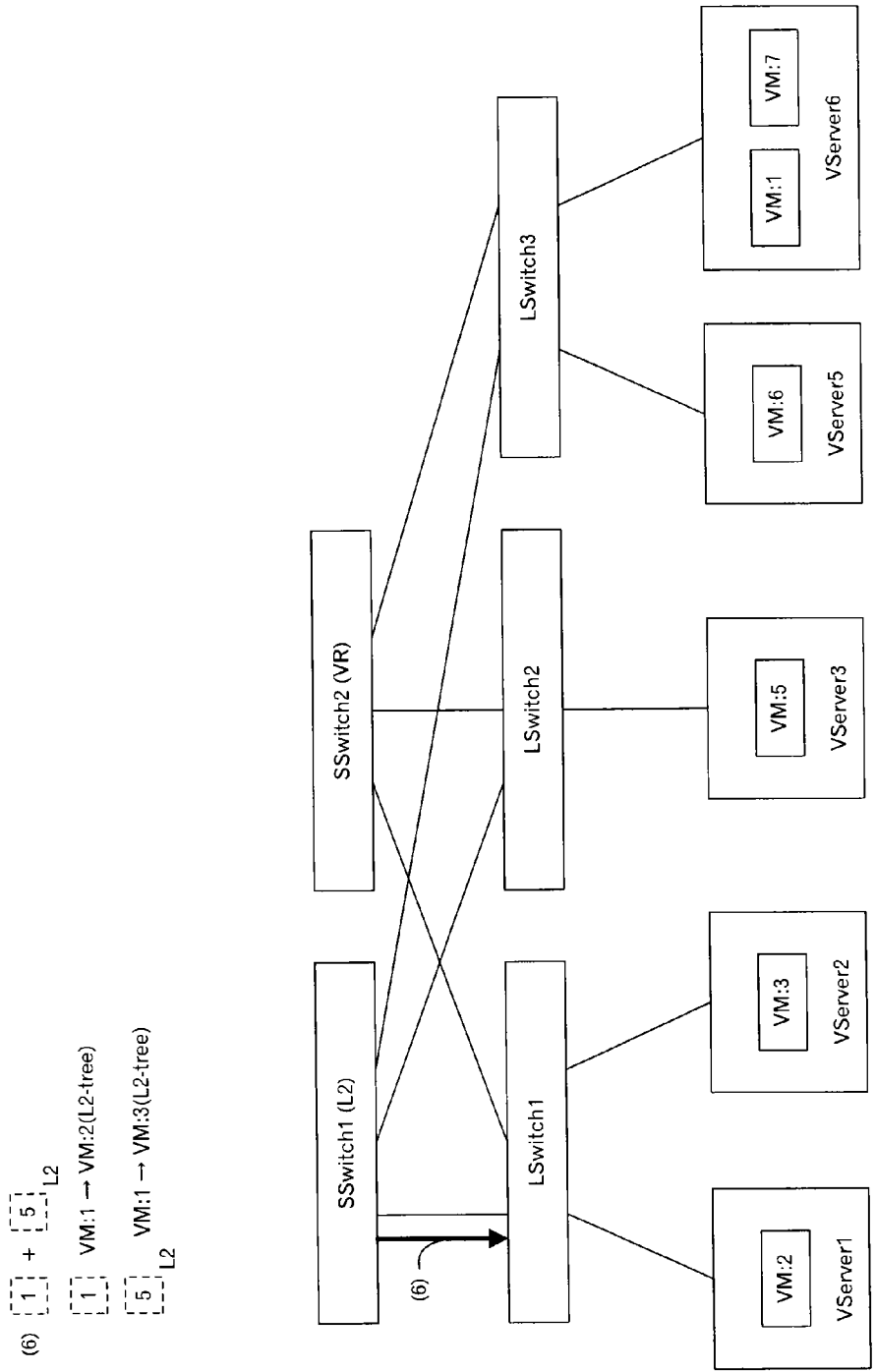
FIG. 62 is a diagram to explain the change of the flows when moving VM to VServer connected with the different LSwitch.

As illustrated in FIG. 62, the output traffic (6) in FIG. 56 is a sum of the traffic in the communication within the subnet from VM1 to VM2 (L2-Tree) and the traffic in the communication within the subnet from VM1 to VM3 (L2-Tree). "1" and "5" represent the output traffic before the movement, which are represented by FIG. 57.

Figure 63:
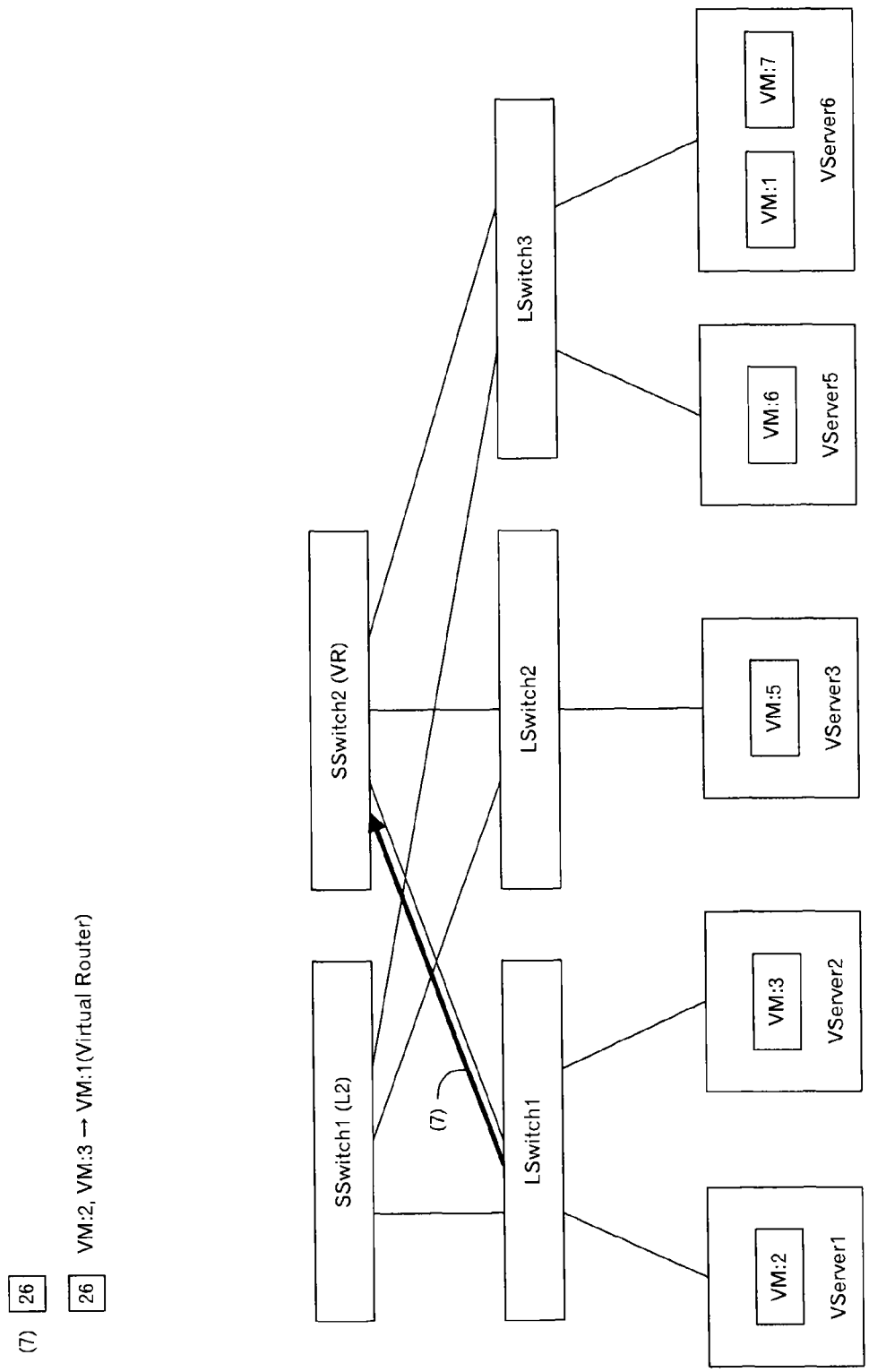
FIG. 63 is a diagram to explain the change of the flows when moving VM to VServer connected with the different LSwitch.

As illustrated in FIG. 63, the output traffic (7) in FIG. 56 is the traffic in the communication between the subnets from VM2 and VM3 to VM1 (Virtual router). "26" represents the output traffic before the movement, which is represented in FIG. 57.

Figure 64:
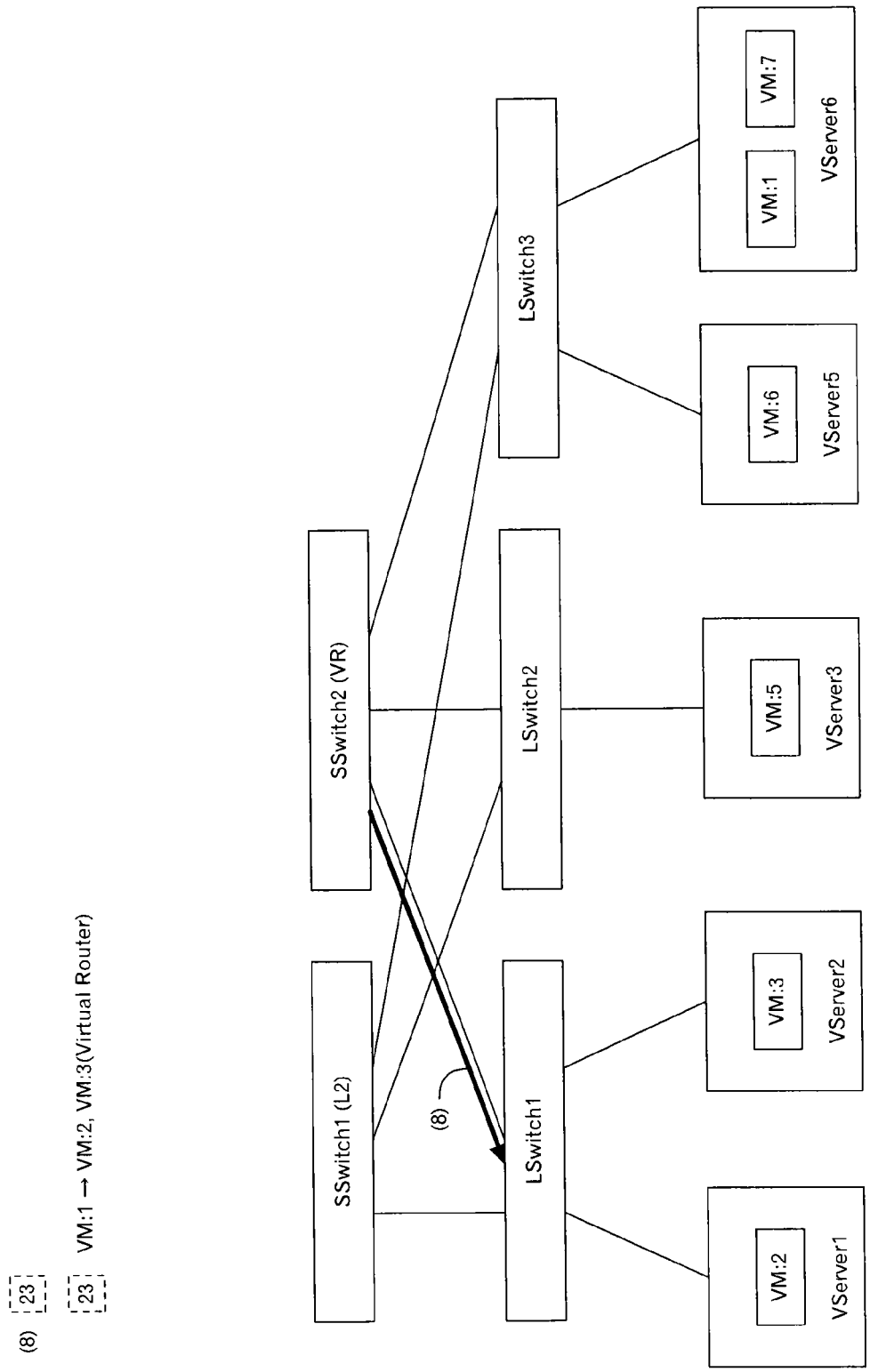
FIG. 64 is a diagram to explain the change of the flows when moving VM to VServer connected with the different LSwitch.

As illustrated in FIG. 64, the output traffic (8) in FIG. 56 is the traffic in the communication between the subnets from VM1 to VM2 and VM3 (Virtual router). "23" represents the output traffic before the movement, which is represented in FIG. 57.

Figure 65:
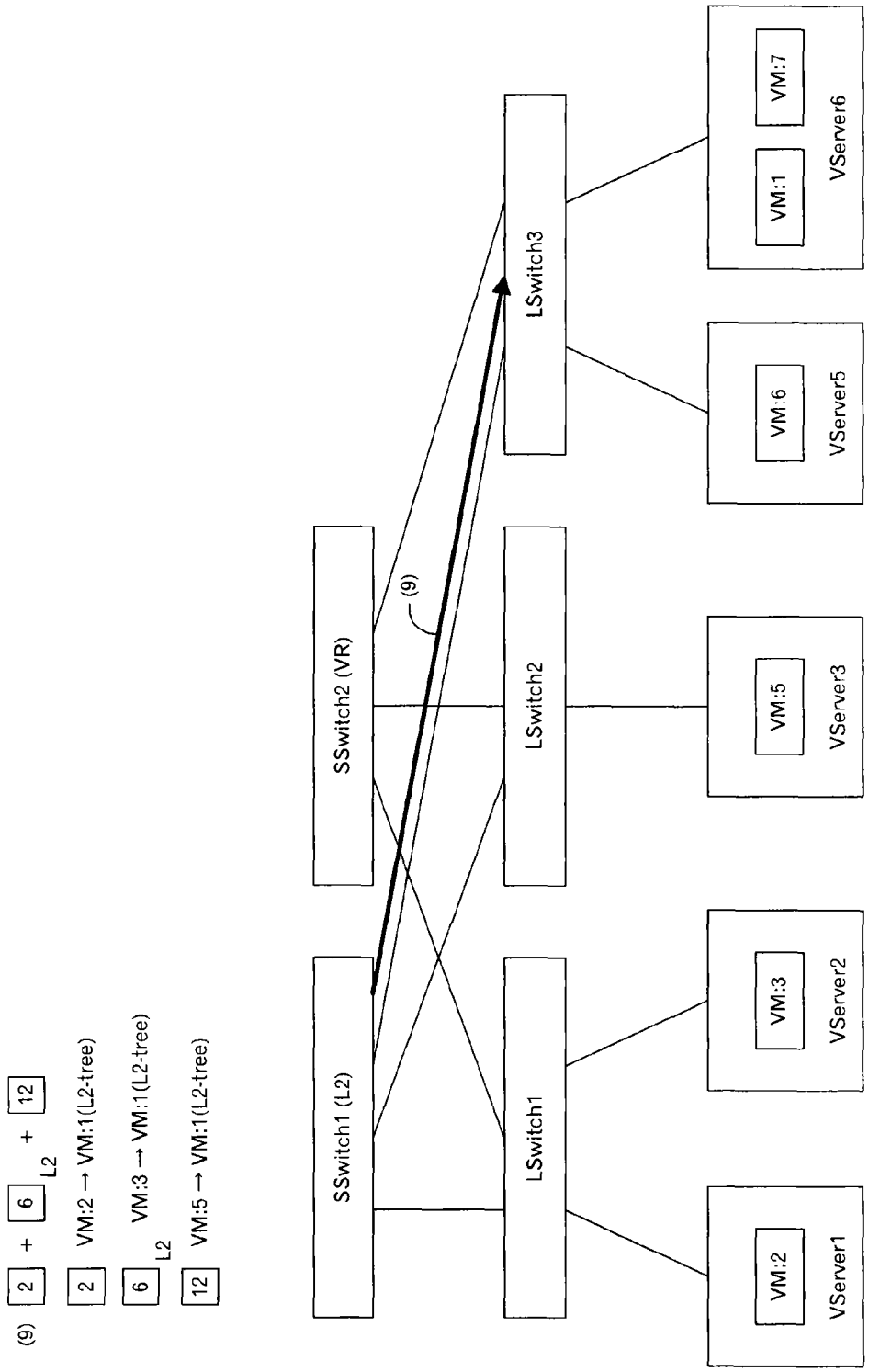
FIG. 65 is a diagram to explain the change of the flows when moving VM to VServer connected with the different LSwitch.

As illustrated in FIG. 65, the output traffic (9) in FIG. 56 is a sum of the traffic in the communication within the subnet from VM2 to VM1 (L2-Tree), the traffic in the communication within the subnet from VM3 to VM1 (L2-Tree) and the traffic in the communication within the subnet from VM5 to VM1 (L2-Tree). "2", "6" and "12" represent the output traffic before the movement, which are represented in FIG. 57.

Figure 66:
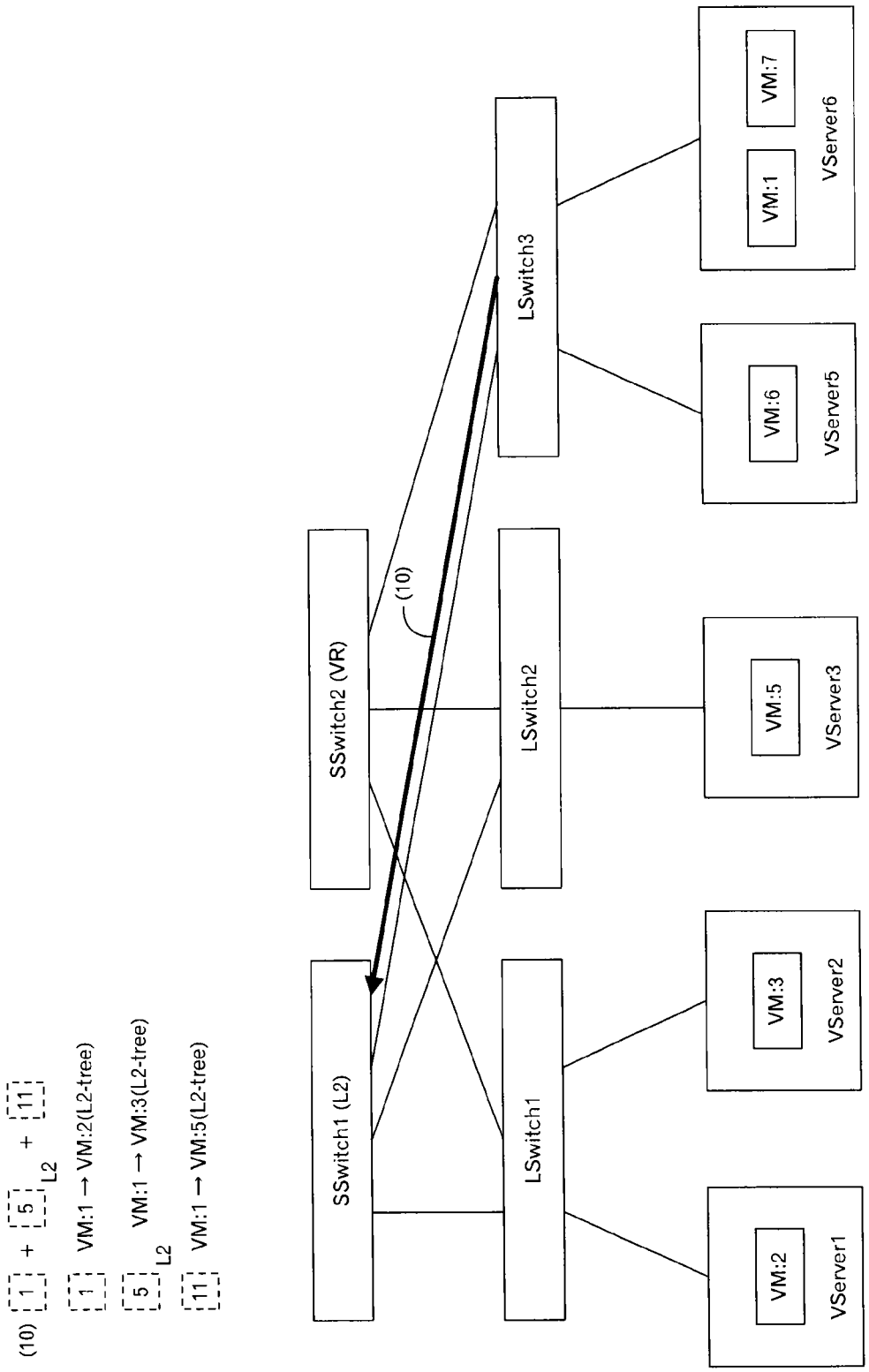
FIG. 66 is a diagram to explain the change of the flows when moving VM to VServer connected with the different LSwitch.

As illustrated in FIG. 66, the output traffic (10) in FIG. 56 is a sum of the traffic in the communication within the subnet from VM1 to VM2 (L2-Tree), the traffic in the communication within the subnet from VM1 to VM3 (L2-Tree) and the traffic in the communication within the subnet from VM1 to VM5 (L2-Tree). "1", "5" and "11" represent the output traffic before the movement, which are represented in FIG. 57.

Figure 67:
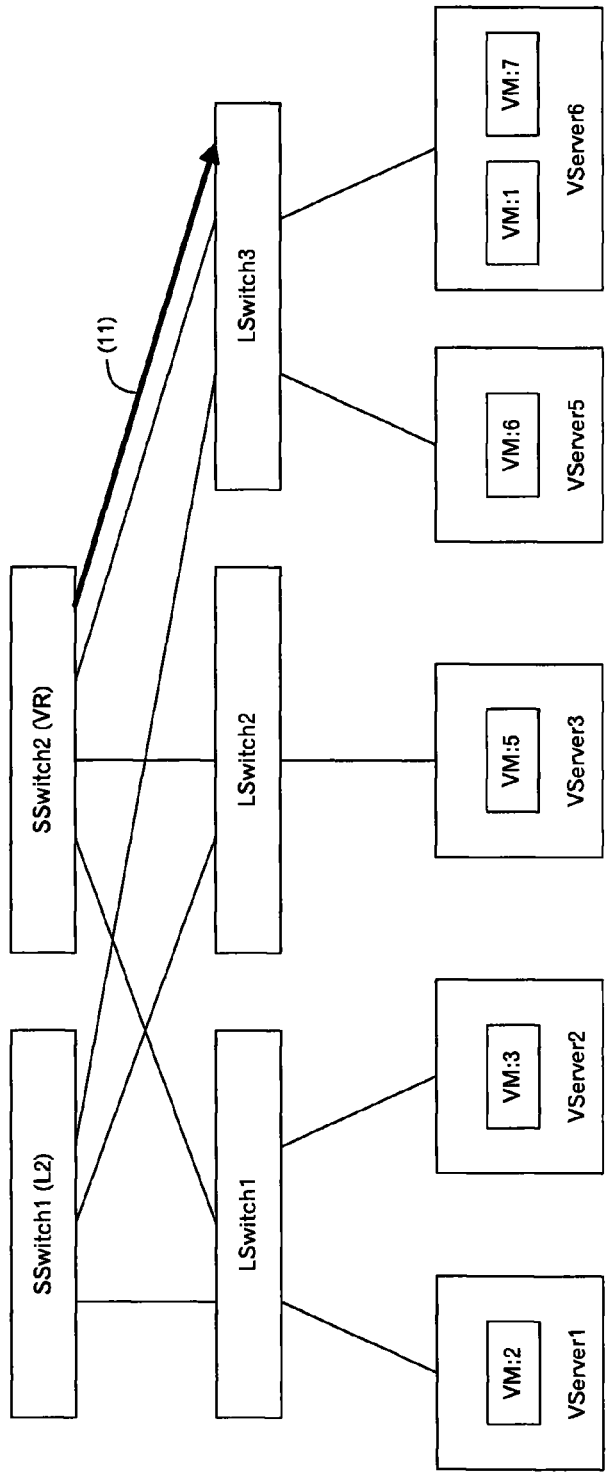
FIG. 67 is a diagram to explain the change of the flows when moving VM to VServer connected with the different LSwitch.

As illustrated in FIG. 67, the output traffic (11) in FIG. 56 is a sum of the traffic in the communication between the subnets from VM2, VM3, VM5, VM6 and VM7 to VM1 (Virtual router) and the traffic in the communication between the subnets from VM1 to VM6 and VM7 (Virtual router). "10" and "17" represent the output traffic before the movement, which are represented in FIG. 57.

Figure 68:
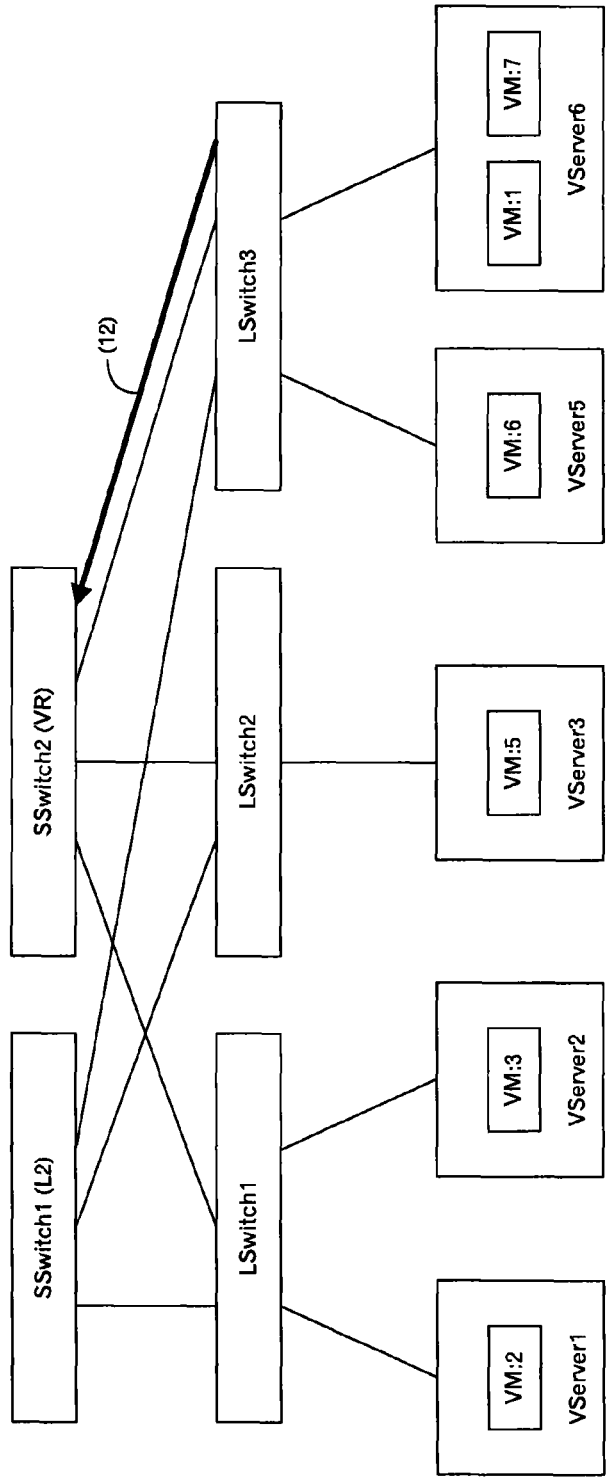
FIG. 68 is a diagram to explain the change of the flows when moving VM to VServer connected with the different LSwitch.

As illustrated in FIG. 68, the output traffic (12) in FIG. 56 is a sum of the traffic in the communication between the subnets from VM1 to VM2, VM3, VM5, VM6 and VM7 (Virtual router) and the traffic in the communication between the subnets from VM6 and VM7 to VM1 (Virtual router). "9" and "18" represent the output traffic before the movement, which are represented in FIG. 57.

Figure 69:
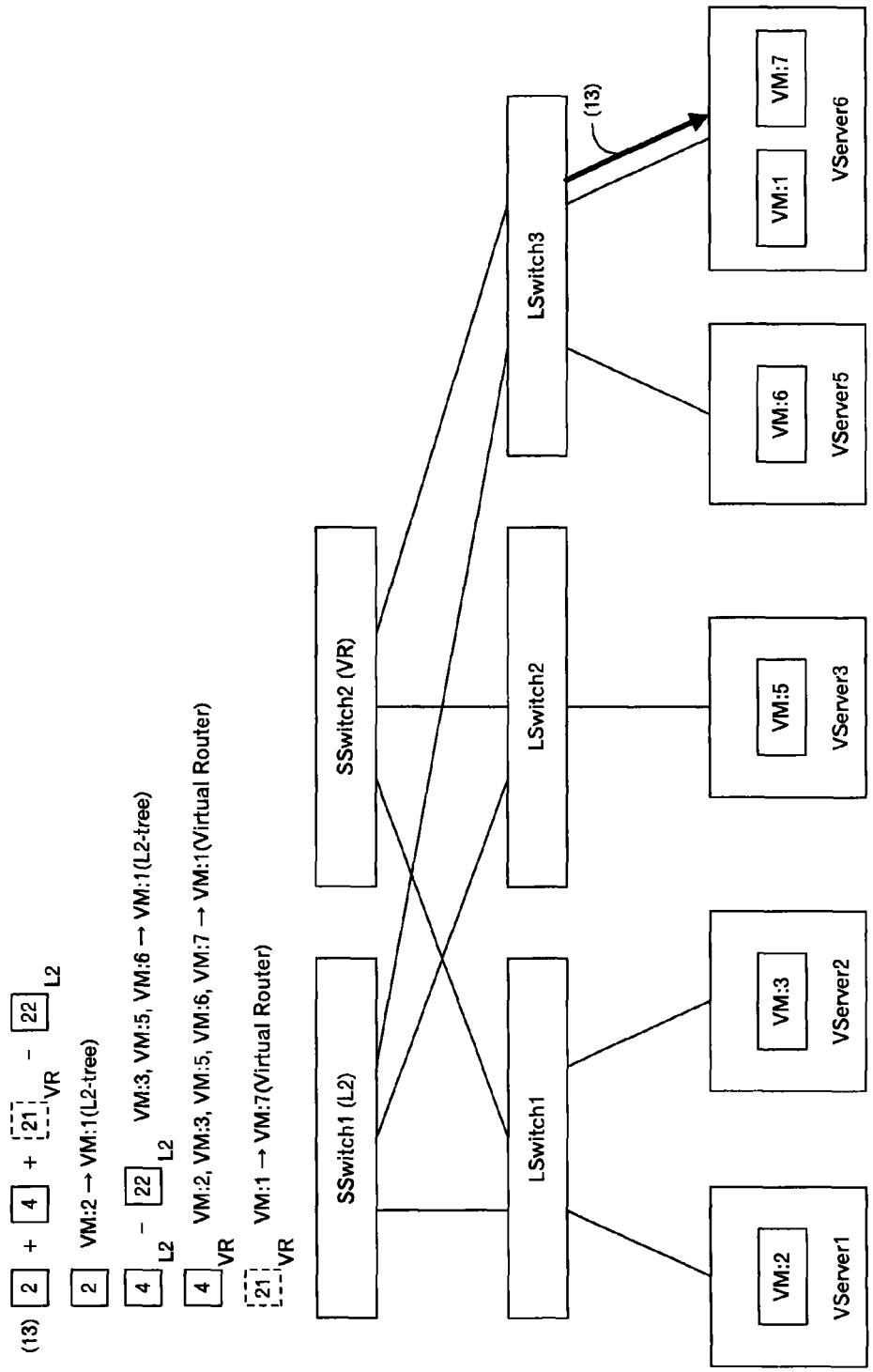
FIG. 69 is a diagram to explain the change of the flows when moving VM to VServer connected with the different LSwitch.

As illustrated in FIG. 69, the output traffic (13) in FIG. 56 is a sum of the traffic in the communication within the subnet from VM2 to VM1 (L2-Tree), the traffic in the communication within the subnet from VM3, VM5 and VM6 to VM1 (L2-Tree), the traffic in the communication between the subnets from VM2, VM3, VMS, VM6 and VM7 to VM1 (Virtual router) and the traffic in the communication between the subnets from VM1 to VM7 (Virtual router). "2", "4", "22" and "21" represent the output traffic before the movement, which are represented in FIG. 57.

Figure 70:
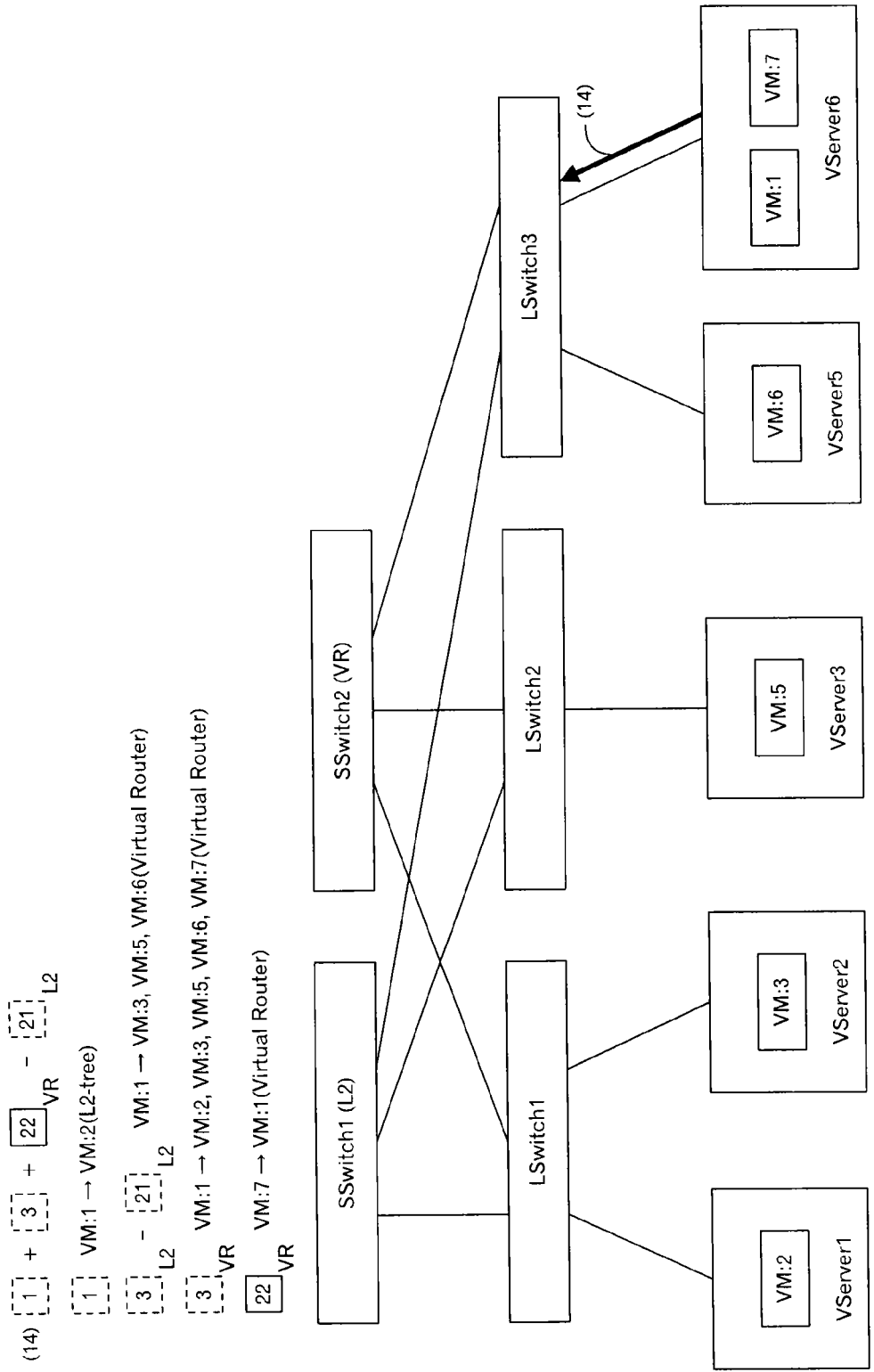
FIG. 70 is a diagram to explain the change of the flows when moving VM to VServer connected with the different LSwitch.

As illustrated in FIG. 70, the output traffic (14) in FIG. 56 is a sum of the traffic in the communication within the subnet from VM1 to VM2 (L2-Tree), the traffic in the communication between the subnets from VM1 to VM3, VM5 and VM6 (Virtual router), the traffic in the communication between the subnets from VM1 to VM2, VM3, VMS, VM6 and VM7 (Virtual router) and the traffic in the communication between the subnets from VM7 to VM1 (Virtual router). "1", "3", "21" and "22" represent the output traffic before the movement, which are represented in FIG. 57.

Figure 71:
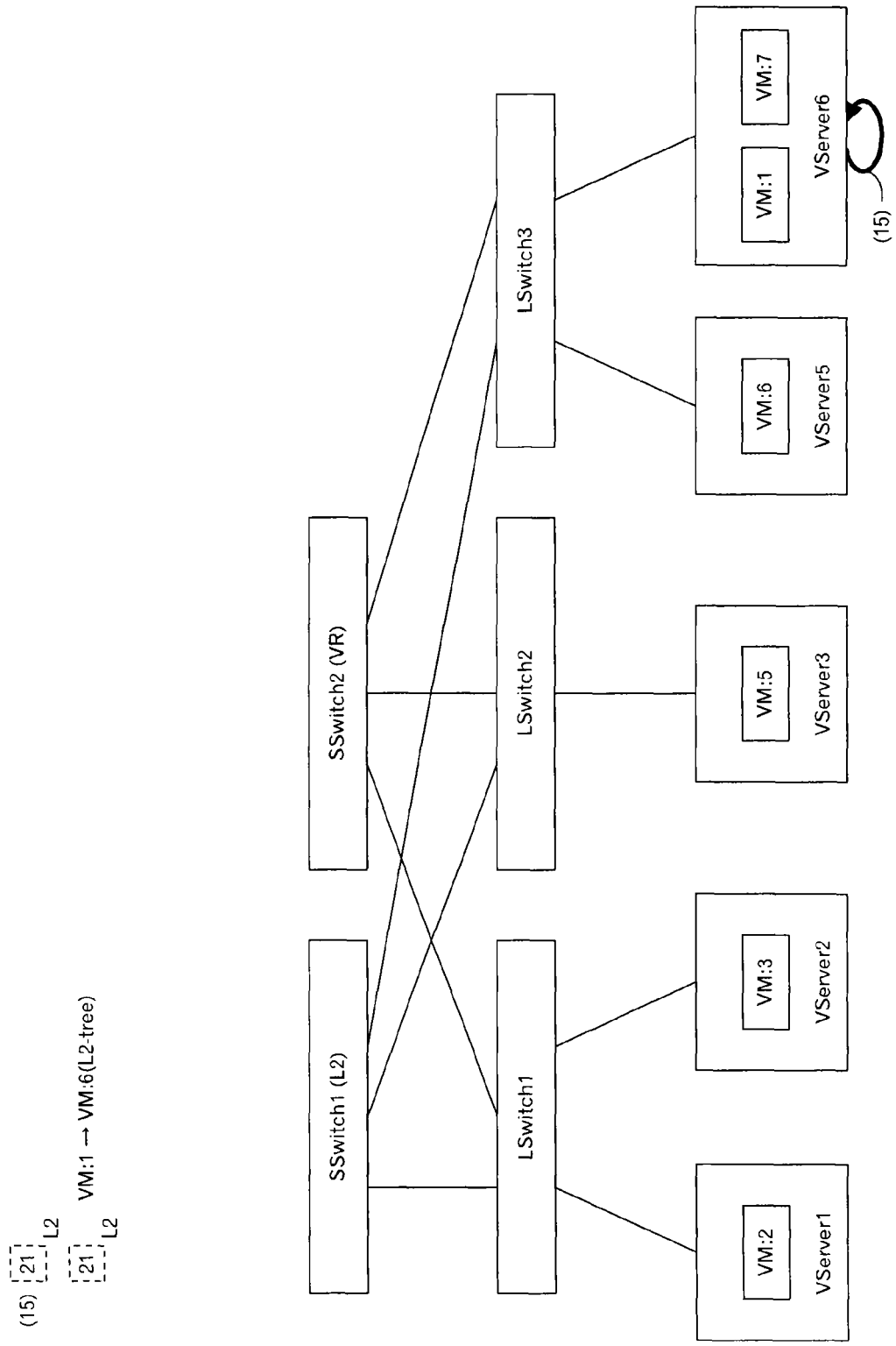
FIG. 71 is a diagram to explain the change of the flows when moving VM to VServer connected with the different LSwitch.

As illustrated in FIG. 71, the output traffic (15) in FIG. 56 is the traffic in the communication within the subnet from VM1 to VM6 (L2-Tree). "21" represents the output traffic before the movement, which is represented in FIG. 57.

Figure 72:
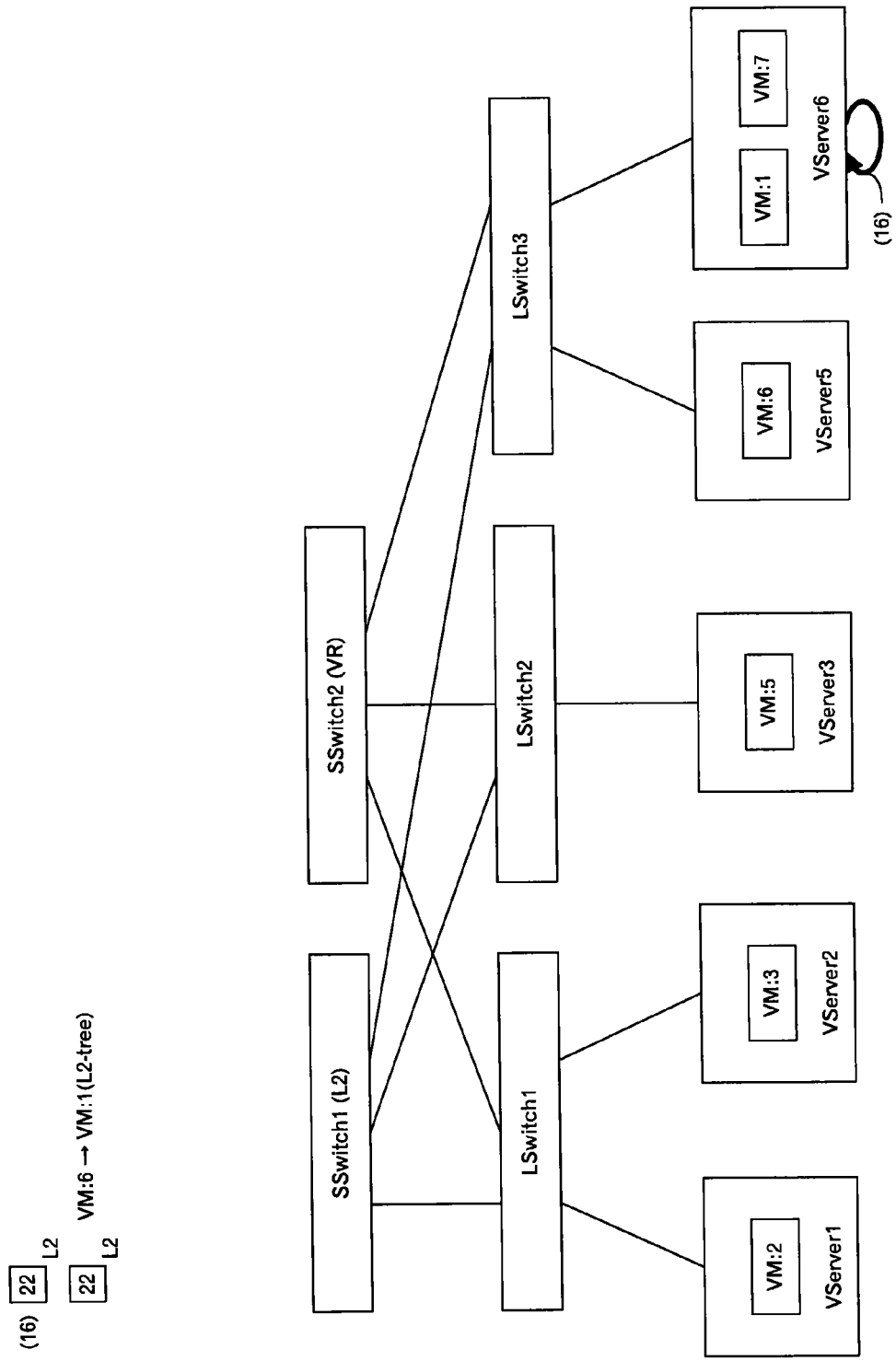
FIG. 72 is a diagram to explain the change of the flows when moving VM to VServer connected with the different LSwitch.

As illustrated in FIG. 72, the output traffic (16) in FIG. 56 is the traffic in the communication within the subnet from VM6 to VM1 (L2-Tree). "22" represents the output traffic before the movement, which is represented in FIG. 57.

[Reduction of the Processing Load for Calculating the Evaluation Value after the Movement]

The movement destination to be selected is determined by the evaluation value lists, however, the movement is actually performed when the evaluation value list is less than the evaluation value list before the movement. Therefore, when an evaluation value that is equal to or greater than the maximum evaluation value in the evaluation value list before the movement is calculated for any of switches and VServer, it is possible to reduce the calculation amount by terminating the calculation of the evaluation values for that movement destination.

Figure 73:
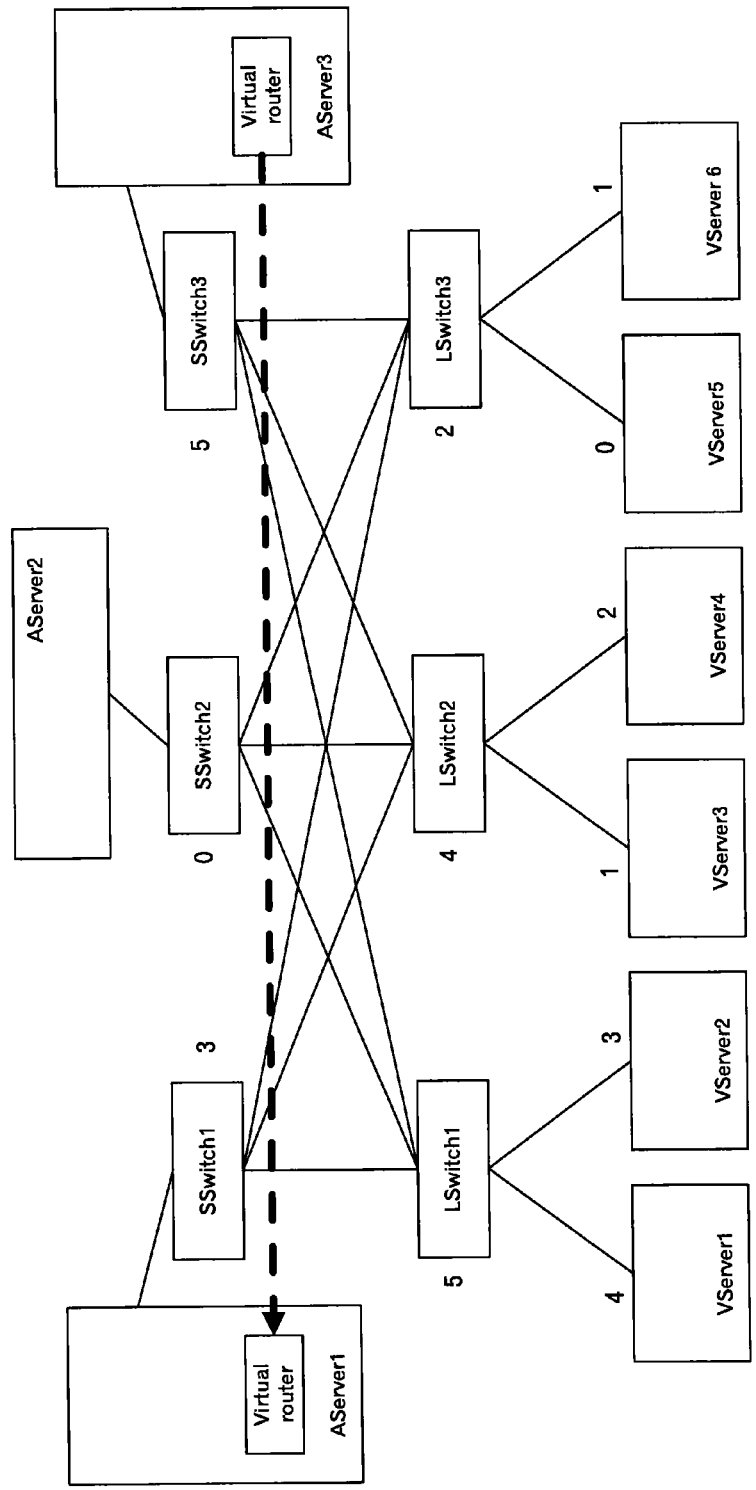
FIG. 73 is a diagram to explain an idea to reduce a calculation amount.

For example, an example of a state before the movement is illustrated in FIG. 73. In the example of FIG. 73, Virtual router is activated on AServer3, however, it is considered that Virtual router is moved to a movement destination candidate AServer1. The maximum evaluation value in the evaluation value list before the movement is "5".

Figure 74:
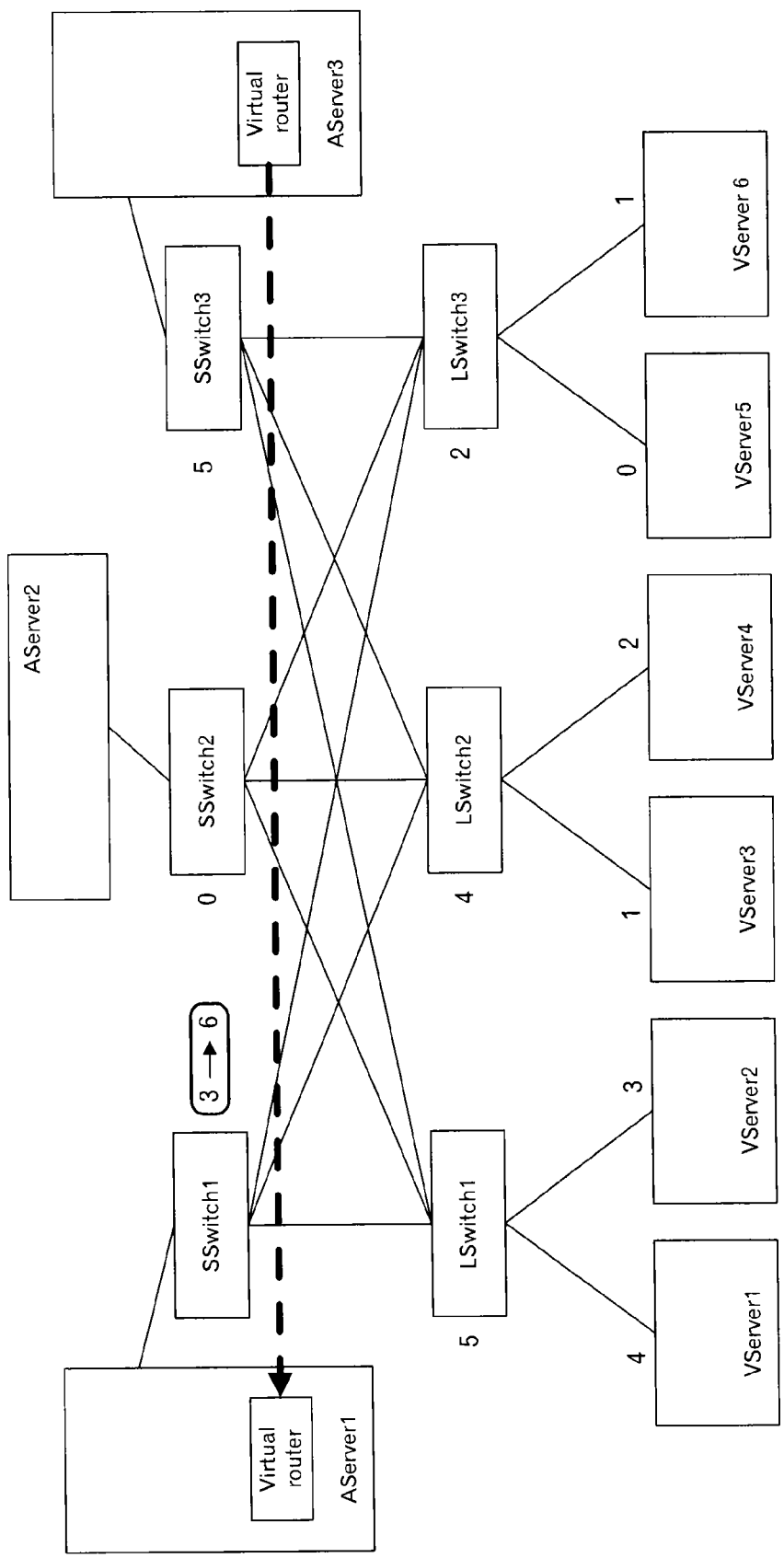
FIG. 74 is a diagram to explain the idea to reduce the calculation amount.

As illustrated in FIG. 74, in this example, it is assumed that, when the evaluation value of SSwitch1 connected with the movement destination AServer1 is recalculated, "6" is obtained. Then, the evaluation values for SSwitch3 and the like are updated, however, AServer1 is not selected without updating. Therefore, the processing for calculating the evaluation value for the movement destination AServer1 is terminated, and the processing shifts to a processing for the next movement destination candidate AServer2.

Figure 75:
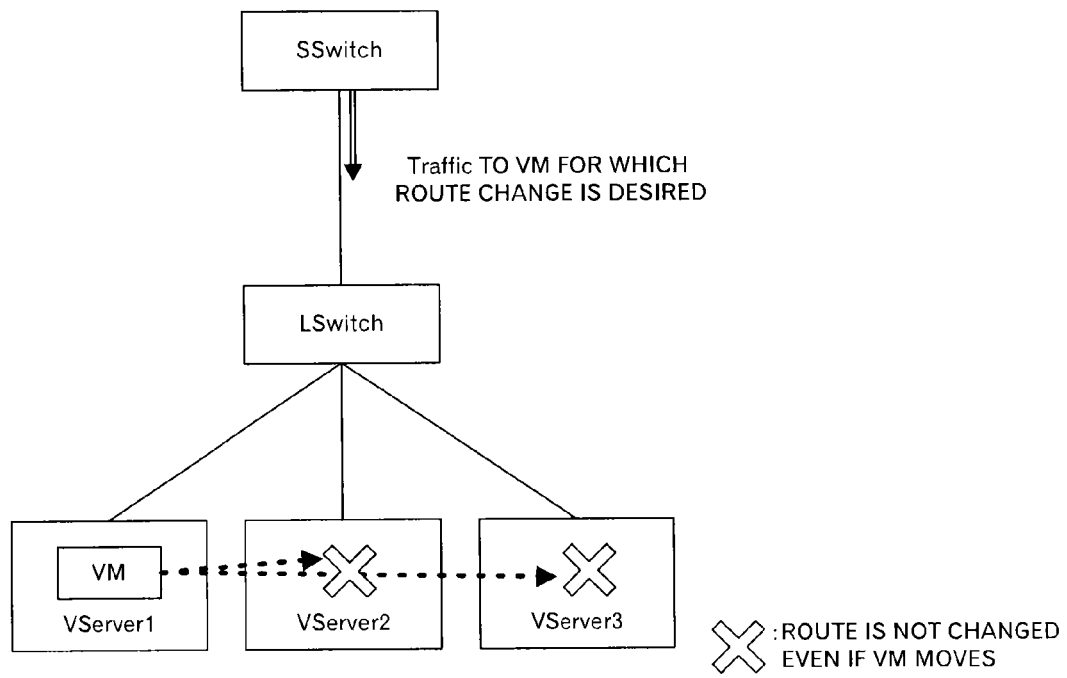
FIG. 75 is a diagram to explain the idea to reduce the calculation amount.

Furthermore, as illustrated in FIG. 75, it is assumed that Downlink of SSwitch is selected because its evaluation value is the maximum, and the transmission destination VM activated on VServer1 is selected as an object to be moved. However, even when the transmission destination VM is moved to VServer2 or VServer3, which are connected to LSwitch that is connected with VServer1, the output traffic of Downlink of SSwitch does not change. Therefore, VServer2 and VServer3 can be excluded from the movement destination candidates. Thus, it is possible to reduce the load for the evaluation value calculation.

Figure 76:
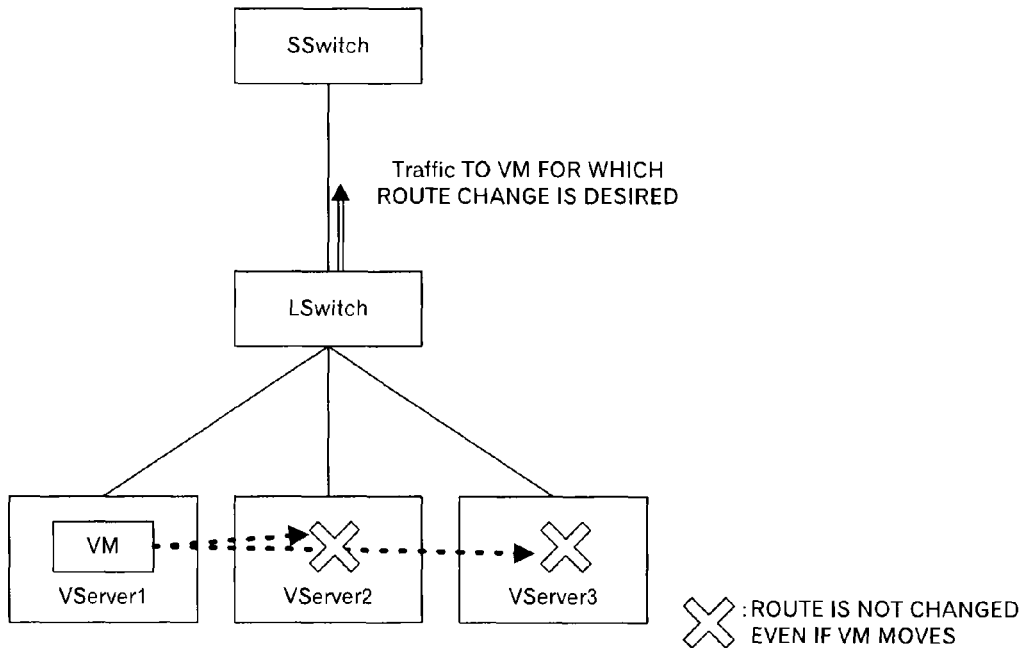
FIG. 76 is a diagram to explain the idea to reduce the calculation amount.

Moreover, as illustrated in FIG. 76, it is assumed that Uplink of LSwitch is selected because its evaluation value is the maximum, and the transmission source VM activated on VServer1 is an object to be moved. However, even when the transmission source VM is moved to VServer2 or VServer3, which are connected to LSwitch that is connected to VServer1, the output traffic of Uplink of LSwitch does not change. Therefore, it is possible to exclude VServer2 and VServer3 from the movement destination candidates. Thus, it is possible to reduce the load for the calculation of the evaluation value.

Although the embodiments of this invention are explained, this invention is not limited to those. The functional block configuration of the resource controller 1000 illustrated in FIG. 7 is a mere example, and does not correspond to the program module configuration and file configuration.

As for the processing flow, as long as the processing results do not change, the turns of the steps may be exchanged and plural steps may be executed in parallel.

Figure 77:
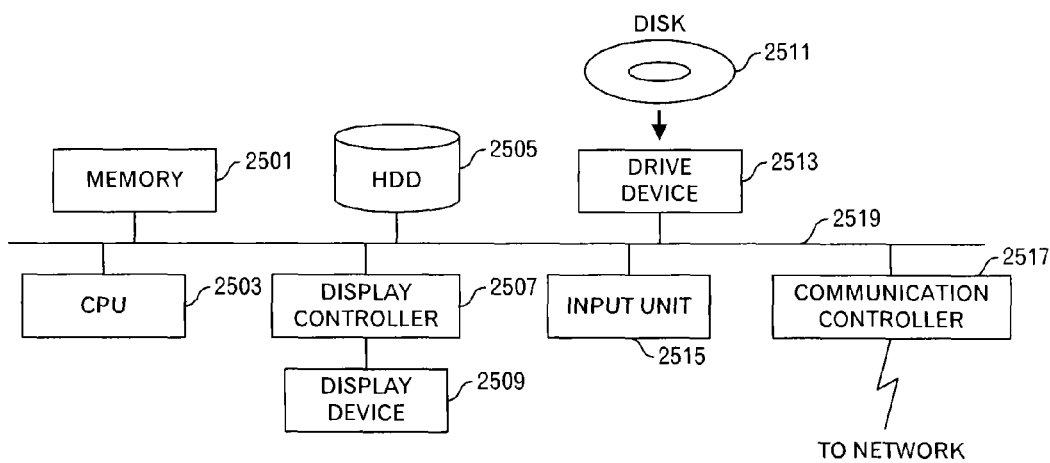
FIG. 77 is a functional block diagram of a computer.

In addition, the aforementioned resource controller 1000 is a computer device as shown in FIG. 77. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as shown in FIG. 77. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are outlined as follows:

An information processing system relating to this invention include: (A) plural first information processing apparatuses on which a virtual machine that belongs to either of plural subnets; (B) plural second information processing apparatuses on which a virtual router used for communication between subnets; (C) a controller that controls communication paths within a subnet, deployment of the virtual machine and deployment of the virtual router; and (D) plural switches that connects the plural first information processing apparatuses, plural second information processing apparatuses and the controller. In addition, the aforementioned plural switches includes: (d1) plural first switches that connect with the plural first information processing apparatuses; and (d2) plural second switches that connect with the plural second information processing apparatuses. Moreover, each of the plural first switches is connected with two or more second switches among the plural second switches. Furthermore, the aforementioned controller is configured to or has programmed circuitry configured to: (c1) select any one of the virtual machine, the virtual router and a communication path within any one of the plural subnets based on a predetermined evaluation value concerning a communication amount for each of the plural first information processing apparatuses and a predetermined evaluation value concerning a communication amount for each of the plural switches; and (c2) change deployment destination of the selected virtual machine or the selected virtual router or the selected communication path.

It becomes possible to equalize the network load that cannot be solved by simply moving only the virtual machine or switching the communication path between switches. In other words, it becomes possible to select the most appropriate object in view of the equalization of the network load among the first information apparatuses onto which the virtual machine is deployed, the second information processing apparatuses onto which the virtual router is deployed and communication paths within any one of subnets.

Moreover, the aforementioned controller may be configured to: (c3) select one of plural physical apparatuses that includes the plural first information processing apparatuses and the plural switches based on the predetermined evaluation value concerning the communication amount for each of the plural first information processing apparatuses and the predetermined evaluation value concerning the communication amount for each of the plural switches; (c4) aggregate data flows relating to the selected physical apparatus for at least either of each virtual machine, each virtual router and each subnet (e.g. virtual-machine unit, inter-subnet unit and intra-subnet unit); and (c5) select any one of objects that includes the virtual machine, the virtual router and communication paths within any one of the plural subnets, based on a result of the aggregating. It is possible to select an object by aggregating the data flows after limiting the physical apparatuses. Therefore, while reducing the processing load, it is possible to select an object that is effective to equalize the network load.

Furthermore, the aforementioned controller may be configured to: (c6) identify, for each of plural cases where the selected object is provisionally changed to any one of candidates, the predetermined evaluation value concerning the communication amount for each of the plural first information processing apparatuses and the predetermined evaluation value concerning the communication amount for each of the plural switches; (c7) identify, among the plural cases, a case that satisfies a condition concerning equalization of predetermined evaluation values, based on the identified predetermined evaluation values; and (c8) change the selected object to a candidate according to the identified case. Thus, it is possible to identify the candidate that is effective for the equalization of the network load.

Furthermore, the aforementioned predetermined evaluation value may be a maximum value or an average value of output traffic.

Moreover, the aforementioned condition may include: a first condition that the case is a case for which a least evaluation value list is obtained among evaluation value lists of the plural cases, wherein an evaluation value list is obtained for each of the plural cases by arranging the identified predetermined evaluation values in descending order; and a second condition that the least evaluation value list is less than an evaluation value list for a state before the changing.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory such as ROM (Read Only Memory), and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing system, comprising:
   a plurality of first information processing apparatuses on which a virtual machine that belongs to any one of a plurality of subnets is executed;
   a plurality of second information processing apparatuses on which a virtual router used for communication between subnets is executed;
   a controller that controls communication paths within the plurality of subnets, deployment of the virtual machine and deployment of the virtual router; and
   a plurality of switches that connect the plurality of first information processing apparatuses, the plurality of second information processing apparatuses and the controller,
   wherein the plurality of switches comprise:
      a plurality of first switches that connect with the plurality of first information processing apparatuses; and
      a plurality of second switches that connect with the plurality of second information processing apparatuses, wherein
   each of the plurality of first switches is connected with two or more second switches among the plurality of second switches, and
   the controller comprises:
      a memory; and
      a processor configured to use the memory and execute a process, the process comprising:
         first selecting, based on a predetermined evaluation value corresponding to a communication amount for each of the plurality of first information processing apparatuses and a predetermined evaluation value corresponding to a communication amount for each of the plurality of switches, a physical apparatus from a plurality of physical apparatuses that include the plurality of first information processing apparatuses and the plurality of switches;
         second selecting any one from a group consisting of the virtual machine, the virtual router and a communication path, which relates to communication of the selected physical apparatus; and
         changing a deployment destination of the virtual machine or the virtual router or the communication path selected in the second selecting.

2. The information processing system as set forth in claim 1, wherein the second selecting comprises:
   aggregating data flows relating to the selected physical apparatus for at least one of each virtual machine, each virtual router and each subnet; and
   selecting any one of objects that include the virtual machine, the virtual router and the communication paths within the plurality of subnets, based on a result of the aggregating.

3. The information processing system as set forth in claim 2, wherein the changing comprises:
   identifying, for each of a plurality of cases where the selected object is provisionally changed to any one of candidates, the predetermined evaluation value corresponding to the communication amount for each of the plurality of first information processing apparatuses and the predetermined evaluation value corresponding to the communication amount for each of the plurality of switches;

identifying, among the plurality of cases, a case that satisfies a condition concerning equalization of predetermined evaluation values, based on the identified predetermined evaluation values; and changing the selected object to a candidate according to the identified case.

4. The information processing system as set forth in claim 3, wherein the condition includes:

a first condition that the case is a case for which a least evaluation value list is obtained among evaluation value lists of the plurality of cases, wherein an evaluation value list is obtained for each of the plurality of cases by arranging the identified predetermined evaluation values in descending order; and a second condition that the least evaluation value list is less than an evaluation value list for a state before the changing.

5. The information processing system as set forth in claim 1, wherein the predetermined evaluation value is a maximum value or an average value of output traffic.

6. A control method, comprising:

obtaining, by a controller in an information processing system, a predetermined evaluation value concerning a communication amount for each of a plurality of first information processing apparatuses and a predetermined evaluation value concerning a communication amount for each of a plurality of switches, wherein the information processing system comprises the plurality of first information processing apparatuses on which a virtual machine that belongs to any one of a plurality of subnets is executed; a plurality of second information processing apparatuses on which a virtual router used for communication between subnets is executed; the controller that controls communication paths within the plurality of subnets, deployment of the virtual machine and deployment of the virtual router; and the plurality of switches that connect the plurality of first information processing apparatuses, the plurality of second information processing apparatuses and the controller, the plurality of switches comprises: a plurality of first switches that connect with the plurality of first information processing apparatuses; and a plurality of second switches that connect with the plurality of second information processing apparatuses, and each of the plurality of first switches is connected with two or more second switches among the plurality of second switches;

first selecting, by the controller and based on the predetermined evaluation value corresponding to the communication amount for each of the plurality of first information processing apparatuses and the predetermined evaluation value corresponding to the communication amount for each of the plurality of switches, a physical apparatus from a plurality of physical apparatuses that include the plurality of first information processing apparatuses and the plurality of switches;

second selecting, by the controller, any one from a group consisting of the virtual machine, the virtual router and a communication path, which relates to communication of the selected physical apparatus; and changing, by the controller, deployment destination of the virtual machine or the virtual router or the communication path selected in the second selecting.

7. The control method as set forth in claim 6, wherein the second selecting comprises:

aggregating data flows relating to the selected physical apparatus for at least one of each virtual machine, each virtual router and each subnet; and selecting any one of objects that include the virtual machine, the virtual router and the communication paths within the plurality of subnets, based on a result of the aggregating.

8. A non-transitory computer-readable storage medium storing a processing for causing a controller in an information processing system to execute a process, the process comprising:

obtaining a predetermined evaluation value concerning a communication amount for each of a plurality of first information processing apparatuses and a predetermined evaluation value concerning a communication amount for each of a plurality of switches, wherein the information processing system comprises: the plurality of first information processing apparatuses on which a virtual machine that belongs to any one of a plurality of subnets is executed; a plurality of second information processing apparatuses on which a virtual router used for communication between subnets is executed; the controller that controls communication paths within the plurality of subnets, deployment of the virtual machine and deployment of the virtual router; and the plurality of switches that connect the plurality of first information processing apparatuses, the plurality of second information processing apparatuses and the controller, the plurality of switches comprise: a plurality of first switches that connect with the plurality of first information processing apparatuses; and a plurality of second switches that connect with the plurality of second information processing apparatuses, and each of the plurality of first switches is connected with two or more second switches among the plurality of second switches;

first selecting, based on the predetermined evaluation value corresponding to the communication amount for each of the plurality of first information processing apparatuses and the predetermined evaluation value corresponding to the communication amount for each of the plurality of switches, a physical apparatus from a plurality of physical apparatuses that include the plurality of first information processing apparatuses and the plurality of switches;

second selecting any one from a group consisting of the virtual machine, the virtual router and a communication path, which relates to communication of the selected physical apparatus; and changing deployment destination of the virtual machine or the virtual router or the communication path selected in the second selecting.

9. The non-transitory computer-readable storage medium as set forth in claim 8, wherein the second selecting comprises:

aggregating data flows relating to the selected physical apparatus for at least one of each virtual machine, each virtual router and each subnet; and selecting any one of objects that include the virtual machine, the virtual router and the communication paths within the plurality of subnets, based on a result of the aggregating.

* * * * *